US 9,137,201 B2

(12) United States Patent　　(10) Patent No.: US 9,137,201 B2
Sanders　　(45) Date of Patent: Sep. 15, 2015

(54) APPARATUS AND METHODS OF ROUTING WITH CONTROL VECTORS IN A SYNCHRONIZED ADAPTIVE INFRASTRUCTURE (SAIN) NETWORK

(71) Applicant: Ray W. Sanders, Los Angeles, CA (US)

(72) Inventor: Ray W. Sanders, Los Angeles, CA (US)

( * ) Notice: Subject to any disclaimer, the term of this patent is extended or adjusted under 35 U.S.C. 154(b) by 46 days.

(21) Appl. No.: 13/791,709

(22) Filed: Mar. 8, 2013

(65) Prior Publication Data
US 2014/0056317 A1　Feb. 27, 2014

Related U.S. Application Data

(60) Provisional application No. 61/609,218, filed on Mar. 9, 2012, provisional application No. 61/766,661, filed on Feb. 19, 2013.

(51) Int. Cl.
*H04L 29/12*　(2006.01)
*H04J 3/16*　(2006.01)
*H04J 3/24*　(2006.01)

(52) U.S. Cl.
CPC ........... *H04L 61/6004* (2013.01); *H04J 3/1629* (2013.01); *H04J 3/247* (2013.01)

(58) Field of Classification Search
None
See application file for complete search history.

(56) References Cited

U.S. PATENT DOCUMENTS

| | | | |
|---|---|---|---|
| 2,541,932 A | 2/1951 | Melhose | |
| 2,986,723 A | 5/1961 | Darwin et al. | |
| 3,162,857 A | 12/1964 | Sanders | |
| 3,168,722 A | 2/1965 | Sanders | |
| 3,218,557 A | 11/1965 | Sanders | |
| 3,383,598 A | 5/1968 | Sanders | |
| 3,480,865 A | 11/1969 | Sanders | |
| 3,486,118 A | 12/1969 | Sanders et al. | |
| 3,665,405 A | 5/1972 | Sanders et al. | |
| 3,715,505 A * | 2/1973 | Gordon et al. | 370/379 |
| 3,744,051 A | 7/1973 | Sanders et al. | |
| 3,978,449 A | 8/1976 | Sanders et al. | |
| 5,406,550 A | 4/1995 | McTiffin | |

(Continued)

FOREIGN PATENT DOCUMENTS

WO　WO 2005112354　11/2005
WO　WO 2011094287　8/2011

OTHER PUBLICATIONS

Sanders, R.W. "Communication Efficiency Comparison of Several Communication Systems," Proceedings of the IRE, vol. 48, No. 4, pp. 575-588, Apr. 1960.

(Continued)

*Primary Examiner* — Anh-Vu Ly
*Assistant Examiner* — Tejis Daya
(74) *Attorney, Agent, or Firm* — Knobbe Martens Olson & Bear, LLP

(57) ABSTRACT

Disclosed is a synchronized adaptive infrastructure (SAIN) network. Switches, synchronized nodes, and persistent connections can be used. Also described are methods and apparatus for the following functions: disjoint partitioning; data aggregation and disaggregation; interfacing with packet-based networks; bandwidth management; use of control vectors for security, addressing, error control, routing, etc. Synchronized networks are disclosed which enable fast connection set up and release in a tiered hierarchy of circuit switched nodes. Methods of synchronizing and transforming data streams are disclosed, as well as overcoming Doppler, environmental, and frequency offset effects.

20 Claims, 24 Drawing Sheets

(56) References Cited

U.S. PATENT DOCUMENTS

| | | | | |
|---|---|---|---|---|
| 5,502,723 | A * | 3/1996 | Sanders | 370/352 |
| 5,802,043 | A * | 9/1998 | Skillen et al. | 370/258 |
| 6,031,864 | A * | 2/2000 | Bauchot et al. | 375/133 |
| 6,041,050 | A * | 3/2000 | Sanders | 370/352 |
| 6,636,512 | B1 | 10/2003 | Lorrain et al. | |
| 6,754,221 | B1 | 6/2004 | Whitcher et al. | |
| 6,907,020 | B2 * | 6/2005 | Periyalwar et al. | 370/337 |
| 6,920,113 | B1 | 7/2005 | Kovvali et al. | |
| 6,975,691 | B1 * | 12/2005 | Shiraishi | 375/329 |
| 7,420,988 | B1 | 9/2008 | Grossman | |
| 7,590,118 | B2 | 9/2009 | Giesberts et al. | |
| 8,526,458 | B1 * | 9/2013 | Jensen et al. | 370/432 |
| 2002/0126685 | A1 | 9/2002 | Leatherbury et al. | |
| 2004/0214582 | A1 | 10/2004 | Lan et al. | |
| 2005/0207436 | A1 | 9/2005 | Varma | |
| 2005/0220148 | A1 | 10/2005 | Delregno et al. | |
| 2006/0056443 | A1 | 3/2006 | Tao et al. | |
| 2007/0067487 | A1 | 3/2007 | Freebairn | |
| 2010/0158015 | A1 | 6/2010 | Wu | |

OTHER PUBLICATIONS

Sanders, R. W. "The Digilock Orthogonal Modulation System," Advances in Communication Systems, edited by A. V. Balakrishnan, vol. 1, 1965.
Sanders, Ray W. and Vinton G. Cerf. "Compatibility or chaos in communications." Datamation, Mar. 1976, DO. 50-55.
Sanders, Ray W. "Proposed Amendments to MAC/PHY Layers to Include a Bandwidth-On-Demand MAC Sublaver" IEEE 802.16.1 mD-00105, Jan. 2000 (2 parts).
Sanders, Ray W. "Proposed Amendments to Include a Bandwidth-an-Demand MAC/PHY Sublaver Option", IEEE 802.16.1pc-00106, Jan. 2000.
Cisco Systems, Inc., "Guide to ATM Technology", 2000, in 266 pages.
Sanders, Ray W. "Proposed Amendments to MAC/PHY Layers to Include a Bandwidth-On-Demand MAC Sublayer" IEEE 802.16.1mp-00/05, Jan. 2000.
International Search Report and Written Opinion dated Sep. 27, 2011, in related International application No. PCT/US2011/022542, 10 pp.
International Preliminary Report and Written Opinion; International application No. PCT/US2011/022542, mailed Aug. 9, 2012.
Sanders, RW. "Communication Efficiency Comparison of Several Communication Systems," Proceesings of the IRE, vo1.48, No. 4, pp. 575-588, Apr. 1960.
Sanders, R. W. "The Digilock Orthogonal Modulation System," Advances in Communication Systems, edited by A. V. Balakrishnan , vol. 1, 1965.
Sanders, Ray W. and Vinton G. Cerf. "Compatibility or chaos in communications." Datamation, Mar. 1976, pp. 50-55.
Sanders, Ray W. and deSmet, Joe. "A Network Combining Packet Switching and Circuit Switching in a Common System" ACM Computer Communication Review, 1976.
Sanders, Ray W. "System Requirements Assuring That Point-to-Multipoint Broadband Wireless Access Networks Are Agnostic to User and Network Protocols", IEEE 802.16mc-99/01, Jun. 1999.
Sanders, Ray W. "Proposal for a MAC Layer Approach Agnostic to Higher Level Protocols", IEEE 802.16mp-99/11, Nov. 1999.
Sanders, Ray W. "A Proposed Approach to Defining an Interoperable MAC/PHY Layer Scheduler for 802.16", IEEE 802.16mp-99/11, Nov. 1999.
Sanders, Ray W. "Proposed Amendments to MAC/PHY Layers to Include a Bandwidth-On-Demand MAC Sublayer"IEEE 802. 16. 1 mD-00105, Jan. 2000 (2 parts).
Sanders, Ray W. "Proposed Amendments to Include a Bandwidth-On-Demand MAC/PHY Sublayer Option", IEEE 802.16.1pc-00106, Jan. 2000.
Sanders, Ray W. "Bandwidth-on-demand layer 1.5 protocols for enhanced broadband wireless access system performance", Wireless Communications and Networking Conference, 2000.

Bormann, et al., RFC 3095 Robust Header Compression (ROHC), Jul. 2001, in 168 pages, The Internet Society.
Dr. Sanchita Mal-Sarkar, PowerPoint Presentation titled "Asynchronous Transfer Mode (ATM)" dated Jul. 30, 2003 in 18 pages, Cleveland State University, Ohio.
Cisco01: "Guide to ATM Technology", 2000, in 266 pages.
International Search Report and Written Opinion dated Jun. 19, 2013, in related International application No. PCT/US2013/030040, 8 pp.
"BGP Autodiscovery and Signaling for VPWS-Based VPN Services" IP-MPLS Forum; IP-MPLSF 22.0.0; Apr. 2009, 22 pgs.
"Abstract Test Suite for TDM Services over MPLS" TR-248/ATP-248 (IP/MPLS Forum 23.0.0); Feb. 2010, 73 pgs.
"Certification Abstract Test Suite for MFAF 12.0.1," IP/MPLS Forum 21.0.0; IP/MPLS Forum Technical Committee; Oct. 2008, 30 pgs.
"MPLS in Mobile Backhaul Networks Framework and Requirements," Technical Specification; IP/MPLS Forum Technical Committee; Oct. 2008, 40 pgs.
"MPLS Inter-Carrier Interconnect (MPLS-ICI)," Technical Specification; IP/MPLS Forum Technical Committee; Apr. 2008, 84 pgs.
"Soft Permanent Virtual Circuit Interworking between MPLS Pseudowires and ATM," MFA Forum Technical Committee; Sep. 2007, 17 pgs.
"Performance Monitoring Across Multiservice Networks," MFA Forum Technical Committee; Apr. 2007, 36 pgs.
"Multi-Service Interworking—IP Over MPLS," MFA Forum Technical Committee; Feb. 2007, 23 pgs.
"Multi-Service Interworking—Frame Relay and ATM Service Interworking over MPLS," MFA Forum Technical Committee; Jan. 2007, 18 pgs.
"High Probability of Completion (HPOC) Version 1.0," MFA Forum Technical Committee; Nov. 2006, 56 pgs.
"Fault Management for Multiservice Interworking over MPLS Version 1.0," MFA Forum Technical Committee; Jun. 2006, 21 pgs.
"Multi-Service Interworking—Ethernet over MPLS," IP/MPLS Forum Technical Committee; Feb. 2009, 44 pgs.
"High Speed Connections Specification," MFA Forum Technical Committee; Feb. 2006, 21 pgs.
"ATM and Frame Relay to MPLS Control Plane Interworking: Client-Server Specification," MFA Forum; Sep. 2006, 21 pgs.
"The Use of Virtual Trunks for ATM/MPLS Control Plane Interworking Specification," MFA Forum Technical Committee; Feb. 2006, 29 pgs.
"Emulation of TDM Circuits over MPLS Using Raw Encapsulation Implementation Agreement," MFA Technical Committee; Nov. 2004, 25 pgs.
"MPLS PVC User to Network Interface Annex B: MPLS Proxy Admission Control Protocol Implementation Agreement," MPLS & Frame Relay Alliance Technical Committee; Oct. 2004, 9 pgs.
"MPLS Proxy Admission Control Definition Implementation Agreement," MPLS & Frame Relay Alliance Technical Committee; Oct. 2004, 9 pgs.
"I.366.2 Voice Trunking Format over MPLS Technical Specification," IP/MPLS Forum Technical Committee; Jul. 2008, 17 pgs.
"TDM Transport over MPLS using AAL1 Technical Specification," IP/MPLS Forum Technical Committee; Jul. 2008, 31 pgs.
"LDP Conformance Implementation Agreement," MPLS Forum Technical Committee; Dec. 4, 2002, 56 pgs.
"MPLS-PVC User to Network Interface Implementation Agreement," MPLS & Frame Relay Alliance Technical Committee; May 2003, 23 pgs.
"Voice over MPLS Implementation Agreement," MPLS Forum Technical Committee; Jul. 27, 2001, 43 pgs.
"P4: Programming Protocol—Independent Packet Processors," arXiv:1312.1719v3 [cs.NI]; May 15, 2014, 8 pgs.
"OpenFlow Switch Specification," Version 1.4.0 (Wire Protocol 0x05); Oct. 14, 2013, 205 pgs.
"OpenFlow Switch Specification," Version 1.1.0 Implemented (Wire Protocol 0x02); Feb. 28, 2011, 56 pgs.
"OpenFlow:Enabling Innovation in Campus Networks," Mar. 14, 2008, 6pgs.

* cited by examiner

A Bright Line Separation of User Data from
Data Transport and NetworkControl

Hierarchical Core Network Tiers Using SAIN Technology

Basic Aggregation/Disaggregation Switch Pairs

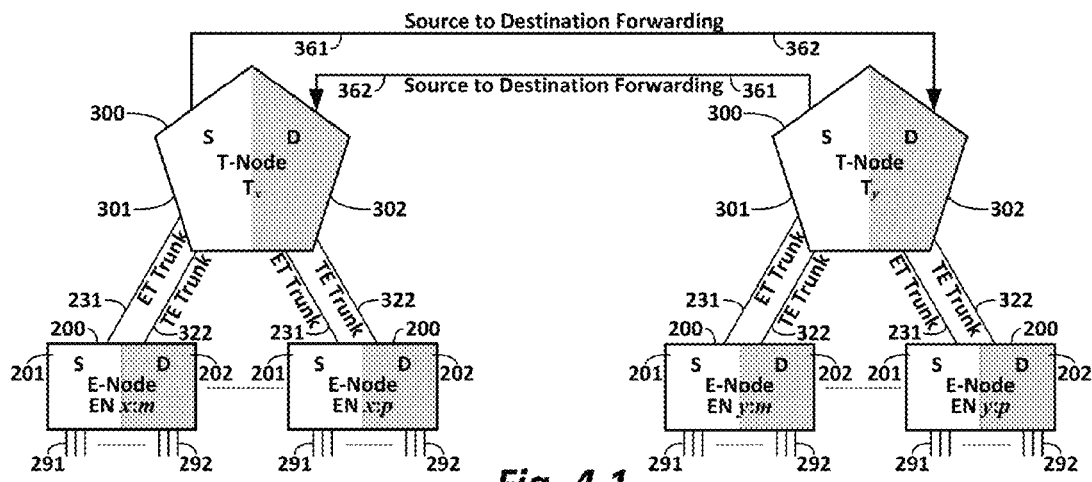
Fig. 4.1
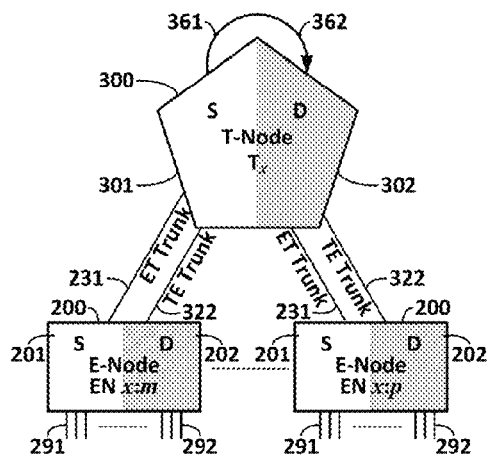
Fig. 4.2
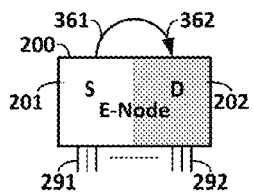
Fig. 4.3
Various Configurations of E-Nodes and Their T-Node Parents

- Each line interconnecting two nodes is a *trunk*.
- The number in between the nodes is its latency, measured in microseconds.
- The three-digit numbers at the ends of the trunks are disjoint and arbitrarily chosen.
- The two numbers are *hop numbers* for the direction of travel away from a node.
- An odd hop number is placed at the lesser of the two interconnected node numbers.
- A hop number at the other node number end is greater than the odd number by one.

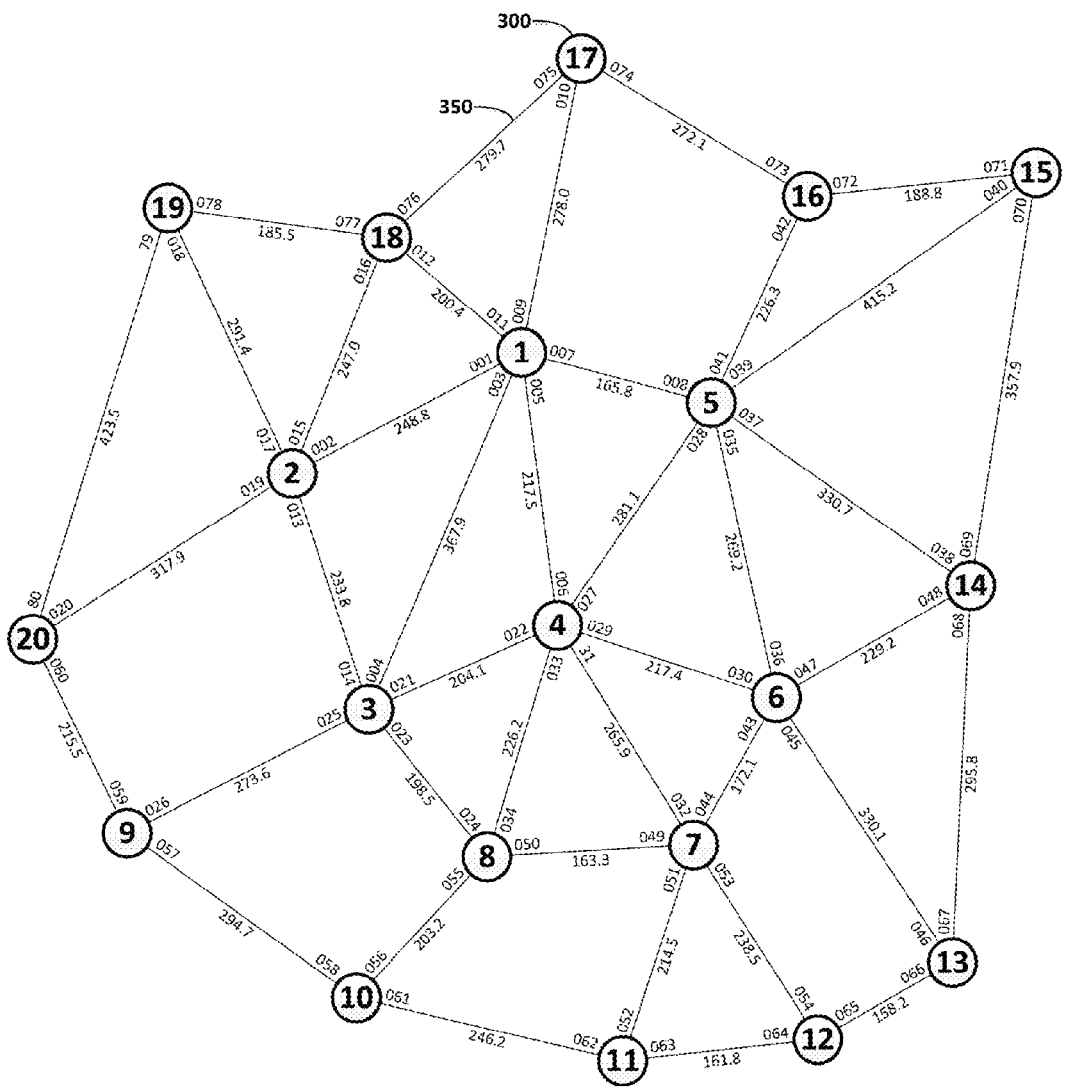

A Metropolitan Area Network Example with 20 T-Nodes & 80 Simplex Trunks

*Fig. 5*

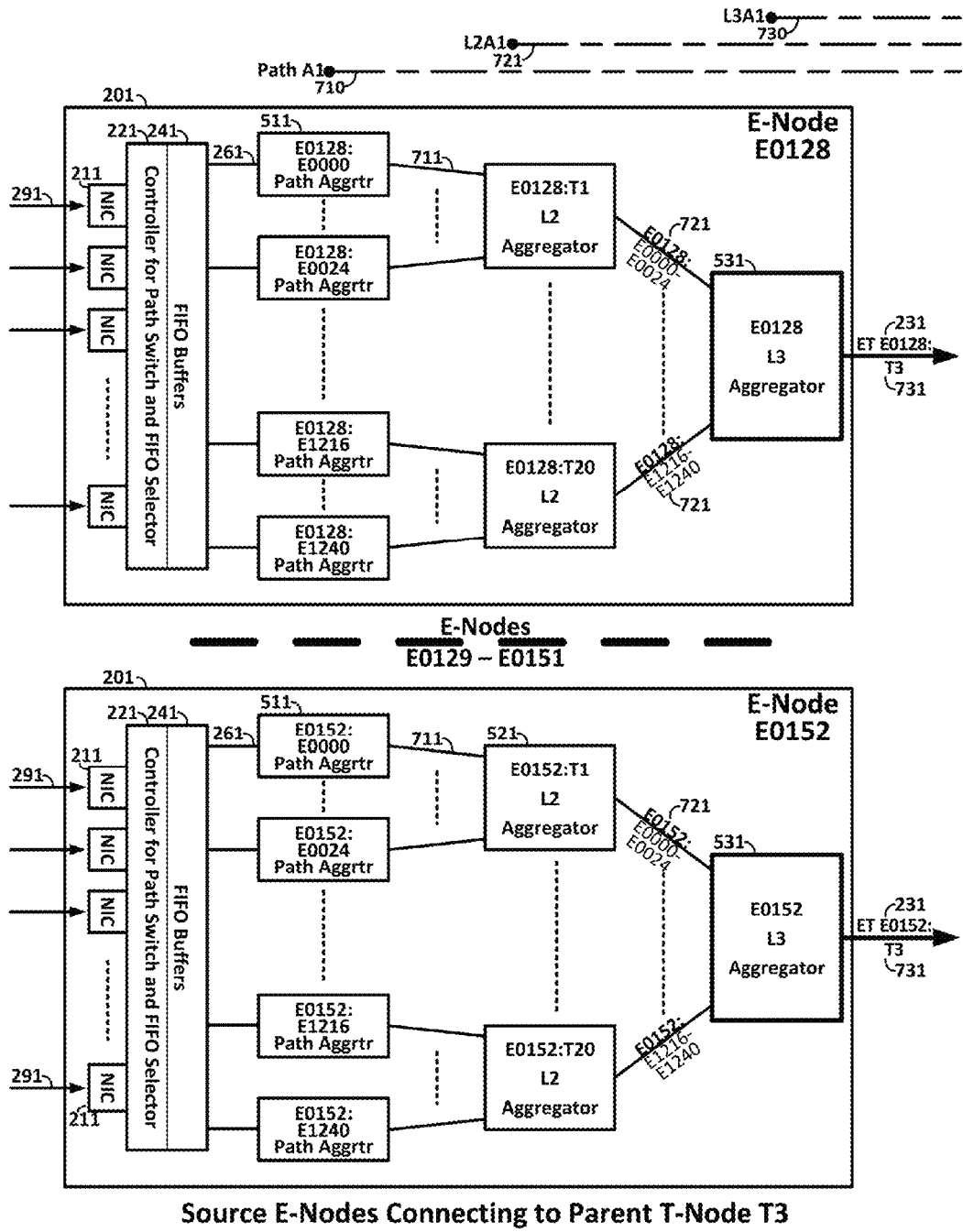
Fig. 6.1

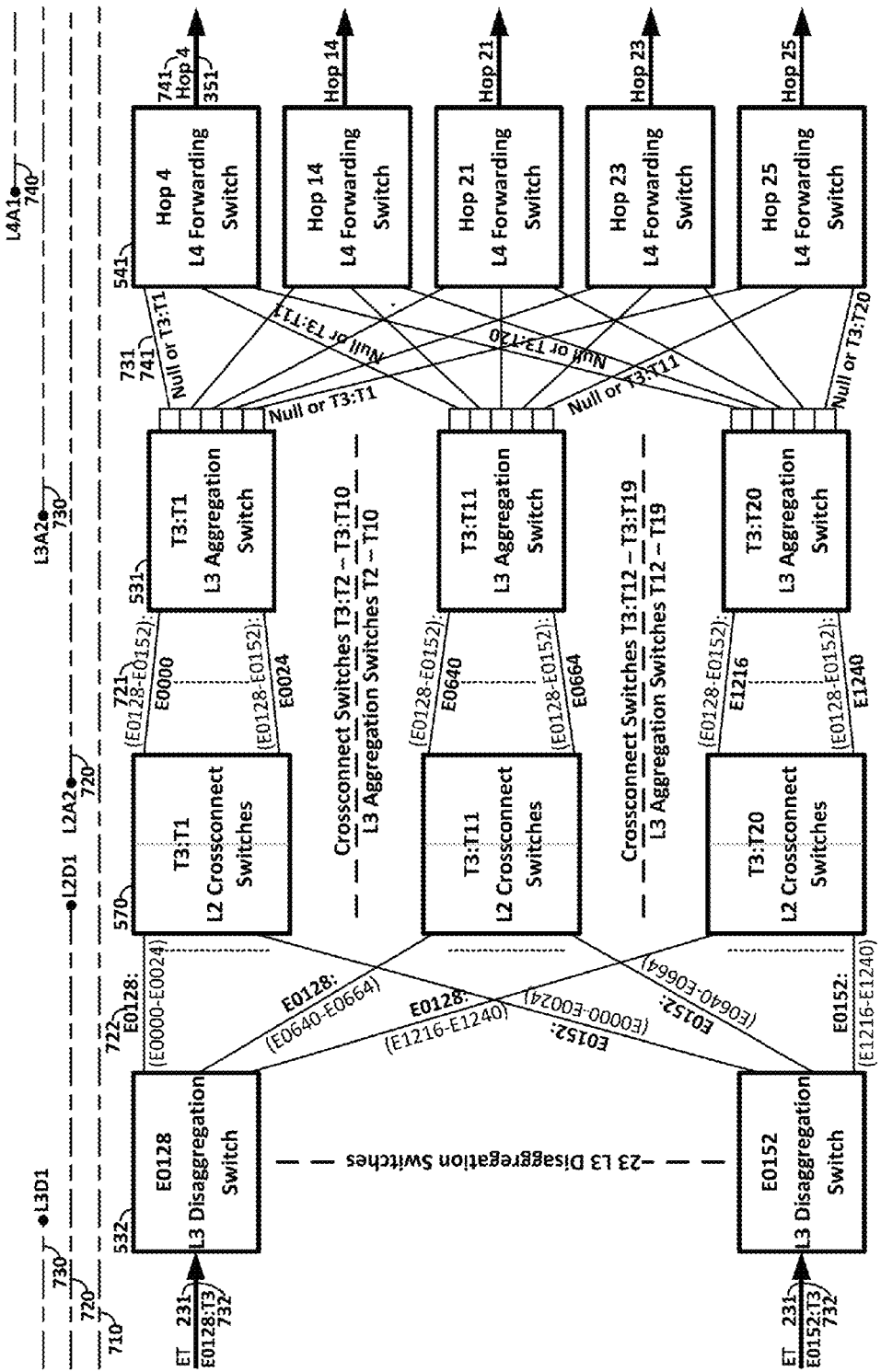
Fig. 6.2
Parent Source T-Node T3
Forwarding switches

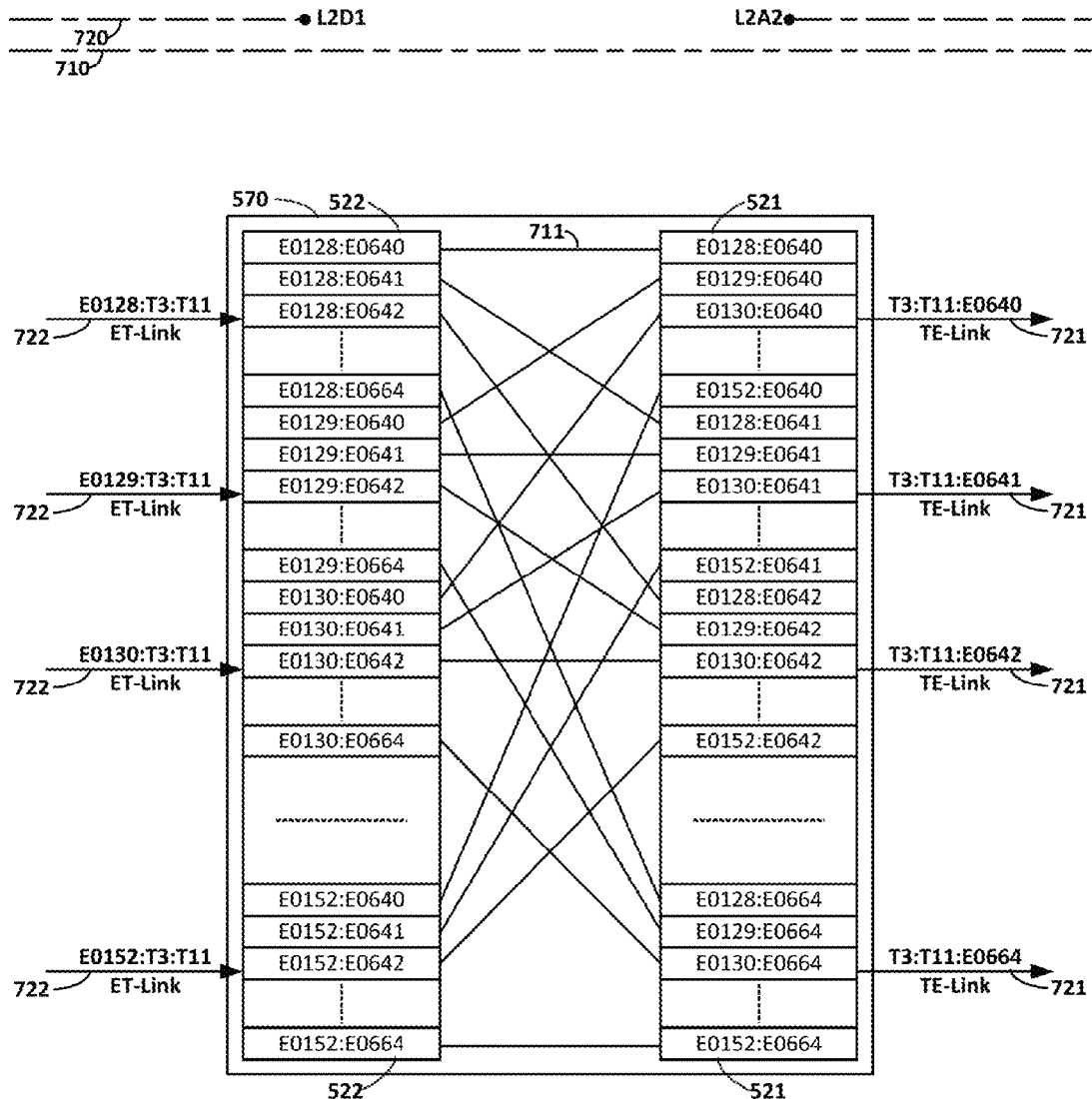
Fig. 9.2 Detail of One (of 20 Crossconnect Switches) that Results in Each E-Node Child of One Parent T-Node (T3) Connecting to All E-Node Children of a Second T-Node (T11).
*Fig. 6.3*

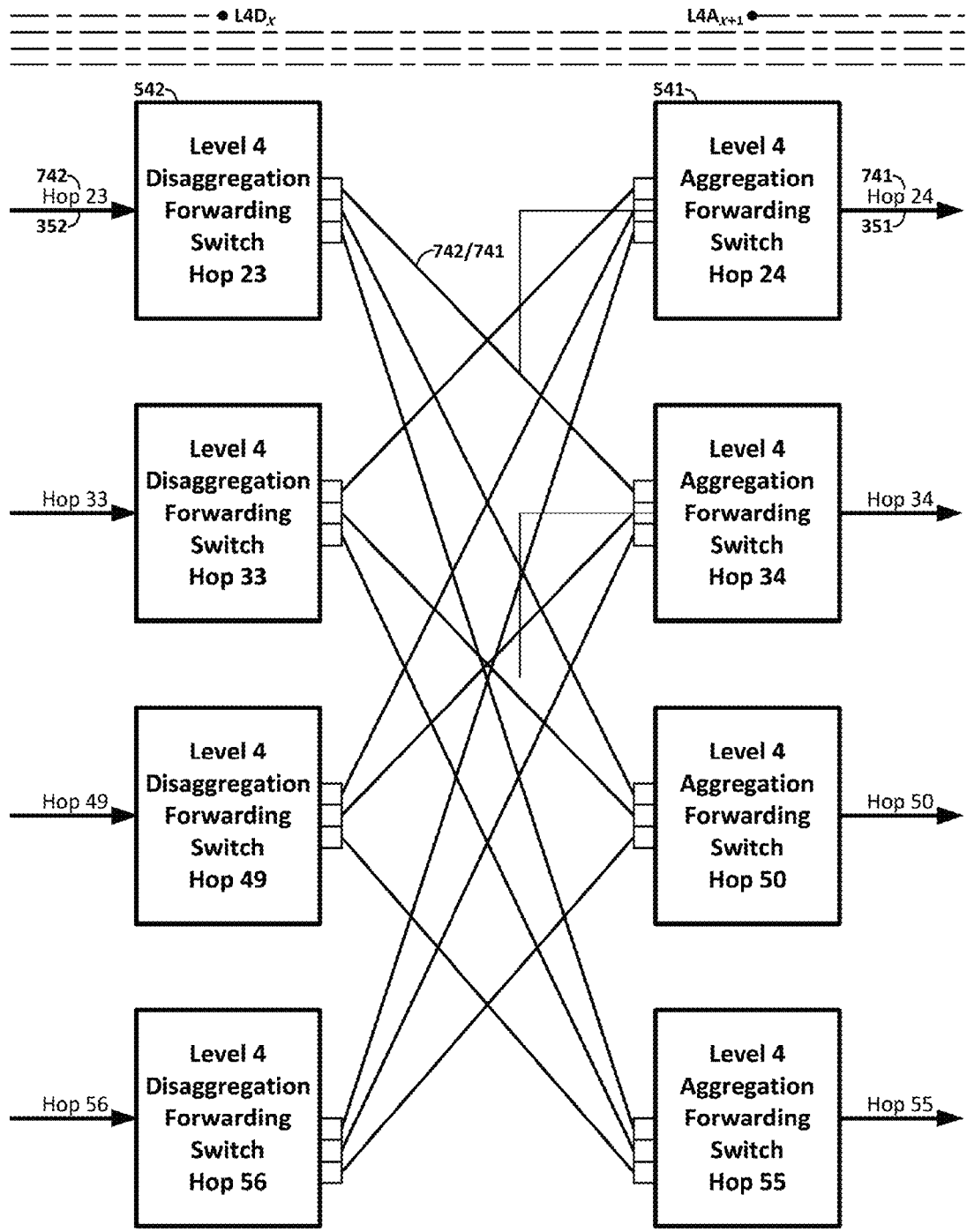
*Fig. 6.4*

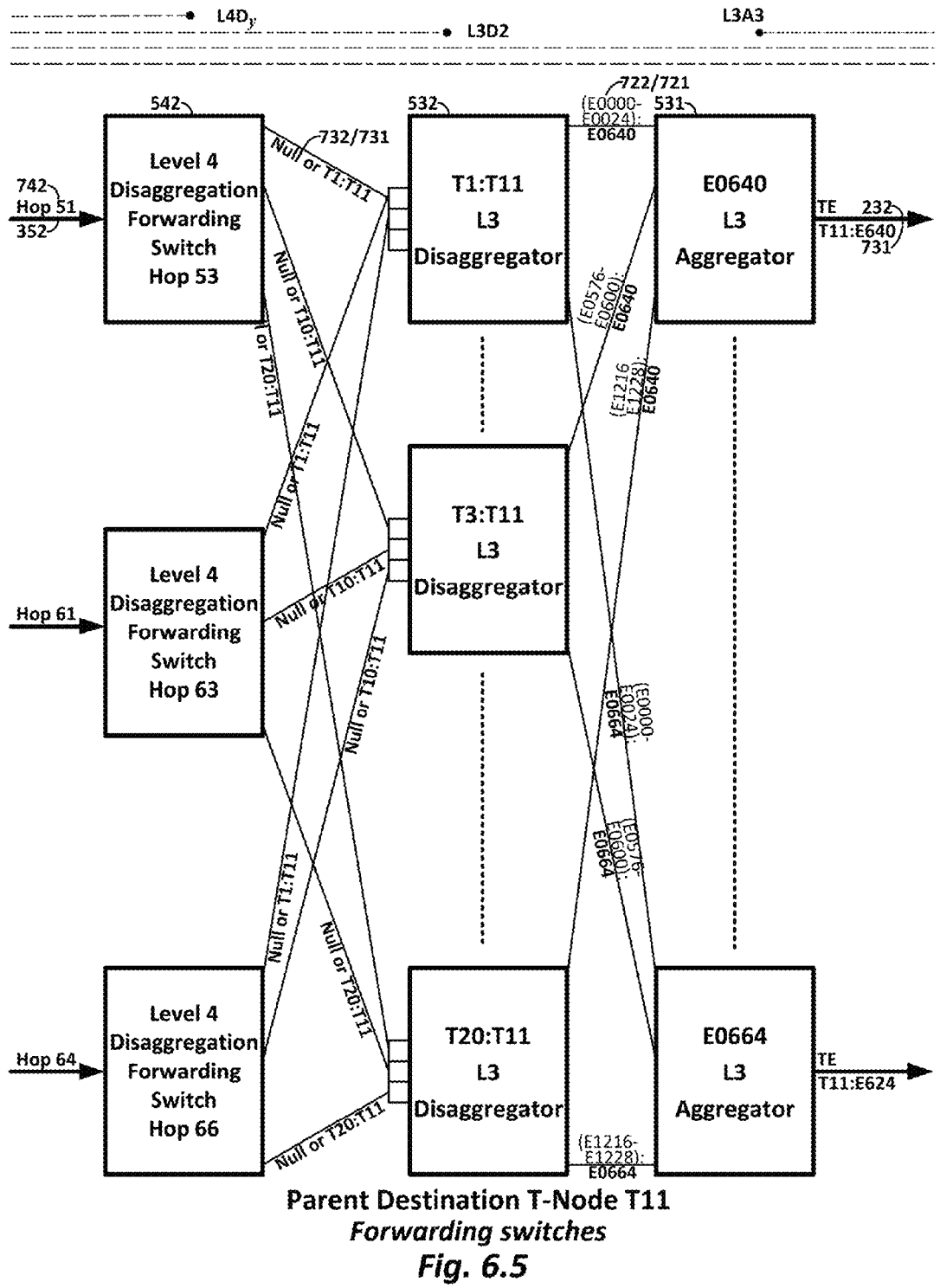
Parent Destination T-Node T11
*Forwarding switches*
Fig. 6.5

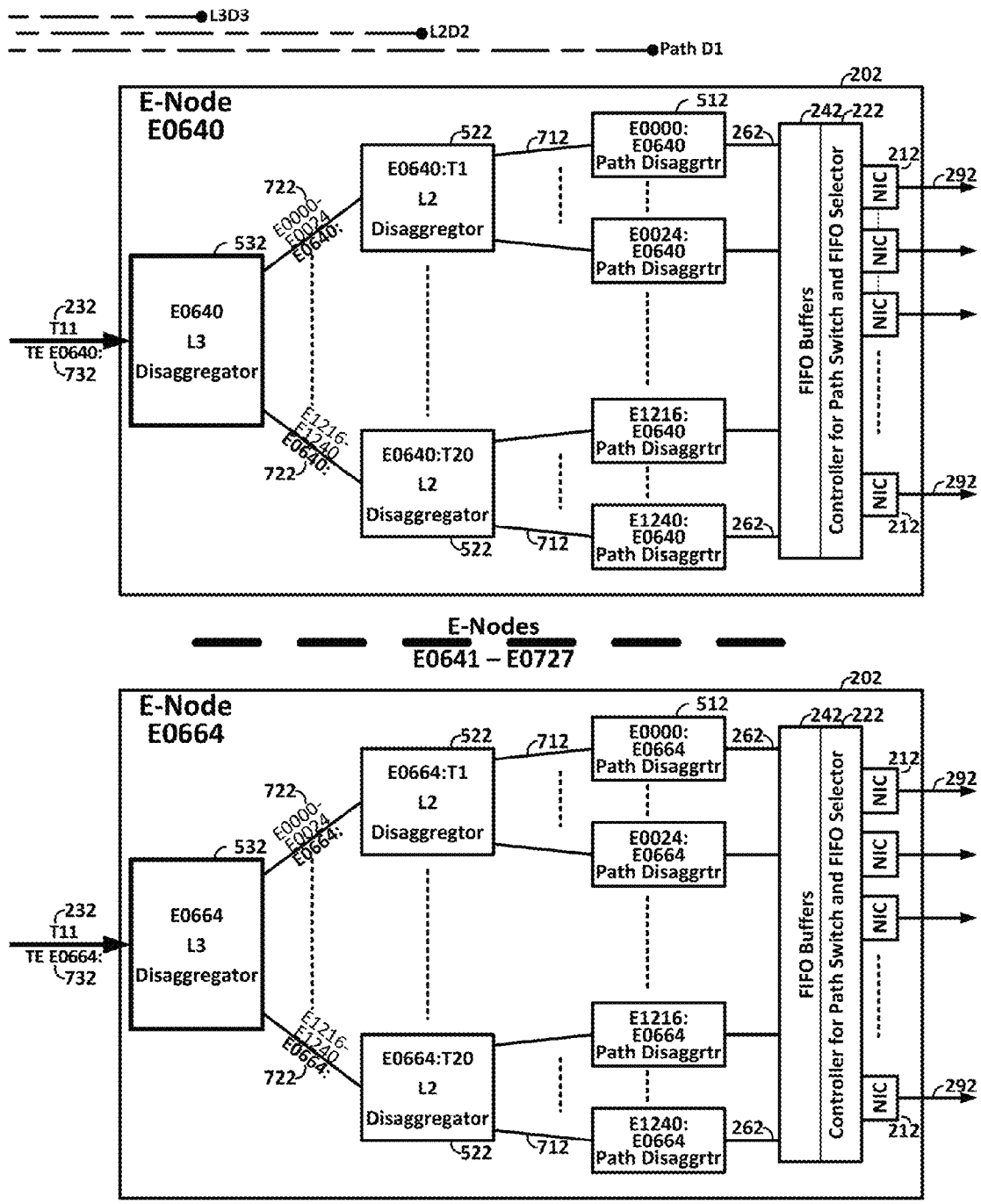
*Fig. 6.6*

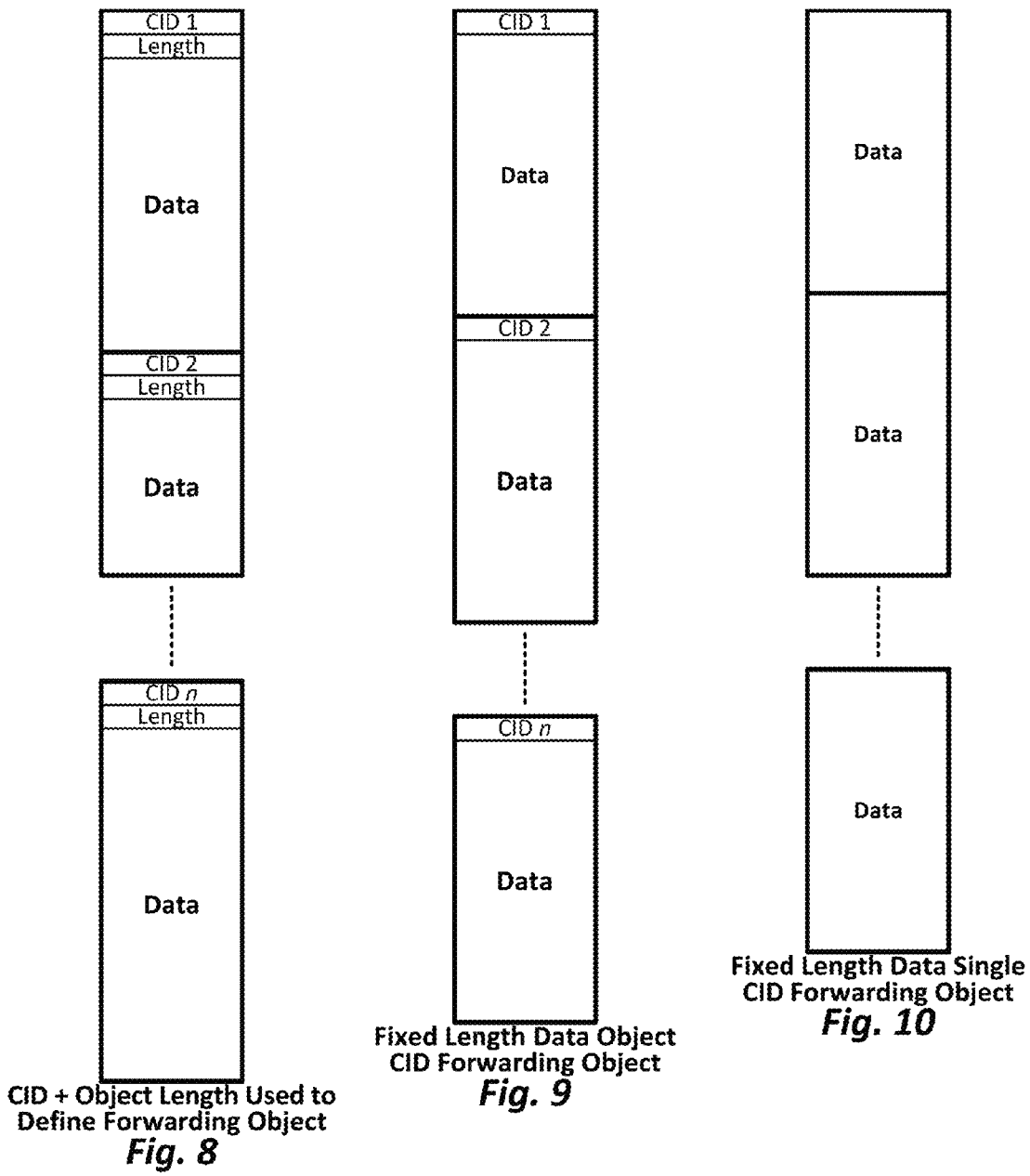

| CID | CTTL | Date:Time |
|---|---|---|
| 72 | 0 | 130309:1008:52 |
| 10 | 1 | 130309:1008:33 |
| 135 | 2 | 130309:1007:05 |
| 224 | 3 | 130309:1007:03 |
| 190 | 4 | 130309:1007:00 |
| 213 | 5 | 130309:0955:47 |
| ... | ... | ... |
| 57 | 250 | 130305:1658:55 |
| 160 | 251 | 130304:0829:01 |
| 177 | 252 | 130301:1542:18 |
| 160 | 253 | 130225:2340:24 |
| 103 | 254 | 000000:0000:00 |
| 109 | 255 | 000000:0000:00 | yyMMdd:HHmm:ss

CTTL Table for Each of 256 Possible CIDs in a Single Position of a Cswitch Selector

*Fig. 12*

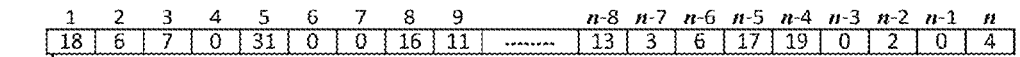

801 Fixed Length Control Vector with *m*-Bit Cellet Messages (Data Only)

*Fig. 13-1*

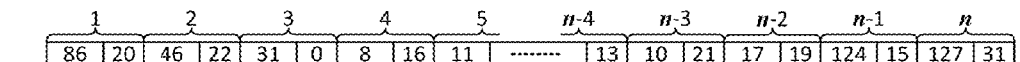

803 CV Cellet Addresses Plus Different Length Cellet Data Messages

*Fig. 13-2*

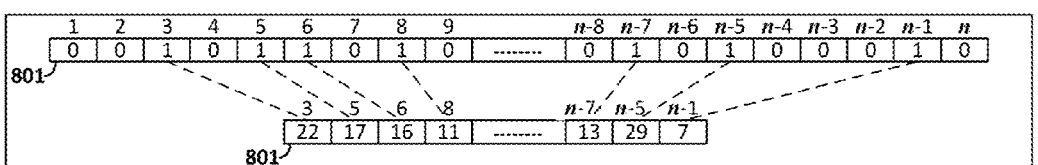

805 Compound Control Vector: 1- Bit Pointer + *m*-Bit Data Messages

*Fig. 13-3*

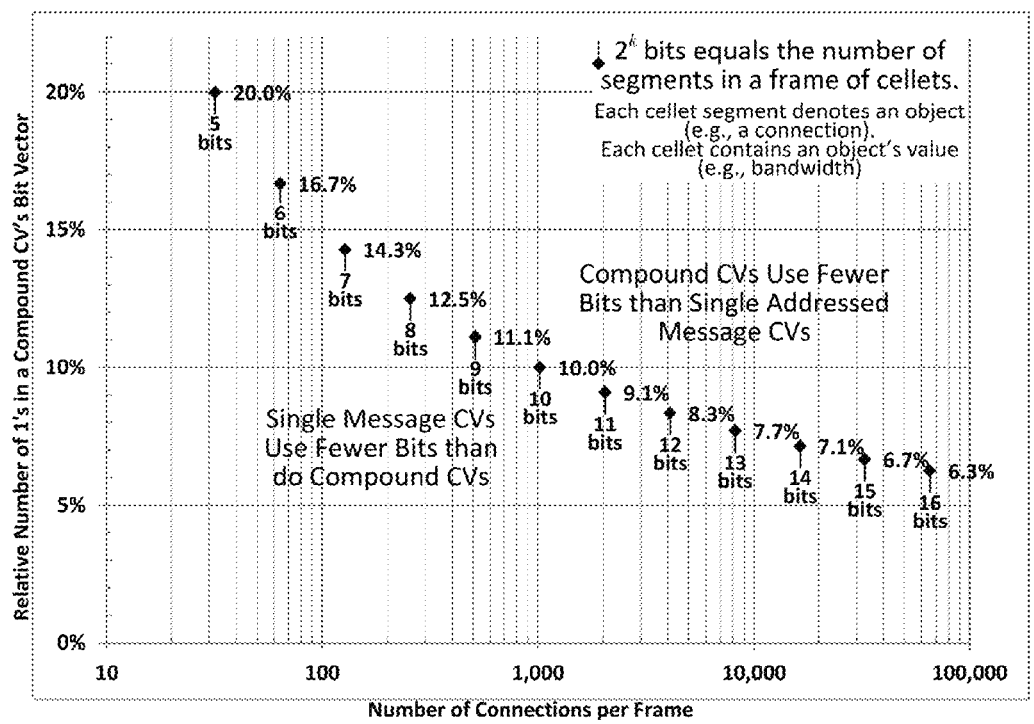

Relative Efficiency of Compound CVs vs Single Message CVs Using *m*-Bit Messages
[Minimum bit vector 1's required (%) for a Compound CV to be more efficient than a Single CV per message]

*Fig. 13-4*

Type 1 SCV1 Table

| Name | Data | Units |
|---|---|---|
| Cellet Size: | 5 | bits |
| Cellet Frame Size: | 128 | cellets |

Total Frame Size (bits) = 640 bits  (a)

Type 2 SCV2 Table

| Name | Data | Units |
|---|---|---|
| Data Size: | 5 | bits |
| Address Size: | 7 | bits |
| Number of Cellets: | 18 | cellets |
| Maximum Number of Cellets: | 128 | cellets |

Total Frame Size (bits) = 216 bits  (b)

CCV Table 1

| Name | Data | Units |
|---|---|---|
| Cellet Size: | 1 | bit |
| Cellet Frame Size: | 128 | cellets |

CCV Table 2

| Name | Data | Units |
|---|---|---|
| Cellet Size: | 5 | bit |
| Number of Cellets (Dynamic): | 18 | cellets |

Total Frame Size (bits) = 218 bits  (c)

Type 2 SCV2 Table

| Name | Data | Units |
|---|---|---|
| Data Size: | 5 | bits |
| Address Size: | 7 | bits |
| Number of Cellets: | 47 | cellets |
| Maximum Number of Cellets: | 128 | cellets |

Total Frame Size (bits) = 564 bits  (d)

CCV Table 1

| Name | Data | Units |
|---|---|---|
| Cellet Size: | 1 | bit |
| Cellet Frame Size: | 128 | cellets |

CCV Table 2

| Name | Data | Units |
|---|---|---|
| Cellet Size: | 5 | bit |
| Number of Cellets (Dynamic): | 47 | cellets |

Total Frame Size (bits) = 363 bits  (e)

*Fig. 14*

Generic Control Vector Forwarding Apparatus

| Width: | 150.0 | x | 85.9 | 47.4 | 60.3 | 91.9 | 117.6 | 128.5 | 114.6 | 80.0 | 19.8 | 58.2 | 102.8 | 135.4 | 158.0 | 161.0 | 172.0 | 133.7 | 95.9 | 63.2 | 26.6 | 4.0 |
|---|---|---|---|---|---|---|---|---|---|---|---|---|---|---|---|---|---|---|---|---|---|---|
| Height: | 150.0 | y | 165.7 | 148.4 | 108.9 | 123.0 | 160.3 | 110.9 | 86.2 | 84.2 | 88.2 | 60.6 | 50.0 | 53.6 | 66.5 | 129.7 | 198.9 | 194.9 | 218.0 | 188.0 | 192.9 | 120.7 |
| x | y | 318 | 1 | 2 | 3 | 4 | 5 | 6 | 7 | 8 | 9 | 10 | 11 | 12 | 13 | 14 | 15 | 16 | 17 | 18 | 19 | 20 |
| 85.9 | 165.7 | 1 | | 248.8 | 367.9 | 217.5 | 165.8 | | | | | | | | | | | | | 278.0 | 200.4 | | |
| 47.4 | 148.4 | 2 | 248.8 | | 233.8 | | | | | | | | | | | | | | | | 247.0 | 291.4 | 317.9 |
| 60.3 | 108.9 | 3 | 367.9 | 233.8 | | 204.1 | | | | 198.5 | 273.6 | | | | | | | | | | | | |
| 91.9 | 123.0 | 4 | 217.5 | | 204.1 | | 281.1 | 217.4 | 265.9 | 226.2 | | | | | | | | | | | | | |
| 117.6 | 160.3 | 5 | 165.8 | | | 281.1 | | 269.2 | | | | | | | | | 330.7 | 415.2 | 226.3 | | | | |
| 128.5 | 110.9 | 6 | | | | 217.4 | 269.2 | | 172.1 | | | | | | | 330.1 | 229.2 | | | | | | |
| 114.6 | 86.2 | 7 | | | | 265.9 | | 172.1 | | 163.3 | | | | | | | | | | | | | |
| 80.0 | 84.2 | 8 | | | 198.5 | 226.2 | | | 163.3 | | | | 214.5 | 238.5 | | | | | | | | | |
| 19.8 | 88.2 | 9 | | | 273.6 | | | | | | | 203.2 | | | | | | | | | | | 215.5 |
| 58.2 | 60.6 | 10 | | | | | | | | | | | 246.2 | | | | | | | | | | |
| 102.8 | 50.0 | 11 | | | | | | | 214.5 | 203.2 | 294.7 | 246.2 | | 161.8 | 158.2 | | | | | | | | |
| 135.4 | 53.6 | 12 | | | | | | | 238.5 | | | | 161.8 | | 158.2 | 295.8 | 357.9 | | | | | | |
| 158.0 | 66.5 | 13 | | | | | | | | | | | | 158.2 | | 295.8 | | | | | | | |
| 161.0 | 129.7 | 14 | | | | | 330.7 | 330.1 | | | | | | | | | 357.9 | | 188.8 | | | | |
| 172.0 | 198.9 | 15 | | | | | 415.2 | 229.2 | | | | | | | | 357.9 | | 188.8 | 272.1 | | | | |
| 133.7 | 194.9 | 16 | | | | | 226.3 | | | | | | | | | | 188.8 | | 272.1 | | | | |
| 95.9 | 218.0 | 17 | 278.0 | | | | | | | | | | | | | | | 272.1 | | | 279.7 | | |
| 63.2 | 188.0 | 18 | 200.4 | 247.0 | | | | | | | | | | | | | | | | 279.7 | | 185.5 | |
| 26.6 | 192.9 | 19 | | 291.4 | | | | | | | | | | | | | | | | | 185.5 | | 423.5 |
| 4.0 | 120.7 | 20 | | 317.9 | | | | | | | 215.5 | | | | | | | | | | | 423.5 | |

A Connectivity and Propagation Latency Matrix of Trunks Between T-Node Pairs Shown in Fig. 5

*Fig. 16*

| Hop # | Source | Dest | Latency | Hop # | Source | Dest | Latency |
|---|---|---|---|---|---|---|---|
| 1 | 1 | 2 | 248.75 | 50 | 8 | 7 | 163.26 |
| 3 | 1 | 3 | 367.86 | 55 | 8 | 10 | 203.17 |
| 5 | 1 | 4 | 217.50 | 26 | 9 | 3 | 273.57 |
| 7 | 1 | 5 | 165.76 | 57 | 9 | 10 | 294.73 |
| 9 | 1 | 17 | 277.99 | 59 | 9 | 20 | 215.54 |
| 11 | 1 | 18 | 200.40 | 56 | 10 | 8 | 203.17 |
| 2 | 2 | 1 | 248.75 | 58 | 10 | 9 | 294.73 |
| 13 | 2 | 3 | 233.84 | 61 | 10 | 11 | 246.16 |
| 15 | 2 | 18 | 247.01 | 52 | 11 | 7 | 214.46 |
| 17 | 2 | 19 | 291.38 | 62 | 11 | 10 | 246.16 |
| 19 | 2 | 20 | 317.86 | 63 | 11 | 12 | 161.79 |
| 4 | 3 | 1 | 367.86 | 54 | 12 | 7 | 238.48 |
| 14 | 3 | 2 | 233.84 | 64 | 12 | 11 | 161.79 |
| 21 | 3 | 4 | 204.11 | 65 | 12 | 13 | 158.17 |
| 23 | 3 | 8 | 198.53 | 46 | 13 | 6 | 330.13 |
| 25 | 3 | 9 | 273.57 | 66 | 13 | 12 | 158.17 |
| 6 | 4 | 1 | 217.50 | 67 | 13 | 14 | 295.80 |
| 22 | 4 | 3 | 204.11 | 38 | 14 | 5 | 330.71 |
| 27 | 4 | 5 | 281.12 | 48 | 14 | 6 | 229.24 |
| 29 | 4 | 6 | 217.41 | 68 | 14 | 13 | 295.80 |
| 31 | 4 | 7 | 265.89 | 69 | 14 | 15 | 357.95 |
| 33 | 4 | 8 | 226.21 | 40 | 15 | 5 | 415.18 |
| 8 | 5 | 1 | 165.76 | 70 | 15 | 14 | 357.95 |
| 28 | 5 | 4 | 281.12 | 71 | 15 | 16 | 188.84 |
| 35 | 5 | 6 | 269.15 | 42 | 16 | 5 | 226.34 |
| 37 | 5 | 14 | 330.71 | 72 | 16 | 15 | 188.84 |
| 39 | 5 | 15 | 415.18 | 73 | 16 | 17 | 272.14 |
| 41 | 5 | 16 | 226.34 | 10 | 17 | 1 | 277.99 |
| 30 | 6 | 4 | 217.41 | 74 | 17 | 16 | 272.14 |
| 36 | 6 | 5 | 269.15 | 75 | 17 | 18 | 279.73 |
| 43 | 6 | 7 | 172.05 | 12 | 18 | 1 | 200.40 |
| 45 | 6 | 13 | 330.13 | 16 | 18 | 2 | 247.01 |
| 47 | 6 | 14 | 229.24 | 76 | 18 | 17 | 279.73 |
| 32 | 7 | 4 | 265.89 | 77 | 18 | 19 | 185.54 |
| 44 | 7 | 6 | 172.05 | 18 | 19 | 2 | 291.38 |
| 49 | 7 | 8 | 163.26 | 78 | 19 | 18 | 185.54 |
| 51 | 7 | 11 | 214.46 | 79 | 19 | 20 | 423.53 |
| 53 | 7 | 12 | 238.48 | 20 | 20 | 2 | 317.86 |
| 24 | 8 | 3 | 198.53 | 60 | 20 | 9 | 215.54 |
| 34 | 8 | 4 | 226.21 | 80 | 20 | 19 | 423.53 |

Hop Table: Source and Destination Node Numbers from Fig. 5 with Assigned Hop Numbers and with Hop Latencies from Fig. RT1

An Example of Hamming Error Correction Codes in a Link Subject to Burst Noise

Fig. 20 Method of Changing Bandwidths of Forwarding Nodes That Requires No Superfluous Bandwidth

*Fig. 21* A Typical Frame Sequence that Uses 16 4100-bit Segments

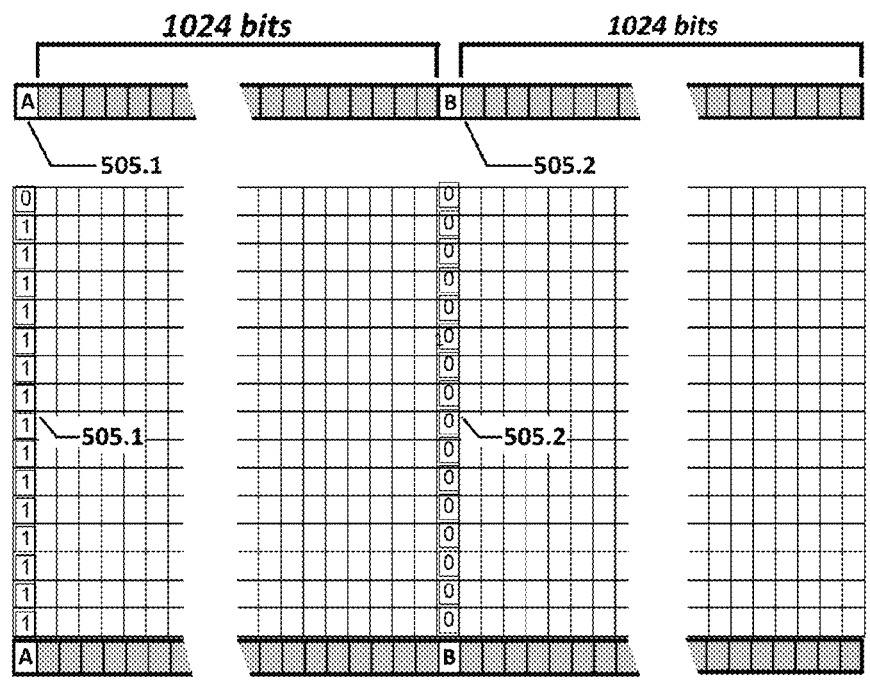
(a)
Course Synchronization Using Ethernet Type Framing
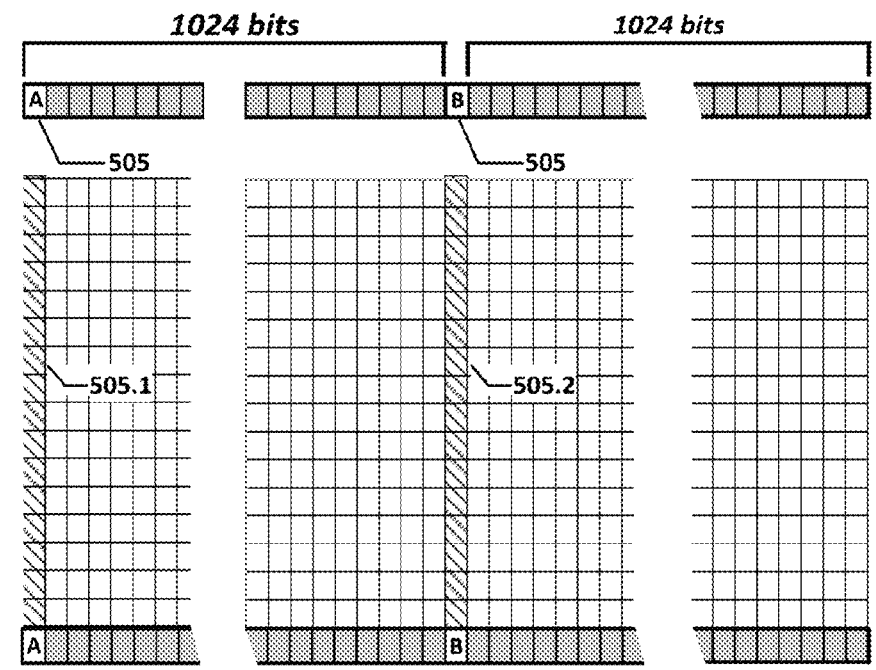
(b)
Fine Grain Synchronization Using *m*-sequences
A Typical Frame Sequence That Uses 16 2050-bit Segments
*Fig. 22*

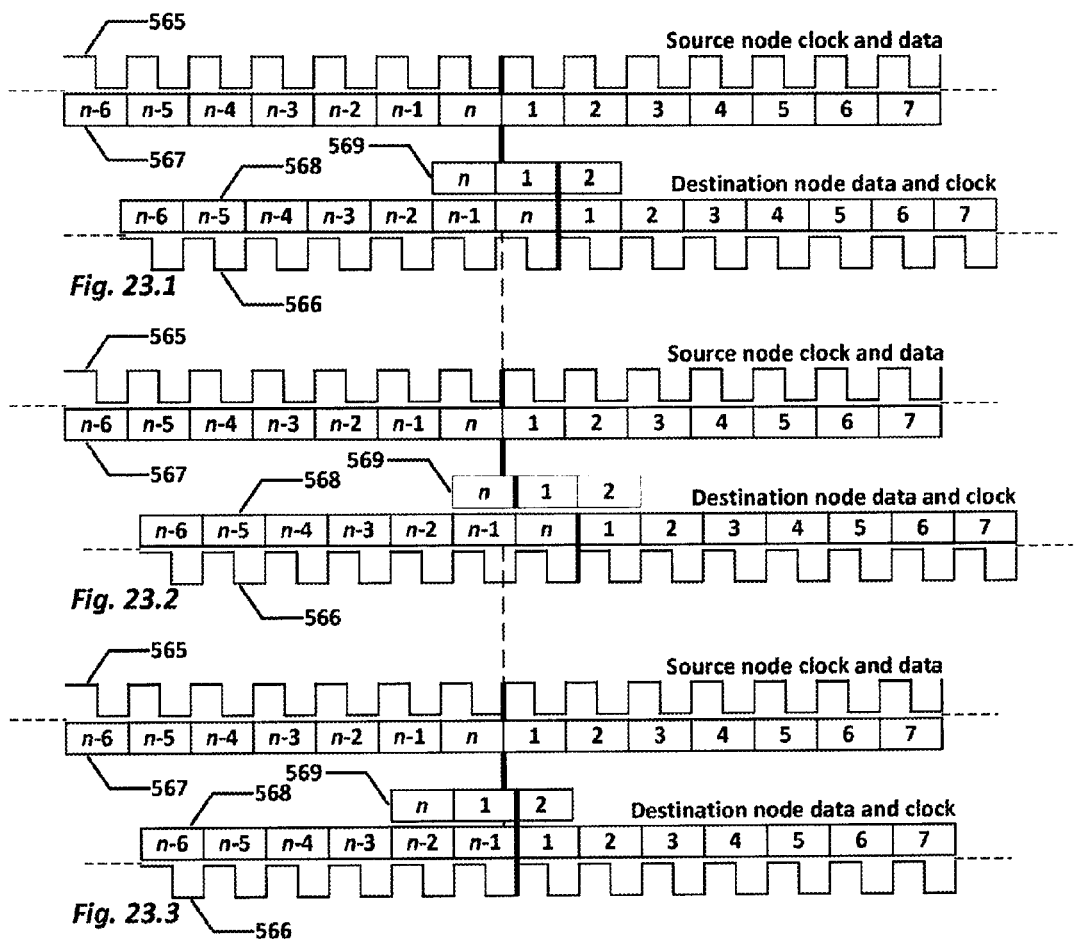
Floating Cframe Jitterless Plesiochronous States Using a 3-Bit Buffer

APPARATUS AND METHODS OF ROUTING WITH CONTROL VECTORS IN A SYNCHRONIZED ADAPTIVE INFRASTRUCTURE (SAIN) NETWORK

RELATED APPLICATIONS

This application is a non-provisional of U.S. Provisional Patent Application No. 61/609,218, filed on Mar. 9, 2012, titled "Apparatus and Method for Synchronized Networks," (herein referred to as RS2) and U.S. Provisional Patent Application No. 61/766,661 filed on Feb. 19, 2013, titled "Apparatus and Method for Synchronized Networks." (herein referred to as RS3) The entire disclosure from both the provisional applications described above is hereby incorporated by reference for all that each contains.

BACKGROUND

The high-level architecture for large-scale data networks has reached a consensus that is not likely to change for the predictable future. The architecture has evolved from forwarding messages and files from one computer to another to a full-blown structure that can carry all types of data traffic globally from any source to any destination. Now that the architecture is agreed upon and implemented in more than one embodiment (e .g., ATM and MPLS), there is a need to find new methods and apparatus to transfer bits reliably with low latency at data rates much greater than currently exist. This application discloses a plurality of methods and apparatus that meets these goals while focusing on simplicity, low cost, and low power consumption.

Starting in the early 1970s, there were two main approaches to applying digital technology to overcome the limitations of analog telephony and telegraphy. One was to build a digital telephone network focused on higher quality digitized voice; the other was to build a digital data network based on store and forward packet switching (P-Switching) with emphasis on reliability at the expense of quality. Packet P-Switching has prevailed because of its flexibility and the huge investment made to improve quality while maintaining flexibility compared to the voice network. The digitized voice effort is approaching obsolescence while the packet P-Switching approach has some serious limitations based on architectural and implementation decisions made long ago.

Four basic methodologies of networks need fundamental review to redefine future networks' capabilities compared to the current networking environment. These are: Data encapsulation methods, Data P-Switching methods, Packet buffering methods, and Traffic routing methods.

The first aspect, data encapsulation, describes methods of fragmenting data into elements transferable from one point to another in a shared container. Sources can be computers, telephones, cameras, microphones, sensors, or other devices as long as they are in digital form.

Data encapsulation is very restrictive in digital voice networks. These digital voice networks are based on "octets" in a digital time division multiplex hierarchy. As implemented, these networks have limited capability to handle data traffic as proven by the telephone company voice-centric networks that exist. Data-centric networks evolved separated from the voice network. These data-centric networks typically encapsulate data into packets. Packet multiplexing adds information to each source data fragment that identifies source and destination locations plus other information. The added information may include service class, data format details, error detection and correction, and other purposes such as network control. In other words, encapsulation involves adding "headers," "options," "error control," and other parameters. Data encapsulation extends to protocol "layers" as a part of packet protocols' standardization methods. Each layer has a name (e.g., Link, Network, Transport, etc.). This can require additional headers and other information. Including protocol layers within a network generally results in longer packets. As a result, these layers often use substantial overhead bandwidth beyond that necessary to transport data.

Data encapsulation using these headers is a necessity in packet-based networks; but the method creates several difficulties. One is the bandwidth needed by the required packet overhead. Another is the delay required to fill a packet buffer with bits from relatively low data rate sources such as digitized voice. The process of encapsulating voice requires tens of milliseconds to overcome the even greater header bandwidth that would be required to send shorter voice packets. In addition, packet buffers within routers are needed to smooth traffic that can result in delay variation and jitter. Still another difficulty is that even a single bit error in a packet header can cause faulty delivery and/or discard of packets. The consequence is interruption of service and data loss that causes delay in addition to requiring substantial processing within routers to re-forward discarded packets. This application discloses methods of overcoming these restrictions.

A second aspect, C-Switch (C-Switch) methods, is quite simple in the voice network, but its encapsulation methods limit use of the network for data. In the data network, using asynchronous P-Switching methods to forward packets from one destination to another was a breakthrough for assuring message delivery with statistical time division multiplexing (as long as substantial overprovisioning of bandwidth is present). The methods assure delivery from a source to a destination in a network with faulty transmission facilities or under hazardous operational conditions. They also assure more efficient use of available bandwidth than exists with static time division multiplexing. However, the circumstances that were common forty years ago are no longer very common today. Comparing statistical multiplexing with static time division multiplexing is a popular way to "prove" the benefits of packet over circuit C-Switching. This overlooks the prospect that time division multiplexing can be extremely dynamic if properly designed. These designs are shown in the present application.

In the past, time division multiplexing was limited in several ways. One was a perceived restriction to integer division of a high data rate link into a plurality of smaller data rate links. Another was that a connection set up as a circuit remained connected for the duration of a telephone call; no mechanism existed to restrict a circuit epoch to milliseconds, microseconds, or nanoseconds necessary for handling bursty data. Third, no methods existed to rapidly change the bandwidth allocated to a connection, a mandatory requirement to achieve efficient use of available bandwidth for multimedia and video applications.

Placing data into "packets" emerged as a part of the solution to overcome the limitations of "one-off" systems such as the telephone network. Data packets will continue to be a great invention for the predictable future. The Internet Protocol has indeed become the lingua franca for all user communications. In this context, using the slogan "IP everywhere" to refer to the network edge is a great idea. Whether it should apply to network internals for the future is highly questionable. The objective of this application is to provide the next generation with an internal network for the IP-centric Internet and other networks that overcomes the shortcomings of current practice.

There is no law of nature demanding that the random (i.e., stochastic) nature of user data arrivals require stochastic network solutions. The complexity of overcoming the stochastic properties of asynchronous packet networks with extensive overlays is sufficient evidence of the need for another solution. This disclosure provides methods to reduce network complexity and improve C-Switching performance.

The third aspect of current networking is the placement of packet buffers within today's networks. When the Internet was first invented (as the ARPANET within the U.S. Department of Defense), the smallest computers in service were minicomputers. Microcomputers did not exist in commercial use with substantial processing power. Commercial input/output devices were terminals that had no significant processor or storage capability. The best possible methods at the time for dealing with "bursty" data was to accept all data on arrival within the minicomputers when there was not enough communication bandwidth to send it as it arrives. The initial answer, like message switching store and forward processors, was to store data within internal First-In-First-Out (FIFO) buffers. If the buffers were too small to hold all the incoming traffic, discarding packets selectively became a method of choice for solving congestion problems. Cost was the primary driving parameter to this result. Computer data storage was very expensive. As computer data storage has become very inexpensive, packet buffers have also grown.

Internal network buffers exacerbate the stochastic nature of current networks and greatly increase network complexity, jitter, delay, packet loss rates, and cost. The side effects include requiring traffic shaping and policing a customer's use of bandwidth. Internal network buffers are often the culprits of poor service. When traffic intensity is high, they suffer from congestion when there is more traffic than a router or outgoing links can handle. Discarding packets as a remedy requires data sources to resend the lost packets. This only intensifies the traffic when traffic intensity was the cause of the congestion in the first place. Today, large computer storage units—semiconductor as well as hard drives—are cheap. They can exist at ingress ports without discarding packets. Even so, the original approaches to congestion still prevail in current network architectures. Certainly, it is hard to argue that inside-the-network buffers enhance Quality of Service or performance; they merely result in stochastic "best efforts" service with unpredictable performance. These buffering problems have recently been termed "buffer bloat" and identified as causes for network delay and causes for some high latency. Question: "Are we still using the same methods because 'that's the way we've always done it', or are there real operational and cost reasons that require placing buffers inside the data transport portion of networks?" The deficiencies and delays of current networks can be improved by the methods provided in this disclosure.

The fourth aspect of both packet- and circuit-switched networks is their focus on dynamic routing of connections. Packet-switched networks focus on interconnecting "autonomous systems" through border gateways in a predominantly flat network. Circuit-switched (voice) networks focus on large (Class 4 and Class 5) C-Switch in what was originally a five-tier hierarchy that narrowed down over time to just two tiers. Network architectures have demanded the use of dynamic routing of connections. There has been no simple alternative to overcome the so-called n-squared problem of connecting hundreds of million (and now rising toward hundreds of billions) of connectable entities with one another. [If n is the number of connectable entities, there must be n−1 connections available to allow each entity to connect to every other entity. The required number of connections is n×(n−1) that is, for large values of n, close to "n-squared," a well-known source of network routing problems.] General background for this disclosure includes U.S. Pat. Nos. 5,502,723 and 6,041,050 relating to Synchronized Adaptive Infrastructure (SAIN) networks issued to the application's inventor. This application incorporates these patents in their entirety by reference. The patents describe apparatus and multiplexing methods with unique capabilities that establish communications channels within a transmission link quickly. Unlike other known capabilities, the approach enables fast connection setup and release plus quickly changing the bandwidth of connections as well.

There is a need in the art for techniques to switch and send data in an underlayer structure that focuses on overcoming the current art limitations listed above in the four aspects along with other aspects of networking.

SUMMARY

In one embodiment, a method of addressing a first space/time stream of data to facilitate its timely and accurate transmission to an address. The method includes clustering a first stream of data into one or more space/time frames in a connection domain comprising multiple connections, said frames having variable lengths. In one embodiment, the method further comprises the step of forming a super frame in the connection domain by adding one or a plurality of cellets for each frame within the first data stream, including a cellet for the beginning frame of the first data stream. Moreover, the method can also comprise the step of transforming the super frame, by a computing system comprising computer hardware, to form an implicitly addressed second space/time stream of data in a space/time domain. The method can further include the step of using the implicitly addressed second space/time stream of data to identify which data belongs to which of the multiple connections, and thereby providing timely and accurate transmission to the address.

BRIEF DESCRIPTION OF DRAWINGS

FIGS. 4.1, 4.2, 4.3 show various configurations of E-Nodes and their T-Node parents according to certain embodiments.

FIG. 5 shows a metropolitan area network example with 20 T-Nodes & 80 simplex trunks according to an embodiment.

FIG. 6.1 shows source E-Nodes connecting to parent T-Node T3 according to an embodiment.

FIG. 6.2 shows forwarding switches in a SAIN architecture according to an embodiment.

FIG. 6.3 shows a cross-connect switch according to an embodiment.

FIG. 6.4 illustrates a T-Node T7 level 4 forwarding switches connectivity diagram according to an embodiment.

FIG. 6.5 shows forwarding switches in a SAIN architecture according to an embodiment.

FIG. 6.6 shows destination E-Nodes connecting from parent T-Node T11 according to an embodiment.

FIG. 8 shows a (connection identifier) CID+ object length used to define forwarding object according to an embodiment.

FIG. 9 shows fixed length data object CID forwarding object according to an embodiment.

FIG. 10 shows fixed length data single CID forwarding object according to an embodiment.

FIG. 11 shows model CID template according to an embodiment.

FIG. 12 shows CTTL table for each of 256 possible CIDs in a single position of a C-Switch selector according to an embodiment.

FIG. 13-1 shows a fixed length control vector with m-Bit cellet messages (data only) according to an embodiment.

FIG. 13-2 shows a CV cellet addresses plus different length cellet data messages according to an embodiment.

FIG. 13-3 shows a compound control vector: 1-bit pointer+ m-bit data messages according to an embodiment.

FIG. 13-4 shows a relative efficiency of compound CVs vs. single message CVs using m-bit messages [minimum bit vector 1's required (%) for a compound CV to be more efficient than a single CV per message] according to an embodiment.

FIGS. 13-1, 13-2, 13-3, and 13-4, as described in the preceding paragraphs, show various embodiments of control vectors.

FIG. 14 shows in a tabular format more embodiments of control vectors.

FIG. 16 shows a connectivity and propagation latency matrix of trunks between T-Node pairs shown in FIG. 5 according to an embodiment.

FIG. 17 shows a hop table: source and destination node numbers from FIG. 5 with assigned hop numbers and with hop latencies from according to an embodiment.

FIG. 19 shows an example of hamming error correction codes in a link subject to burst noise according to an embodiment.

FIG. 22 shows a typical frame sequence that uses 16 2050-bit segments according to an embodiment.

FIGS. 23.1-23.3 show a floating C-Frame jitterless plesiochronous states using a 3-Bit buffer according to an embodiment.

DETAILED DESCRIPTION

This application will use the following terminology: 1) A circuit-based network is called a Network and a packet-based network is called a P-Network; 2) a circuit-based switch is called a C-Switch; a packet-based switch is called a P-Switch, such as an Ethernet 'switch'; and 3) a circuit-based frame is called a C-Frame; a packet-based frame (such as an Ethernet frame) is called a P-Frame. A network based on SAIN principles can carry data packets and other forms of communication from one node to another in a universally applicable circuit-based format. Switching in a SAIN network uses small data elements call cellets that are placed in space/time division frames. The position of each cellet within a frame defines the connection to which the cellet belongs. [This method of forwarding data connections is called implicit addressing.]

Figure 1:
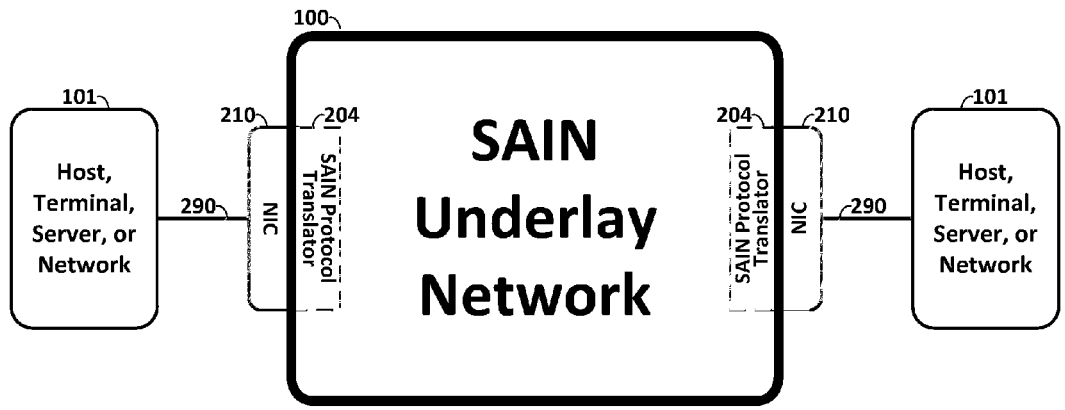
FIG. 1 shows a bright line separation of user data from data transport and network control according to an embodiment.

FIG. 1 in this application is described in the following patent application (referred herein as "RS1"): U.S. Pub. No. US 2012/0030360, filed Jan. 25, 2011, titled "Apparatus and Method for Synchronized Networks," the disclosure of which is hereby incorporated by reference in its entirety. The SAIN Underlay Network 100, Host, Terminal, Server, or Network 101, and User Interface Connection 290 remain unchanged from RS1.

The SAIN Protocol Translator 204 is not a physical or software apparatus. It represents a process that is carried on using apparatus disclosed in more detail herein.

NIC 210 means 'Network Interface Controller'. Using the term NIC makes this application more understandable to those of ordinary skill in the art, but it has specialized functionality in SAIN architecture. [In networking literature, this terminology is often used for the acronym as is used herein; however, in many instances the term NIC is used to mean 'Network Interface Card'.]

The purpose of the FIG. 1 is to show a unique attribute of a SAIN Network. A connection in a SAIN Network acts as a pair of dynamically-variable-data-rate modems that can interconnect a pair of NICs. The pair of NICs need to respond only to those protocols necessary for a given set of applications. This attribute makes a SAIN Network much simpler than many current networks. [A pair of NICs can adjust parameters to support additional or different sets of applications.]

Figure 2:
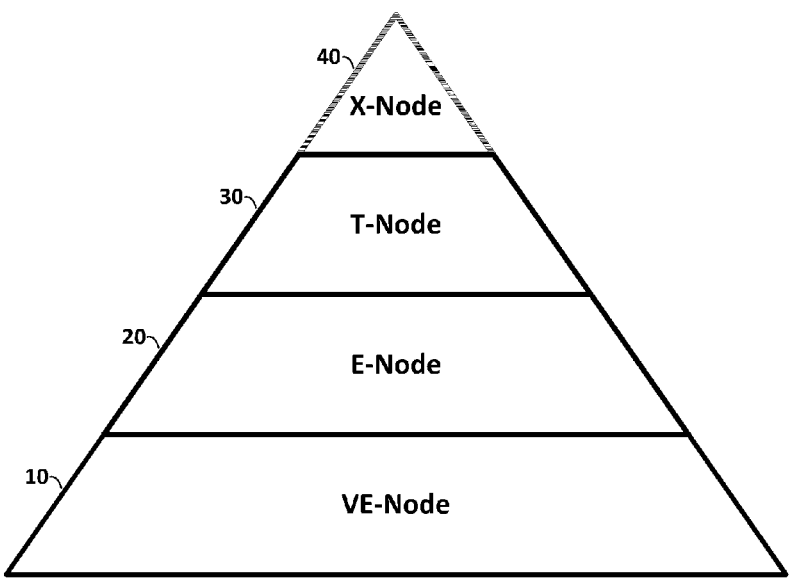
FIG. 2 shows a diagram of hierarchical core network tiers using SAIN technology according to an embodiment.

FIG. 2 shows an E-Node Tier 20, T-Node Tier 30, and X-Node Tier 40. In addition, FIG. 2 of this application includes a Virtual E-Node tier labeled VE-Node Tier 10 below the E-Node Tier 20. The purpose of this node is to be able to aggregate a large plurality of User Interface Connections 290. The VE-Nodes' NICs 210 can access an expanded SAIN Underlay Network 100 disclosed below.

Figure 3:
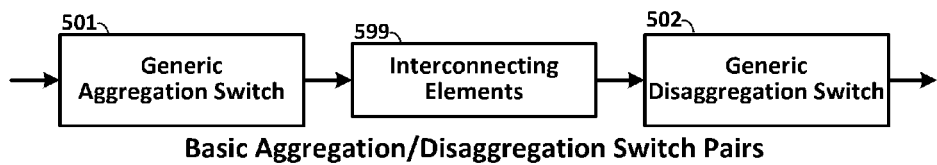
FIG. 3 shows basic aggregation/disaggregation switch pairs according to an embodiment.

FIG. 3 shown as FIG. 13 in RS1. The figure shows important fundamental elements of a SAIN Network disclosed in substantial detail in RS1. A Generic Aggregation C-Switch 501 and Generic Disaggregation C-Switch 502 can be called a Generic A/D C-Switch Pair 503. Interconnecting Elements 599 are generally links within trunks between network aggregation and C-Switching nodes. Trunks carry only multiplexed aggregations using the SAIN multiplex transform algorithm described in detail in RS1. Packets and other user protocols exist only within NIC connections to a SAIN Network. Embodiments herein disclose further apparatus and methods that make use of the previously disclosed art in RS1.

FIG. 5 shows a revision of FIG. 16 in RS1. In a two-tier portion of the Network involving E-Nodes and their parent T-Nodes, there are three variations. The simplest version is shown in FIG. 4.3. It shows a single E-Node 200 that can contain a pair of NICs 210 and a Path A/D C-Switch Pair 513. [In other words, a Path Aggregation C-Switch 511 in a Source E-Node 201 connects to a Path Disaggregation C-Switch 512 in a Destination E-Node 202. Normally, each E-Node 200 contains a plurality of both Path Aggregation C-Switch 511 and Path Disaggregation Switch 512 C-Switches. If a connection is made between two NICs in the same E-Node, the connection could be either simplex or duplex. If it is duplex, a single Path A/D C-Switch Pair 513 could carry traffic in each direction. As described below, a VE-Node 180 behaves in the same as an E-Node 200 with different reference numbers.]

FIG. 4.3 requires no T-Node 300; FIG. 4.2 requires a single T-Node 300 with a plurality of E-Nodes 200. The Source E-Node 201 in each E-Node 200 connects through a parent T-Node 300 to a Destination T-Node 302, also connected to the parent T-Node 300. In this case, the parent T-Node 300 acts both as a Source T-Node 301 and a Destination T-Node 302, i.e., as an A/D T-Node Pair 303.

FIG. 4.1 has a plurality of E-Nodes 200 attached to a Source T-Node 301 of one parent T-Node 300 that connects to a Destination T-Node 302 of another T-Node 300 parent in a Network.

FIG. 5 a model mesh network of T-Nodes. It was described in detail with respect to FIG. 8 in RS1.

Figure 6:
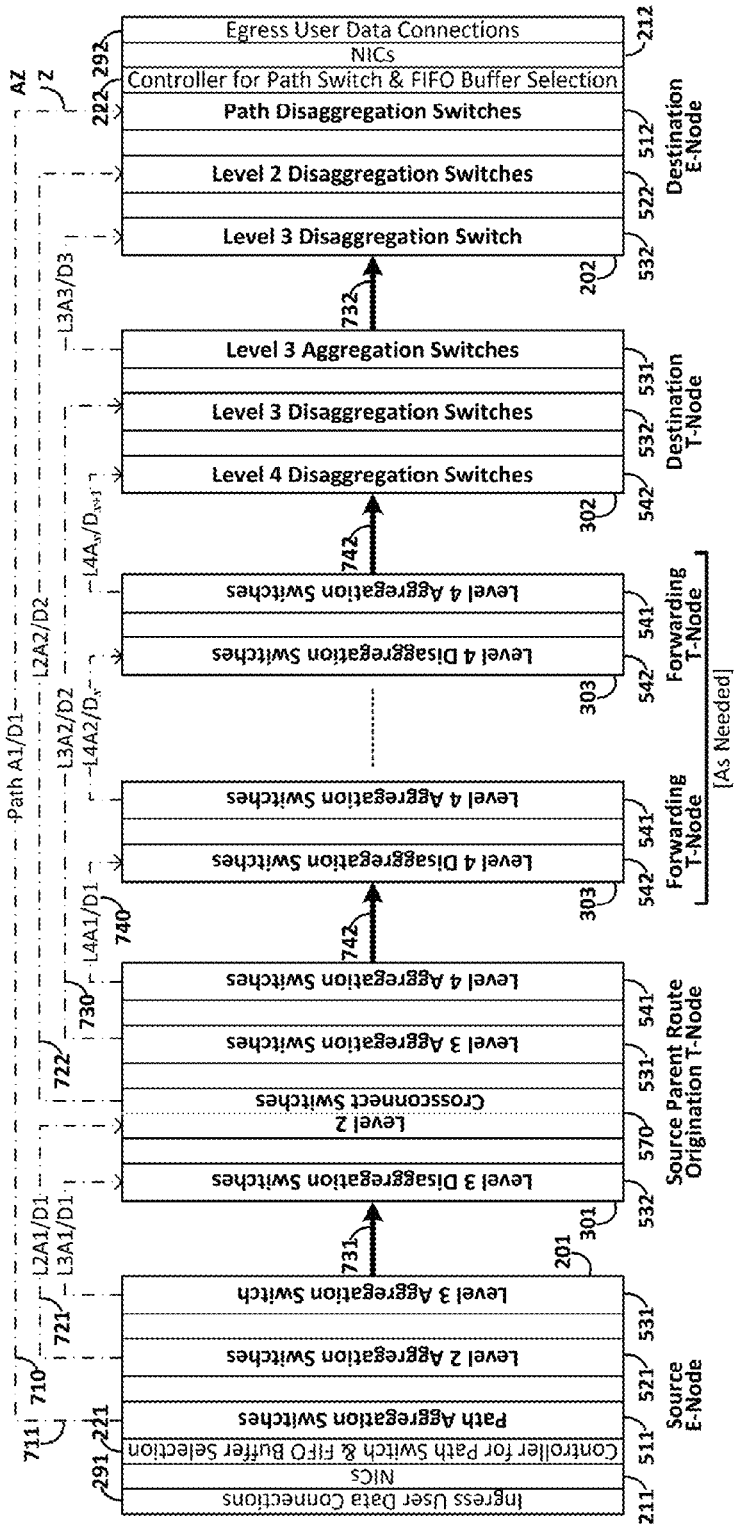
FIG. 6 shows an illustration of network objects used to pass user data from a source E-Node to a source parent (routing) T-Node through forwarding T-Nodes (as needed) to a destination parent T-Node to a destination E-Node according to an embodiment.
Figure 21:
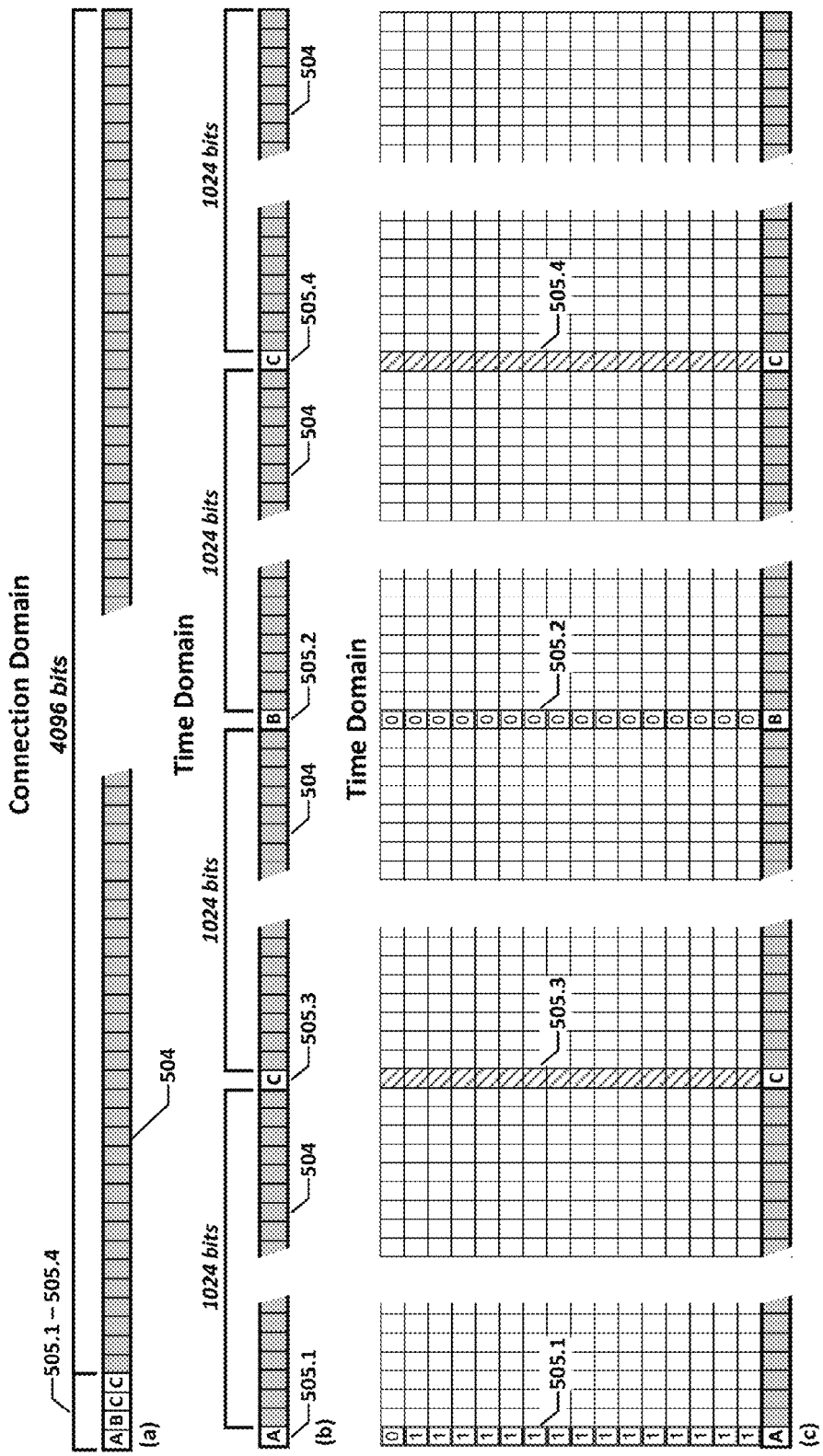
FIG. 21 shows a typical frame sequence that uses 16 4100-bit segments according to an embodiment.

FIG. 6 is an update of FIG. 21 in RS1. Its main differences are that it includes forwarding nodes plus more detail for other apparatus. Implications of the additions are included in disclosures in this application.

Fundamental Structure of a SAIN Network

Although other structures could be used, the hierarchical structure shown in FIG. 2 is the basis used in this application. In addition, in order to make this application more understandable, an addressing structure is used for the hierarchy. Adapting such an addressing method can simplify the separation of data forwarding and switching from data storage and application processing.

Methods that Produce a Network that Supports Both Deterministic and Stochastic Data The nature of data traffic has changed dramatically from the time that the Internet was invented some 40 years ago. Packet-based data forwarding was the solution to what the telephone companies' network had produced as a solution to voice-only communication. Telephone companies believed that voice communication would always be their main business. Data communication was looked on as a very minor part of the future of communications, and it could be handled by using analog modems attached to the voice network. A digital switching structure was based on building a global voice network that was circuit-based. Over time, it was conceded that the voice network could handle a fixed set of data rates for data communication using the voice network's switching apparatus that could set up connections that would last for fairly extended periods. Such an approach was reasoned by the telephone companies to be an adequate manner to handle user data from one data source to a data sink. They were wrong.

P-Switching was invented to overcome the perceived shortcomings of the voice network's design using minimalist design principles—asynchronous P-Switching, packet discard in case of overloaded buffers within a network, end points that had to deal with out-of-order packets, priority-based preference given to forwarding one kind of packet with another without clear rules, and are among issues. It has been a great success with many bright people contributing to its development. Unfortunately, the original minimalist ideas have resulted in a very complex overlay structure that has tackled issues such as those noted.

To a large degree, the initial focus was to be able to deal with 'bursty' data—in other words, with data arrival times being unpredictable. As traffic density grew, a number of problems grew with it. These were classified as Quality of Service issues that included traffic congestion with packet loss, jitter, delay variation, out-of-order packet delivery among other problems. One of the 'cures' to overcome problems to some degree has been the implementation of 'circuit emulation' to carry the traffic flows. This is more than a clue to the networking's future. Today's traffic is mostly 'flow-based', a dominate use case that demands simple circuit-based capability. Circuit Emulation in a P-Network cannot come close to matching a SAIN Network's simplicity and scalability to extremely high data rates.

The fundamental reason that telephone-company-type C-Switching was never seriously considered for data service was that, once a connection is set up, its bandwidth could not be changed. A method of overcoming this limitation is the basis of U.S. Pat. No. 5,502,723 and its continuation U.S. Pat. No. 6,041,050 used in SAIN Networks, the disclosures of which are hereby incorporated by reference in their entirety. These documents show simple methods of achieving desired results. There are other algorithmic methods that could be used as a SAIN multiplexing transform for a SAIN Network, but the methods shown in the patents are now open source and simple.

Data communication needs are very different from forty years ago. Data traffic is increasing exponentially and most of it is very circuit-oriented video and streaming data. Building a network with synchronized nodes can overcome P-Switching's Quality of Service issues if the data delivery mechanism uses circuit-based methods. The SAIN approach overcomes QoS issues along with scalability, reliability, availability, energy efficiency, and many performance issues. The only QoS metric that can remain is packet delay that can be adjusted to meet a user's needs. In other words, needs vary by the amount of time required to deliver a packet from source to destination network port. All methods must take into account propagation delay in addition to network delay. Added to this delay, high frequency trading can require one microsecond or less; sending real-time two-way voice and video conversation can require 10 milliseconds; sending video can require once second; sending large files from one place to another can the scheduled to take place in minutes or hours. These variations can be cost-based from a user's point of view and provide a service provider with profitable cost-effective rates.

Disjoint Partitioning Methods in a SAIN Network

Partitioning a network into a plurality of two-point connections between objects can greatly simplify the architecture of a Network. (A list of such objects is enumerated starting in paragraph 82.) Minimizing semantic connectivity between Network objects not only minimizes complexity, but can also enhance Network security and other aspects of networking. Controlled semantic connectivity can be achieved by assuring that each object in a Network is semantically disjoint from every other object except for a limited number of semantic connections that can be easily certified as being authentic. Such connections can be implemented using Control Vectors (CVs), described below, as unique system objects that can support specific functionality disclosed in this application.

Disjoint partitioning in a SAIN Network can make use of the following:

1. Physical objects and their states: Each physical object in a SAIN Network is disjoint from every other physical object if it has no semantic connection to the other physical object. More specifically, two objects are disjoint as long as a change of state of one of the objects does not result in a change of state of the other object.

2. Synchronized State Objects: A semantic connection of two objects with states synchronized to one another can control one or a plurality of system processes. The objects including their space/time synchronized states can define a new disjoint object. A Control Vector (disclosed in detail below) can accomplish the synchrony of states by sending one or a plurality of messages over a communication facility between source and destination objects.

Assuring that parts of any network are disjoint from other parts of the network is an important capability that is critical to achieving superior privacy and security in any network. This capability cannot depend on packets being physically disjoint in P-Networks. Each packet contains address forwarding information that cannot be physically disjoint as the packet finds its way through a network. In other words, a key requirement for forwarding packets in a P-Network is to include an address, label, or tag that enables routing of packets. In current P-Network P-Networks, this capability can make use of cryptographic methods and dividing the P-Network into a logically layered structure. In this architecture, there is a plethora of overlay protocols invented for this purpose. This resulted in enormous complexity that increases exponentially with the continuing invention of more overlay protocols that affect an entire P-Network. Assuring that a portion of a P-Network is truly disjoint can be very difficult. In a Network, assuring that objects are disjoint has positive ramifications related to a Network's ability to enforce user and provider privacy and security.

There are at least three fundamental differences between a SAIN Network and current practice. These are:

1. A SAIN Network separates data transport in implicit address form among Network nodes from everything else as an underlayer. The underlayer is independent of user and other P-Network protocols, but can support them semantically. Management of the underlayer occurs only at SAIN nodes so that data sources and protocols outside a SAIN Network boundary cannot penetrate into a SAIN Network's control plane. A SAIN Network Interface Controller (NIC) at an ingress point can communicate only with a compatible NIC at one or more egress points. These points allow semantic connectivity between existing P-Network objects.

All nodes within a SAIN Network synchronize timing to a common source with all other nodes within an underlayer Network. In one embodiment, the plurality of nodes interconnects with Coordinated Universal Time (UTC) sources that are widely available in most countries. This assures that they synchronize with other Networks. Independent Networks without UTC access and P-Network objects can interconnect through a SAIN Network using plesiochronous timing methods.

All objects within a SAIN Network, as defined starting in paragraph 82 below, can be disjoint from every other object. This fundamental feature has the following benefits:

Control of a connection within a SAIN Network makes use of Control Vectors (CVs), disclosed below, that can be disjoint from data traffic and each other. CV aggregations involving node pairs can use routes that are disjoint from those that carry traffic.

User data packets and other traffic do not exist explicitly within a SAIN Network; they exist only at ingress and egress NICs. In other words, NICs manage ingress and egress protocol compatibility. They hand off information to a SAIN controller that enables setting up end-to-end modem-like connections between ingress source nodes and egress destination nodes.

Network security enhancements exists in at least two ways:

No Network object can cause a state within another object to change without using a CV or equivalent method to connect an object pair. CVs or equivalents affecting object connectivity can be under the sole control of a SAIN source object within the operational boundary of a SAIN Network.

SAIN Network topology can be location-centric insofar as connectivity is concerned. Measurement of delay and bandwidth availability between two nodes in a SAIN Network is measurable on a real-time basis. In other words, measurement of the parameters can occur in epochs where Network controllers can set the epoch periods. This capability enables a source node to determine that the electrical distance remains within known bounds.

The Roles of Disjoint Objects of a SAIN Network

The following sections define some of the objects usable in a SAIN Network.

a. Disjoint Physical Objects of a SAIN Network

A physical object can have one or a plurality of states. As long as its state(s) are independent of state(s) in other objects, the physical object is disjoint from other objects. Such physical objects can exist within and among category types that include but are not limited to the following:

1. Ingress/Egress ports to users, terminals, and other P-Networks and Networks
2. Ingress/Egress NIC pairs
3. Trunks to and between SAIN Network objects [A trunk is a physical connection independent of any logical connectivity.]
4. First-In-First-Out (FIFO) Ingress/Egress buffers and cellet forwarding buffers inside a network [A cellet is a quantum of forwarded traffic within a trunk or link that can be as large as many bytes and as small as one bit. The choice of the quantum size need not be network-wide; it is local in a semantic sense of connected object pairs.]
5. SAIN C-Switches (Path Level 1, Aggregation Level 2, Aggregation Level 3, and forwarding Level 4)
6. SAIN Crossconnect Switches
7. Semi-conductor and optical gates
8. CV Controllers
9. Network controllers
10. VE-Node physical structures
11. E-Node physical structures
12. T-Node physical structures
13. X-Nodes physical structures
14. Other physical structures to aid in interconnecting VE-, E-, T-, and X-Node domains as needed b. Disjoint Logical Objects of a SAIN Network Logical objects of a SAIN Network can include but are not limited to:

1. Local and global addresses of physical objects within and attached to a network
2. Connectivity tables
3. Location tables of physical and logical objects
4. Tables of loop-free routes among a set of Network nodes c. Software Objects of a SAIN Network The software objects of a SAIN network can include but are not limited to:

1. Control Vector setup and instantiation software
2. Control Vector management and change software
3. Bandwidth management software
4. Routing management software
5. Network management software
6. Network recovery software 2. Data Aggregation and Disaggregation Methods FIG. 6 shows details of Level 4 L4 Aggregation Forwarding C-Switches 541 in Source T-Node 301 and Forwarding T-Nodes 303. It also shows L4 Disaggregation Forwarding C-Switches 542 in Forwarding T-Nodes 303 and a Destination T-Node 302. FIG. 6 companion drawings are updates from RS1 drawings FIG. 19, FIG. 20, FIG. 21, FIG. 22a, FIG. 22b, FIGS. 23.1-23.3, FIG. 24, and FIG. 25.

Figure 7:
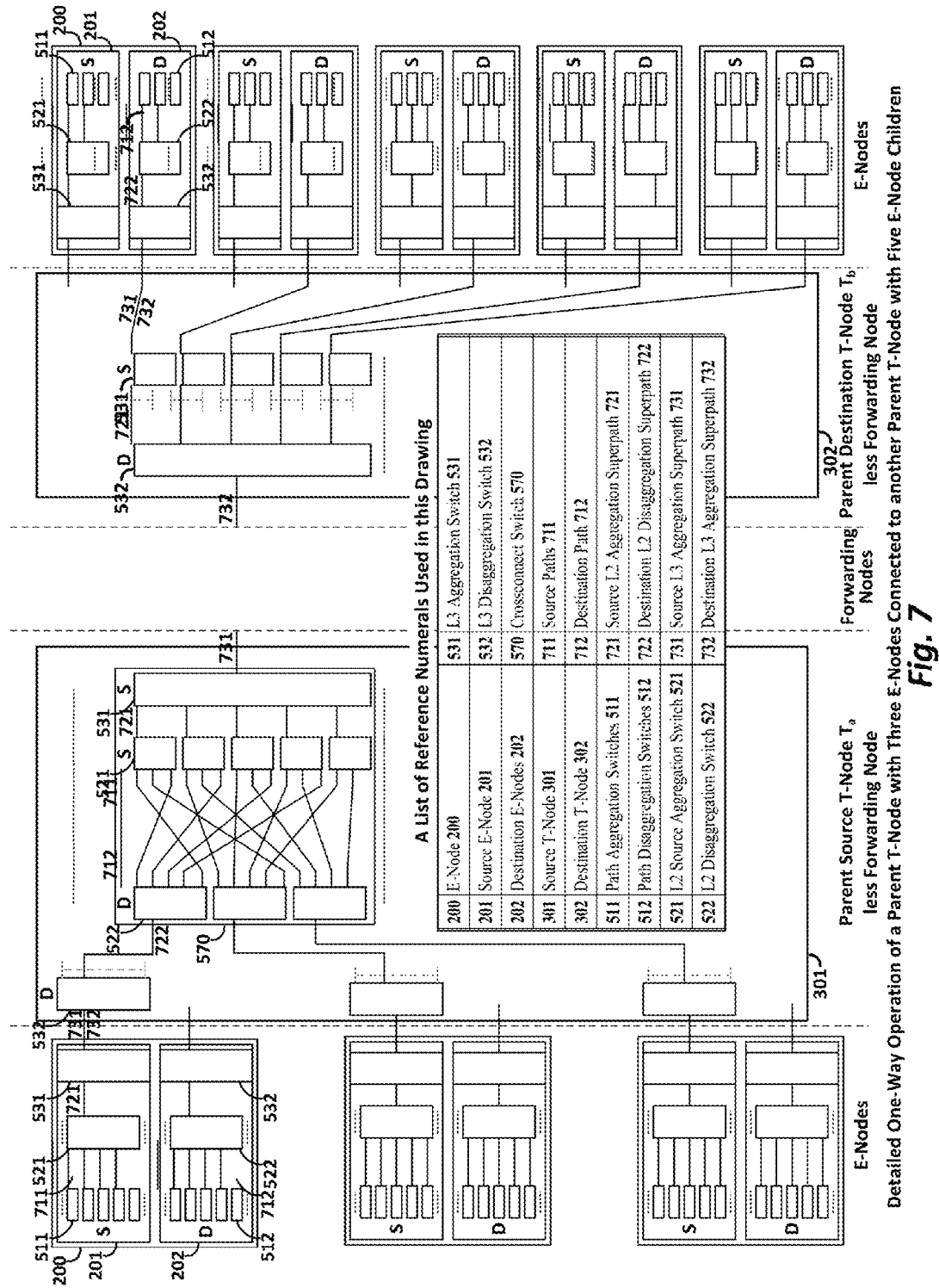
FIG. 7 illustrates an operation of a parent T-Node with three E-Nodes connected to another parent T-Node with five E-Node children according to an embodiment.

FIG. 7 shows enhanced details of methods disclosed in RS1 involving SAIN network data aggregation nodes that connect to Level 4 L4 A/D Switch Pairs 543. The figure shows a network with three E-Nodes 200 connected to a parent Source T-Node 301. The Source T-Node 301 connects to a Destination T-Node 302 that has five Destination E-Node 202 children. In order to describe details of operation of data aggregation and disaggregation methods with clarity, the figure shows details of only one Source E-Node 201. The parent of Source E-Node 201 is Source T-Node 301. Source T-Node 301 is connected to a Destination T-Node 302, and Destination T-Node 302 has five Destination E-Node 202 children. In each of the three Source E-Nodes 201, there are five Path Aggregation Switches 511 corresponding to the five Destination E-Nodes 202. Each Path Aggregation Switch 511 represents a connection between a Source E-Node 201 and a Destination E-Node 202. There are 15 Path Aggregation Switches 511 carrying traffic from three Source E-Nodes 201 to five Destination E-Nodes 202. Each Destination E-Node 202 has three Path Disaggregation Switches 512 corresponding to the three Source E-Nodes 201. Each Path Aggregation Switch 511 in one of the Source E-Node 201 matches a Path Disaggregation Switch 512 in each of the Destination E-Nodes 202 whose parent is the Destination T-Node 302.

Each Path Aggregation Switch 511 generates a Source Path 711 that connects to a Level 2 L2 Source Aggregation Switch 521. The number of L2 Source Aggregation Switches 521 in a Source E-Node 201 equals the number of E-Nodes 300 in the network. In the model network shown in FIG. 6, there are 20 E-Nodes 300 in a network resulting in 20 L2 Source Aggregation Switches 521 in the network. The much smaller network shown in FIG. 7 details only one Source T-Node 301 connecting to one Destination T-Node 302 for simplicity of explanation.

In FIG. 7, the output of each L2 Source Aggregation Switch 521 is a Source L2 Aggregation Superpath 721 containing all traffic originating in a Source E-Node 201 that passes through a particular Destination T-Node 302. In the case shown, the L2 Source Aggregation Switch 521 aggregates five Source Paths 711 in the L2 Source Aggregation Switch 521 shown. Each of the three Source E-Nodes 201 has five Path Aggregation Switches 511 to carry traffic to each of the five Path Disaggregation Switches 512 that exists in one of the five Destination E-Nodes 202. Each Path Aggregation Switch 511 aggregates all data entering ingress NICs in a Source E-Node 201 destined for a particular Destination E-Node 202 associated with paired egress NICs.

Since the Source E-Node 201 in FIG. 6 has 20 L2 Source Aggregation Switches 521 for the model network, they generate 20 Source L2 Aggregation Superpaths 721. To carry these 20 superpaths to the parent Source T-Node 301 requires another level of aggregation. This is the role of the Source L3 Aggregation Superpath 731 shown in the figure. There could be more than one Source L3 Aggregation Superpath 731 generated for redundancy as with all other objects shown, but logically, there need is only one.

Again in FIG. 7, an L3 Disaggregation Switch 532 in the Destination T-Node 302 can disaggregate a Source L3 Aggregation Superpath 731. Note that this superpath becomes a Destination L3 Disaggregation Superpath 732 within the Destination T-Node 302 for clarity since there is no physical difference between the two superpath callouts.

In the model network of FIG. 5, the output from the L3 Disaggregation Switch 532 is 20 Destination L2 Disaggregation Superpaths 722, each of which connects to a Crossconnect Switch 570. Shown in the figure is only one of 20 Crossconnect Switches 570 as there is one Crossconnect Switch 570 for each T-Node 300 in the network that exists in a Source T-Node 301. The purpose of a Crossconnect Switch 570 is to cause re-aggregation of Source L2 Aggregation Superpaths 721 so that every Source Path 711 generated by a Path Aggregation Switch 511 in a Source T-Node 301 becomes a Destination Path 712 within one of the Destination E-Nodes 202 in the network.

The Crossconnect Switch 570 shown in FIG. 7 receives the Destination L2 Disaggregation Superpath 722 from the L3 Disaggregation Switch 532 shown. Inside the Crossconnect Switch 570 is an L2 Disaggregation Switch 522 for each of the Source E-Nodes 201 connected to the Source T-Node 301. There are 15 Destination Paths 712 generated by the L2 Disaggregation Switches 522. Each Destination Path 712 becomes a Source Path 711 input to an L2 Source Aggregation Switch 521 that produces L2 Aggregation Superpaths 721 that flow to L2 Disaggregation Switches 522 located in a Destination E-Node 202 children of the Destination T-Node 302. Note that there are three L2 Disaggregation Switches 522 that produce 15 Destination Paths 712 in the Crossconnect Switch 570. There are also five L2 Source Aggregation Switches 521 each of which aggregates three of the 15 Destination Paths 712 that become Source Paths 711 for the five L2 Source Aggregation Switches 521.

Each L3 Aggregation Switch 531 in the Source T-Node 301 aggregates three L2 Aggregation Superpaths 721 into a Source L3 Aggregation Superpath 731. The network can forward its superpath toward the Destination E-Nodes 202. The Source L3 Aggregation Superpath 731 connected to the Crossconnect Switch 570 carries the 15 re-aggregated L2 Aggregation Superpaths 721 to the Destination T-Node 302. Clearly, the number of aggregated Path Aggregation Links 710 and the sum of their band-widths are the same on both sides of the Crossconnect Switch 570. This is also true for L2 Superpath 720.

In the Destination T-Node 302 can be an L3 Disaggregation Switch 532 that pairs with the L3 Aggregation Switch 531 in the Source T-Node 301. The Source L3 Aggregation Superpath 731 generated by the L3 Aggregation Switch 531 passes through Forwarding Nodes disclosed elsewhere in this application.

The Destination T-Node 302 shown in FIG. 7 contains an L3 Disaggregation Switch 532 that pairs with the L3 Aggregation Switch 531 shown in the figure. Its output is the five re-aggregated Source L2 Aggregation Superpaths 721 composed in the Crossconnect Switch 570. Each of the L2 Aggregation Superpaths 721 connects to an L3 Aggregation Switch 531 that delivers L2 Aggregation Superpaths 721 generated by those Crossconnect Switches 570 dedicated to forming the L2 Aggregation Superpaths 721 meant to flow through the Destination T-Node 302 to its child Destination E-Nodes 202.

Within each of the five Destination E-Nodes 202 shown in FIG. 7 is an L3 Disaggregation Switch 532 that pairs with the L3 Aggregation Switch 531 in the parent Destination T-Node 302. The output from the L3 Disaggregation Switch 532 contains a Destination L2 Disaggregation Superpath 722 that pairs with the Source L2 Aggregation Superpath 721 in the Crossconnect Switch 570 in the Source T-Node 301. The three outputs from the L2 Disaggregation Switch 522 can connect to three Path Disaggregation Switches 512 in the Destination E-Node 202.

To summarize the actions taken delivering data from a Path Aggregation Switch 511 to a Path Disaggregation Switch 512 is a single hop connection. There are two L2 Source Aggregation Switch 521/L2 Disaggregation Switch 522 pairs used. In addition, there are three L3 Aggregation Switch 531/L3 Disaggregation Switch 532 pairs used. In other words, there is a two-hop Level 2 connection and a three-hop Level 3 connection. These connections deal only with large data aggregations forwarded in short C-Frames, often lasting for nanoseconds. The result is one-hop forwarding from one user port to another with extremely low delay. User connections flow through deterministic routes with deterministic bandwidth. The deterministic nature of a SAIN network results in requiring only a single Quality of Service parameter—end-to-end delay.

3. Extended Methods Available in an Aggregation Hierarchy

4. Method and Apparatus to Place a Plurality of Connections in a Single Stack Selector Position Connection Identifiers (CIDs) were briefly described in RS1. Each CID in a Network can be an alias referring to parts of a packet that can be removed at an ingress node and restored at an egress node. This can provide at least six benefits. They are to:

1. save Network bandwidth by removing static parts of packets such as source and destination addresses and other packet fields;

2. implant static information related to connections, such as port connections of NICs, that would otherwise require messages being sent separately end-to-end for each packet or flow; [Note: using CVs for this purpose is not complicated, but would waste bandwidth and processing power.]

3. mark packets with an attached CID prepend that are sent over an epoch-based connection within the past using Date:Time stamps; this can enable discard of the oldest CID in case there are more connections than there are available CIDs; [Note: the benefit can apply to both packet flows and to packets appearing sporadically.]

4. define parameter tables for one or a plurality of CID aliases;

5. define parameter table templates that are usable with different packet types 6. allocate an amount of bandwidth to a packet group determined by its origination port or other method for a period that will clear the group from input buffers in one or a plurality of epochs. [Note: The delay for each packet in the group is inversely proportional to the amount of bandwidth allocated to the group as a whole during the period. The delay of each packet will be the size of the group divided by the bandwidth applied for the period. As for guaranteed delivery, each packet is guaranteed to being delivered in less than the epoch period. In other words, a plurality of packets can be assigned enough bandwidth to assure that all are forwarded during an epoch.]

FIG. 8 shows a sequence of packets in a reception position within a Generic Aggregation C-Switch 501/Generic Disaggregation C-Switch 502 pair—in other words, in an A/D C-Switch Pair 503. Each packet can have two header fields—a CID and a length field. This approach is necessary if each packet can be of different length in subsequent appearances. If the length of a given packet is fixed, its length can be embedded as part of its CID description. Only packets whose lengths vary from epoch to epoch need packet lengths sent within an epoch.

FIG. 9 shows a sequence of packets, each of which has the same length, or has a length defined in a description for its specific CID. FIG. 10 shows a packet sequence that is a flow from a single source for each packet of fixed length with the same CID. For the packets and FIG. 9 and FIG. 10 the length of each packet can be sent within a CV from the source to a destination C-Switch. In FIG. 10, both the single CID ordinal and the packet length can use a single CV to send the information from source to destination for the duration of a flow defined by its position in a Switch Stack Selector 120.

Control Vectors (CVs) are useful in matching destination object states with source object states. CIDs using CVs are particularly useful in Level 1 aggregations to match static parts of packets at a destination MC with those at a source NIC. A CID can also be an alias for static information not included in a packet such as physical port addresses, packet type parameters, VLAN addresses, and VPN addresses (that can be much larger than 802.1Q fields). A plurality of packets, each with a CID header, can be implanted in a position within a C-Switch Stack Selector 120 within a Path A/D C-Switch Pair 513.

This process can apply to either variable- or fixed-length packets. This approach may seem to be merely another way to implement FIFO buffers in a packet P-Network. A major difference is that a result is deterministic as opposed to being stochastic. Applying a predetermined amount of bandwidth to a plurality of packets can assure that an entire plurality is delivered during one or a defined number of epochs. Qualities of Service metrics needed in stochastic packet P-Networks are not required in a SAIN Network. The only metric needed in a SAIN Network is the delay required for various service types.

In a conventional P-Network, packets are separated by packet framing pauses to guarantee a system can find the start of a packet in a physical connection. An Ethernet packet, for example, can use at least 160 bits of an Interframe Gap and other preamble framing plus 96 bits for MAC addresses for a total of 256 bits (32 bytes). In a SAIN single-hop synchronized node Network, a plurality of packets can use packet length to delimit packets. (As a precaution, the length of each packet can be verified by counting the number of bytes received and comparing that to the length field of the packet as it fills a FIFO buffer. In addition, a high-performance NIC 210 could use an incoming packet's CRC to assure that the incoming packet was received without error. In either case, if an error does occur, a message can be sent to the packet source by a CV—deterministically (i.e., in a known period).

A useful method of sending packets in a SAIN Network is that it can assure Source Assigned FIFO Buffers 243 contain a plurality of whole packets, either in a single epoch or within a an integer number of epochs. This simplifies determining the boundaries between CID-headed packets at a Path Disaggregation C-Switch 512.

Networks can make use as references several Internet Engineering Task Force (IETF) Requests for Comments (RFCs). The major one is RFC 5795 Robust Header Compression Framework (ROHC). This RFC also uses RFC 3095 as a long reference document (containing 168 pages). Another RFC 3759 updates RFC 3095.

There is a major difference in deploying header compression in a single-hop SAIN Network compared to doing so in multihop P-Network s. A packet that exists in readable form at a Source E-Node 201 or a Source VE-Node 181 exists in readable form at only one other place, a Destination E-Node 202 or a Destination VE-Node 182, respectively. In other words, there are no intermediate nodes that forward whole packets in a resolved form within a SAIN Network. This results in a significant simplification and importance of using CIDs.

Upon entering a MC 210, a processor identifies a packet's Destination E-Node 202 or Destination VE-Node 182 from a table lookup of the packet's MAC addresses or other fields. If its fields are not recognized, a processor in the NIC or a system controller looks for a match in a larger cache or table. If no cache has held packet fields in the past, a new entry can be added to relevant caches.

The length (in bits) of a CID prepended to a packet depends on the number of unique CIDs in the partition in which it resides. An X-Node domain can include all T-Nodes 300, E-Nodes 200, and VE-Nodes 180 belonging to a metro-like Network or data center. A large cache of CID parameter tables can be available to all objects within an entire X-Node 400 domain. A database cache of these tables could exist in either a special place within the domain or, for example, replicated in each T-Node 300 and/or E-Node 200 for packets that have been used before in that environment. An example template format for CID parameter tables is shown in FIG. 11. There are clearly a number of possible variations that can be used. For example, Special Field 1 and Special Field 2 could be defined for specific instances and either added to or given default values for a given type of packet. There should be no limit on the number of 'Special Fields' with appropriate labels.

A hashing method such a protocol MD5 can enable searching CID parameter tables rapidly for exact matches to incoming matching packet fields. The MD5 field can also be used as an identifier of a particular set of CID parameters within a local table. In this way, adding a CID with static Network object values in other locations can make use of a single parameter table entry. In other words, a CID can contain more elements than are embedded within a forwarded packet as described above.

CIDs for a single position in a C-Switch Stack Selector 120 in a Path Aggregation C-Switch 511 can have small-sized CIDs that are unique only in a single selector position. For example, an eight-bit CID could represent a single connection or any plurality of connections from 256 different connections determined being active by system processors. Another position in the Switch Stack Selector 120 can have another 256 connections. In other words, SAIN Networks division into a set of disjoint objects enhances the number of possible connections with no specific limit.

5. Method and Apparatus for Limiting the Number of CIDs that do not Relate to Recent Activity Each CID does not need to exist in perpetuity. Each CID prepended packet represents a connection that has been sent relatively recently over a forwarding connection. A mechanism is needed to control the size of a local CID cache. This can assure that a CID that appeared in the distant past can be flushed from the local system so that a new different packet can use the same CID numeral. The mechanism disclosed herein is called a Connection Time to Live (CTTL) method. A CTTL value, disclosed herein, can be assigned to each current CID within any CID cache in a Network. The purpose of a CTTL is quite different from a Time to Live (TTL) value common in router-based P-Network s. In such P-Network s, a TTL is used to discard packets when there is danger of routers forming a loop in a P-Network. [A SAIN Network uses a routing strategy that precludes loops from forming within a Network.] In a SAIN Network, a CTTL enables using CID lengths shortened to match the current number of active packet connections with little processing.

FIG. 12 shows a CID use table for a given position within a C-Switch Stack Selector 120 of a Path Aggregation C-Switch 511. Each multi-connection position within a C-Switch Stack Selector 120 has its own table similar to that shown in FIG. 12. Each table shows CIDs with their CTTLs along with each CID's last date and time of use. There is one CTTL entry for each CID value. Each row in a table is committed to a CID in showing its last Date:Time of latest use. The CTTL nearest the bottom of the stack of Date:Time values shows how long ago it has been since it was at the top row of the tabl0065. In the figure, the date and time make use of the value 'yy' the lowest two digits of a year, plus four more digit pair abbreviations that relate to 'MM' for Month, 'dd' for day, 'HH' for (24-hour) hour, 'mm' for minutes, and 'ss' for seconds. Shown in the figure, CID numbered 72 is at position '0' of the CTTL table is the latest packet received and forwarded. In other words, it represents the last packet to be entered into a position in a C-Switch Stack Selector 120 of a Path Aggregation C-Switch 511. The NIC 210 through which the packet entered the system is connected to a system's port number.

When a packet is received by a NIC 210, it must find a CID whose description matches the packet. Such matches can include enough parameters to make a CID choice unique. Such matches can include a source port number, a destination port number, a source MAC address, a destination MAC address, an IP source address, an IP destination address, and other parameters. The first choice of a CID match is to match parameters that are associated with an active CID. The next choice is a CID (probably without including port numbers) from a local NIC cache. If a match is found and, except for port numbers, a match also exists in an active CID, a second CID, currently not in use, can be assigned to mark a second end-to-end connection, disjoint from the first.

As shown in FIG. 12, a novel way determine the likelihood of a new packet being one that has been recently transmitted before insofar as addressing and other static parts of packets. When a new packet arrives that matches one that already is in the CTTL stack of the table, the position of the CID and its Date:Time value is cut from the table. All remaining values above the cut are moved down by one row so that the top row has both its CID and Date:Time value empty. The top row has the new CID entered along with a current Date:Time value.

As long as the current CID of a new packet is somewhere within the FIG. 12 table, no former CID will be removed. When a new packet's CID value is not in the table, the entire stack of CID and Date:Time values are moved down until all empty rows at the bottom of the table are replace with past active CIDs. When this state occurs, the bottom CID in the table can be replaced by the next higher row in the table and the new CID (with a current Date:Time value) is placed at the top of the table after all values are moved down one row.

The last row of the CID/CTTL table shown in FIG. 12 shows the Date:Time of the first connection to have been included in the active connection list is likely to occur again anytime soon. If the decision is that it is likely to need the connection again, then the number of CIDs enabled in the table should be expanded.

There are a number of ways to increase the number of CIDs in a local CTTL table. One is to add a whole 8-bit-byte to the CDI length. This would work, but it would be more efficient if the CDI length could be incremented or decremented one bit at a time. For example, if the CID length is 8 bits, increase it to 9 bits. This may appear to be difficult to implement since all activity within a most packets takes place with 8-bit bytes.

A relatively simple way to proceed is to add an extra bit to the packet length with the CDI header for forwarding the packet through the Network, but to add an entire byte to the size of the CDI within the ingress and egress mechanism. For example, if a CID is 8-bits long, increase the number of bytes in the CID header from one to two. The previous byte is given position 2 in the packet while the extra bit resides in a first byte whose eight bits would be '00000001'. This results in the number of CIDs being 512 instead of 256. It does not change any location of existing 0 to 255 CIDs, but numbers greater than or equal to 256 and less than or equal to 511.

The table parameters in defining and using CIDs can include, but not be limited to the following:

1. Bit length of a CID
2. Length of a packet
3. Source and destination packet addresses
4. Duration of a data forwarding epoch 5. Duration of a CTTL epoch 6. Time stamp of a packet An epoch can be periodic with durations chosen for different uses. For example, a period might be very short (e.g., a microsecond or less) to assure minimization of end-to-end delay for a particular service application. In other applications such as data streaming, an epoch could be one or a few seconds. This approach changes data bursts within an epoch to an average data flow for the length of the epoch. In some circumstances, an epoch could be quite long. For example, sending updates to portions of an online newspaper could be sent at relatively low non-real-time data rates. TV programming could be treated in the same manner. The result of sending data at lower flow rates enables transfer of large amounts of data without competing with real-time (RT) and near-real-time (NRT) flows. A service provider could charge less for this type of service compared to RT and NRT types. Data sent at a quarter of a system's available rate leaves three times the low data rate (LDR) bandwidth for RT and NRT traffic. All-in-all the described method can result in lowering the amount of spare bandwidth that must be reserved for premium service, i.e., guaranteed deterministic Quality of Service.

As implied above, an epoch need not be a C-Frame of data. An epoch can use a plurality of C-Frames or one or a plurality of subframes.

6. Method and Apparatus to Eliminate Head of Line Blocking for Sending Mixed Length Packets As described in RS1, a connection can be defined as a range of cellets in a Connection Domain 150 of a SAIN multiplex algorithm. In addition, a SAIN Network can use epochs to define a given amount of time to send a given amount of bandwidth for a connection. Each position in a C-Switch Stack Selector 120 can define a connection.

a. Method 1

Using a Single Connection to Send Different Sized Packets at the Same Delivery Rate A simple example of using a connection would be to send a single within a connection for a given epoch. And Ethernet P-Frame of 520 bytes (4,160 bits) using a 1 ms epoch would require 4.16 Mb per second. There would be a 1 ms delay in delivering the packet. If, at the same time, a 64 byte packet arrives in the same 1 ms epoch, it could be added to the 520 byte packet and be delivered without waiting until a following epoch. In other words, 4,672 bits would be sent during the 1 ms epoch. Methods of accomplishing this have been described above.

b. Method 2

Using Different Selectors for Different Packet Sizes

A position in a C-Switch Stack Selector 120 can be used to send packets whose lengths lie within a given range. For example, 64-bit Ethernet packets usually send control messages within an Ethernet-based Layer 2 P-Network. Since these messages can often be time urgent, placing them in a separate C-Switch Stack Selector 120 connection can improve such a Network's performance. Using CIDs in such cases can reduce all-64-bit length packets by almost 50%. (i.e. 64 bytes less 32 bytes plus the length of a CID, such as one byte). If a Network employs "jumbo" Ethernet P-Frames, this method can be of major benefit. Web-based traffic usually uses smaller packets than MPEG video, etc.

c. Method 3 Using CVs to Send Very Short Messages

In an IP P-Network, a Layer 4 TCP protocol is of major importance. A SAIN Network can make an important difference in its use. Since a Network has synchronized nodes, the delivery time between two end-points is deterministic and known (usually within picoseconds or nanoseconds) at instantiation of a metro or data center Network. A special epoch for such messages can be used for TCP ACK/NAK and other short messages.

7. Method and Apparatus to Forward Packets at Wire Speed in a SAIN Network a. Method 1

Use High Bandwidth with Short Epochs to Forward a Packet

A connection within a virtual connection for Path A/D C-Switch Pair 513 can be established with zero bandwidth when no traffic is flowing. If the bandwidth assigned to a connection is known prior to the arrival time of a packet, the connection epoch can be provide the required bandwidth for the packet without waiting for a whole packet to arrive. In this case, a packet does not need to fill a FIFO before an epoch begins. A forwarding epoch can be set to a very short value, such as one or a few microseconds. It can remain at zero bandwidth until the first part of a packet enters a FIFO buffer. What is needed is receiving enough of a packet to receive the packet's length field. With that information, the next epoch can include the bandwidth required to send the entire packet.

For example, suppose that an Ethernet P-Frame has 576 bytes (4608 bits) with 32 bytes removable and 1 CID byte added. The total P-Frame length is 545 bytes (4360 bits) to be sent. (Length bytes can be assumed to be sent in either within a CID or not to be removed from a P-Frame.) 'Wire speed' is determined by two data rates; one is by the data rate of the incoming packet; the other, is by the SAIN bandwidth allocated to the NIC FIFO. If the SAIN bandwidth allocated to the FIFO is greater than the data rate of the incoming packet, there are likely to be forwarding errors.

b. Method 2

Use Normal Bandwidth with Short Epochs to Forward a Packet

8. Network Control Plane Methods

A SAIN network can use Control Vectors (CVs) to send control messages within and between network nodes. CVs can establish and adjust parameters associated with a logical connection that controls a physical connection or a physical action. The structure of a CV depends on its particular application as described below. In general, the definition of a CV includes but is not limited to the following:

1. A parameter set defining the structure of a CV established prior to the CV's operational use 2. A parameter set that can be a list (often in table format) that defines properties of a CV 3. A definition of one or a plurality of message types within a CV 4. A semi-static parameter set; in other words, a set useful as long as the system requirements for a CV remains the same 5. A set of messages carried by a CV
6. Messages that conform to the above definitions
7. A fixed length message included in the parameter list above
8. A variable length message that requires a length parameter along with the message itself
9. Multiple parameter messages such as an address, a length parameter, and a message.
10. A message such as a Connection IDentifier (CID) that can contain Type, Length, and Value (TLV) parameters of current practice and other SAIN specific parameters.
11. A CID message that is a replacement for Tags that define a packet as belonging to a VLAN, VPN, or other property class that, unlike Tags, has no limit on a number of bits that specify a class object.

Control Vector Uses

FIG. 13 illustrates in various embodiments some of the ways that control vectors can be used in a SAIN network.

As mentioned, CVs can be used in a SAIN network to establish and adjust parameters associated with a logical connection between endpoints. Connected endpoints, for example, can be nodes, C-Switches, or other network objects.

1. In various embodiments, a CV can be used to establish a connection between endpoints. For example, a CV can be used to set up a connection between a Generic Aggregation Switch 501 and a Generic Disaggregation Switch 502, between a Generic Aggregation Switch 501 and a Generic Aggregation Switch 501 at the next higher aggregation level, between a Generic Aggregation C-Switch 501 and a Generic Disaggregation Switch 502 at the next lower level.

2. A CV can also be used to change the bandwidth of an existing connection (e.g., to change the bandwidth of an existing 2-point, endpoint-to-endpoint logical connection).

A CV can be used to modify other parameters associated with a connection, for example, to change a connection state associated with the connection. In various embodiments, a logical connection can exist in a virtual or real state. A connection can be in a virtual state, for example, when the bandwidth between the endpoints of a connection is zero (e.g., when two connected nodes are not actively communicating with each other). Also for example, a connection can be in a real state when a non-zero bandwidth has been allocated for data transfer between the connected endpoints.

b. Control Vector Structure

FIG. 13 shows the structure of a CV that can be associated with a type. For example:

1. A Type 1 Single Control Vector (SCV1) as a C-Frame of connection-related implicitly addressed parameters defined by a number of cellets and a cellet size (in bits)—a SCV1 Frame 801 as shown in FIG. 13-1

2. A Type 2 Single CV (SCV2) C-Frame of connection-related parameters defined by a number of two-part cellets where each two-part cellet consists of an address (in fixed-size bits) followed by parameter (in fixed-size bits)—an Address|Value SCV2 Frame 803 as shown in FIG. 13-2

3. FIG. 12-3 shows a Type 1 Compound CV (CCV1) that consists of two (or more) one-bit cellet vectors where each bit refers to a linear position in a CV. In FIG. 13-3, the first SCV is an SCV1 Frame 801 with one-bit cellets. A second SCV1 Frame 801 contains 5-bit cellets that relate to bandwidth allocated to a connection.

4. A zero bit of a one-bit cellet can indicate that a CV value can remain unchanged from its present value; a one-bit indicates that a CV value changes according to a value in a SCV1 made up the number of cellets (of known size) equal to the number of "1s" in the bit-vector.

c. A Preferred Embodiment of a Control Vector

1. One or more table(s) of semi-static parameters can define a CV prior to operational use. FIG. 13 shows such parameters that can often include one or more of the following:
   a. Size of cellets in a SCV where the size of each cellet is the same
   b. Size of cellets in each CV composing a CCV where each cellet is the same size in a given CV
   c. Number of cellets in a C-Frame for a given CV
   d. A CV can contain one or a plurality of dynamic parameters for operational use.
   e. CVs can exist in clusters between source and destination terminations.

2. A simple way of achieving this is as follows:
   a. The system can use a pair of SAIN C-Switches (Switch Stack Selector 120) with one or more stages representing a single CV.
   b. The system can use a pair of Switch Stack Selector 120 each of which contains either an entire CV or portions thereof.
   c. The CV that controls a Switch Stack Selector 120 of CVs can contain the CV that controls the stack itself
   d. The CV for the Switch Stack Selector 120 can occur in an epoch ahead of the CVs for the entire stack.

3. An alternative to using C-Switch pairs as the bearer connections for CVs is to use semi-permanent connections between node pairs for transporting CV messages.

4. CV epochs can use a sequence number to match with data C-Frame numbers to assure appliance of CV messages synchronized with the arrival of affected data.

A Preferred Method of Sending Control Vectors Between Node Pairs

1. Each Source-to-Destination Node Pair can have a plurality of CVs that are contained in an aggregation thereof. In addition, each of the plurality of CVs in the aggregation can have a companion Destination-to-Source response CV.

2. Certain node pairs in addition to Source-to-Destination Node Pairs can also require such an aggregation of CVs.

3. Each node pair requiring one or more CVs can contain a controller that originates a CV that affects state parameters within both nodes. The controller can embed the CV within an aggregation of CVs connecting the nodes. Such an aggregation is a CV Channel 810.

4. A CV Channel 810 can contain CV Sub-Channels 813 each of which can contain aggregations of Control Vectors 800.

5. The aggregations of Control Vectors 810 in a CV Sub-Channel 813 can all belong to an SCV1 Frame 801, an Address|Value SCV2 Frame 803, or a Compound CCV Frame 805.

6. The parameters for each Control Vector 800 in such a CV Sub-Channel Frame 813 can have the same format except for the length of the Control Vector 800.

7. In addition, each Control Vector 800 may have an attached Forward Error Correction (FEC) such as a Reed-Solomon Code and/or an Error Detection Code such as a Cyclic Redundancy Check (CRC).

8. A single C-Frame may combine a plurality of Control Vectors 800 into a single object with a single CRC. The plurality may include all Control Vectors 800 or subsets thereof. In any case, a single Return Control Vector 800 can contain a single short message or a plurality of messages, each of which can be as small as one or two bits.

9. A CV Channel 810 contains at least one CV Sub-Channel 813 that is a CV Message Sub-Channel 815. For each CV Sub-Channel 813 in a CV Channel 810, a CV Message Sub-Channel 815 contains:

10. the number of CV Sub-Channels 813 in the CV Channel 810;

11. A table of parameters for each CV Sub-Channel 813 in the CV Channel 810 that can include:

12. its unique index number isc;

13. its unique label name;

14. its CV Type;

15. its number of cellet address and/or data fields;

16. its number of sub-cellets per cellet field and their lengths

17. A controller can add error control codes described above.

18. The foremost responsibility of CVs is to assure that object parameters at a destination node match the same object parameters at a source node. A hash function across a larger set of CVs as opposed to an individual CV applied to the set can provide additional assurance of synchrony of CVs within a node pair.

A Preferred Method of Assuring CV Reliability

A CV can have an assured priority for bandwidth among nodes by implementing a preferred Class of Service for CVs 1. A CV of any type can be included in a CV Class of Service (CV CoS)

2. A CV CoS can include a plurality of (disjoint) routes between CV node pairs.

3. A specific low priority CV can use a CV CoS or, in the case of long CVs, can be sent using a single CV route along with Request/Response error control techniques.

4. For CVs using a CV CoS, a CV can send two (or more) CV copies over the plurality of CV routes.

5. Each copy can include a (strong) Cyclic Redundancy Check (CRC). This allows a distant end of a CV controller to select a copy with no error.

6. By choosing the smallest delay of disjoint CV CoS routes within a network can result in good system performance.

7. Upon failure of a CV CoS route, another disjoint (or nearly disjoint) route from the available list of routes with minimum delay can replace the failed CV CoS route.

8. A CV CoS route can use methods disclosed below.

9. Each trunk connecting node pair neighbors can combine all CV CoS routes into a common CV CoS link. This can enable each source end of a forwarding hop to replace a failed optical link with an operational spare quickly.

A Preferred Method for Assuring Best Practice Error Control in a SAIN Network There is a large plurality of error control methods that invented for communication systems. Most of the methods optimize overcoming specific error producing environments. Some codes are useful for bit errors in memoryless channels where each bit error is stochastically independent from other errors. Other codes are to overcome errors that occur in bursts, such as those caused by lightning or cosmic noise. In these cases, most approaches to overcoming such errors make use of interleaving which is necessary in communication systems based on data transport using data packets. Interleaving in this case rearranges bits over a period that includes a number of packets. The rearrangement uses an algorithm that spreads error bits uniformly over the period. Error correction codes are more useful when error bits do not exist in clusters. The algorithm that causes the interleaving has an algorithm that returns the corrected segment to its initial state.

The SAIN multiplexing algorithm making use of cellets that contain a single bit can result in automatically interleaved data so that an independent interleaving/deinterleaving operations are not required. The result is simplification and, more importantly, does not add delay to the data transport process.

An important property of CVs in a SAIN network is the relatively small amount of data required for each message encapsulated in a CV. Often, the message may consist of only a few bits. The object with a network to which a parameter within a CV is identifiable using implicit addressing as the structure of the CV.

Error correction algorithms increase the size of a message within any network. In a SAIN network, the fact that the SAIN multiplexing algorithm spreads out data within a C-Frame can make effective use of some simple error control methods. For example, a simple Hamming (7,4) code can correct a bit error within 7 bits that include 4 data bits and 3 parity bits. Adding an extra parity bit allows the code to correct 1 bit error and detect 2 errors. Using the latter instance doubles the bandwidth required to send a CV. However, the 8 bits can exist either almost uniformly or exactly uniformly spread through an epoch depending on the method used in implementing the SAIN multiplexing algorithm. Using this method along with the addition of a CRC to a CV, or aggregation thereof, along two disjoint routes can result in nearly errorless transport of CVs where it is possible to estimate a burst noise stochastic.

For example, suppose that lightning is a known burst noise that can interfere with data transmission. Assume that the burst duration is of the order of 30 μsec. If a single message bit occurs within such a period, a single bit-error detection method would overcome lightning induced errors.

The SAIN multiplex algorithm can implement such a system as shown in FIG. 19. Shown is a segment of a plurality of uniformly spaced Hamming Codes useful in this method.

A Preferred Method of Sending CVs from a Source to a Destination Node

Figure 15:
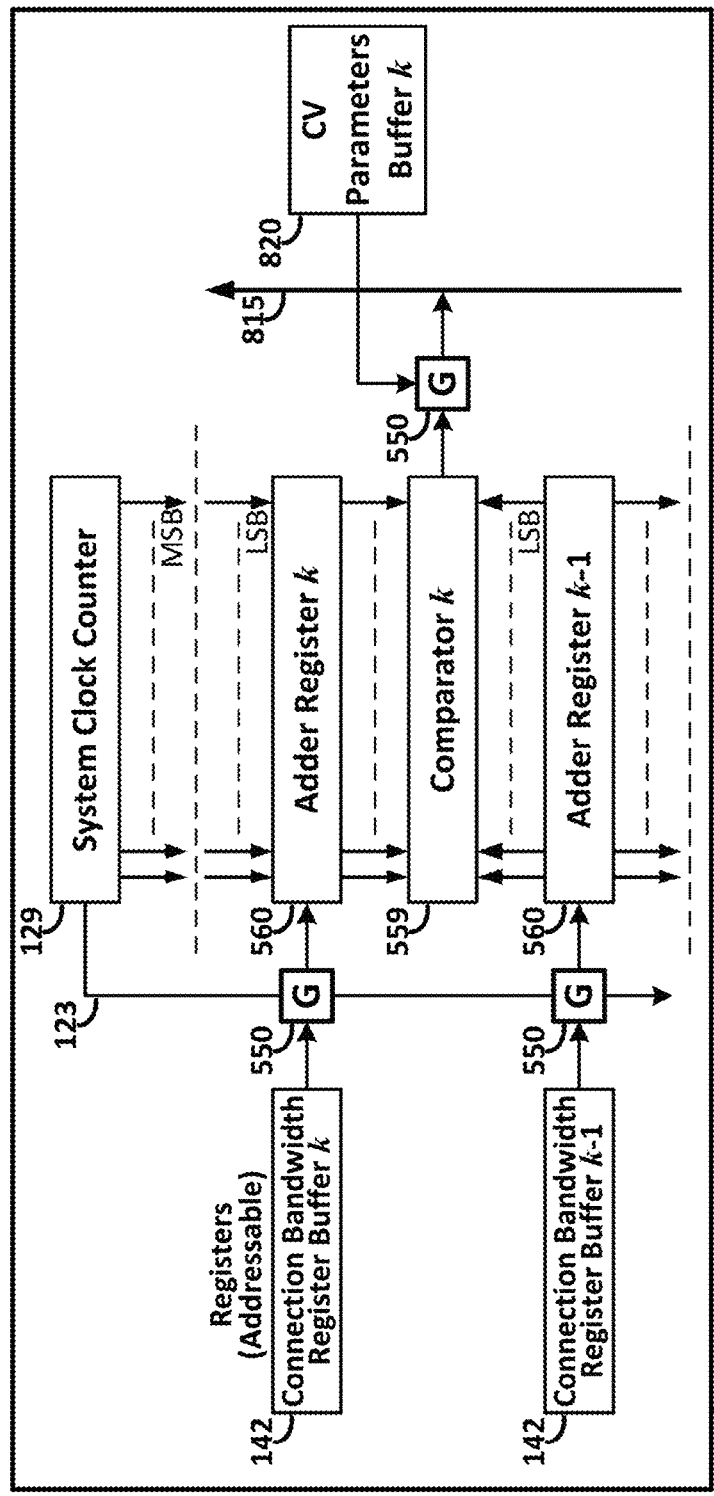
FIG. 15 shows a generic control vector forwarding apparatus according to an embodiment.

FIG. 15 shows a preferred CV Forwarding Apparatus 840 for sending generic CVs in a SAIN network. The figure uses a SAIN C-Switch arranged to send CVs that control network parameters instead of managing connection bandwidths. The major differences include:

1. In a SAIN C-Switch that controls system bandwidth, there are two Connection Bandwidth Register (CBR) Stack 553a and 553b as shown in FIG. 11 and FIG. 13 of RS1. [The present application labels these CBR Stacks as CBR Stack A 555 and CBR Stack B 556.] In a SAIN CV C-Switch, there is a single CBR Stack 554 at both source and destination nodes as opposed to a CBR Stack A 555 and a CBR Stack B 556 at a source and destination node.

2. A CV C-Switch can contain a plurality of parameters each of which is determined by definition at instantiation of each CV. In general, each position in the C-Switch stack can relate to entire SCV. In a CCV, each CV that makes up its total may exist in a plurality of positions.

3. CVs can operate in epochs. In other words, sending a CV can be periodic. In some instances, a relatively long period can contain any integer number of sub-periods using the SAIN multiplexing formula. The shorter periods can enable bandwidth management for very low delay SAIN connectivity.

4. Each CV includes a length parameter that can vary from epoch to epoch. That which is a bandwidth parameter for data transport in a SAIN network can be a set of length parameters for CVs.

As is the case other uses of Switch Stack Selector 120 of RS1, a source end Switch Stack Selector 120 can connect to a destination end Switch Stack Selector 120. FIG. 11 illustrates the difference. Although not mandatory, a significant simplification of in the management of the Switch Stack Selector 120 pairs is to assign the same local address to each position in the two stacks. In addition, the system can treat Source Assigned FIFO Buffers 243 and Sink Assigned FIFO Buffers 244 as well as of Signal Sources 245 and Signal Sinks 246 in the same manner. Using the same local addresses for both ends of a connection simplifies system management and address synchronization lists and tables.

Transferring any CV type can use the CV Forwarding Apparatus 840 shown in FIG. 15. This includes a method of using the apparatus recursively to set up initially a basic CV Forwarding Apparatus 840 that can result in higher-level operational CV Forwarding Apparati 840.

Setting up a CV Forwarding Apparatus 840 can involve the following steps:

1. Identify a Switch Stack Selector 120 (RS1) position that can be the same address at both source and destination locations. Such a position can be identified either for each instance of setting up a CV, or it can be identified a priori as a position that is identified to set up a given CV type. Such an approach is possible since a CV setup process may occur only once for a CV instance.

2. Using reference number from RS1, identify a Source Assigned FIFO Buffer 243 and Sink Assigned FIFO Buffer 244 for setting up the CV. [Binding source and destination FIFO buffers to each Switch Stack Selector 120 position further simplifies setting up and operational use of CVs.]

3. Sending a CV from a source to a destination requires placing a CV's parameters into a CV Parameter Buffer 820 in FIG. 15. This can occur in an epoch context just before sending the CV from a source to the destination.

4. In addition to loading parameters into a CV Parameter Buffer 820, it is also necessary to place the number of cellets in the source CV Parameter Buffer 820 into the Connection Bandwidth Register 142. In FIG. 13-1, the address of relevant parts of the process have the label k.

5. Unlike an operational CV, the contents of Connection Bandwidth Register 142 nominally send the bandwidth parameter for Connection Bandwidth Register 142 along with other CV Parameter Buffer 820 data.

6. Before a launching a Control Vector, it is always necessary to assure that the amount of bandwidth available during an epoch is sufficient. This should be a simple task. The bandwidth required to send CVs is small and given priority over the bandwidth for other services. A background process can assure that there is enough reserve bandwidth for messages in an ongoing basis.

A Preferred Method of Providing a Single Message SCV or a Plurality of Messages

Fig CV1-1 shows an example of SCV messages.

1. A single message SCV can consists of a single SCV2 cellet, i.e. a C-Frame of length l.

2. A plurality of messages can consist of a frame of SCV2 cellet.

3. A Type 1 SCV can have predetermined parameters such as:

4. A reference number for the SCV

5. The position in a Connection Domain for the SCV

6. The size of the SCV's cellets

7. Either one of the following parameters can be included:

8. The number of cellets in a SCV, or

9. The number of bits in a length field (i.e., number of cellets in the SCV) prepended to the SCV 10. If the length parameter is zero, the SCV can represent a virtual connection for the SCV (i.e., the size of all SCV positions are zero)

11. For a Type 2 SCV, each cellet has two parts. The first part denotes the position for the CV value of a C-Frame of cellet values. The second part is the value placed in the position denoted by the first part. For example, if the position number points to one of 128 positions (i.e., represented by 7 bits) and the second part (message) is 5-bits long, the total cellet length is 12 bits. Using a Type 2 SCV can imply that a message remains unchanged until a new value occurs in a new Type 2 SCV.

12. In order to assure correct receptions of a message, the system can use a standard Request-Response error correction method (for example, using Forward Error Correction techniques such as Reed-Solomon coding). The Response can be a one- or two-bit length (or other length for special purposes). For a response of two bits, one of the bits can show (1|0) (Yes|No) reception of the CV; the second bit can show no error occurred (1|0) (Yes|No).

A Preferred Method of Providing a CCV with One or a Plurality of SCV Layers

FIG. 13-3 and FIG. 13-4 illustrates the following:

1. Compound Control Vectors (CCVs) make use of a plurality of Control Vectors (CVs) as a single Control Vector object. Nominally, a first CV contains information that enables limiting the size of other CVs included in the compound object.

2. An example of a CCV is a Bit Control Vector (BCV) that is a C-Frame of 1-bit cellets where each cellet in a frame represents an object related to the BCV. Such an object pointed to by a BCV could be a set of bandwidth values in a range within a Switch Stack Selector 120 in RS1.

3. For a BCV, there are several possibilities for which the two values of a cellet can represent. One is that a "0" represents that the current value pointed within a Switch Stack Selector 120 remains unchanged; a "1" represents a change in the current value. A second CV can contain cellets that correspond to each "1" cellet, in sequence, to those in the BCV.

4. To set a CCV to either a "virtual" or a "real" state can occur using a second BCV (or changing a BCV into a cellet that contains two instead of one cellet). In either case, the extra bit could indicate a virtual or real state. If the extra bit denotes a virtual state, the bandwidth allocated to a virtual connection could be either zero or some low value that allows the connection to determine its existential state (at the distant end of the connection). Alternatively, the virtual/real and existential states of a connection can occur with a BCV alone (without a second BCV or a second bit per cellet). In this case, a "0" bit still would denote that the Control Vector state has not changed, and a "1" denotes that a change is being made in an attached CV. If the attached CV sets bandwidth to "0", the system allocates zero bandwidth to the connection. The connection is then in a virtual state. The "0" value in the Connection Bandwidth Register 142 could contain a number of bits equal to non-zero values stored in a Switch Stack Selector 120. A "0" value in a bit vector could result in storing the number of bits used by non-zero values. In addition, a next higher bandwidth number, greater than "0", could also denote a virtual state. In this case, a small amount of bandwidth could represent the existential capability of the virtual state connection.

5. As shown in the figures, there is a plurality of methods to represent the same given number of parameter values within an operational CV. The difference among the methods can be the number of bits sent from a source to a destination. FIG. 13-4 shows that, if a C-Frame of CV cellets contains N values where N is a power of two, the number of bits needed to represent a CV depends of the CV type used. For example, suppose that a CV C-Frame contains 128 values, i.e. N=128. A Type 2 SCV2 can represent a plurality of changes less than or equal to the C-Frame length. An alternative is a CCV with a bit vector that shows the plurality of positions requiring change. The figure shows that if the plurality is less than 14.3% of the 128 positions in the C-Frame, i.e. 18 or fewer positions, the SCV2 requires fewer bits than the CCV alternative. If 19 or more are required, the CCV prevails.

6. FIG. 14 shows a more complete list of alternatives for this example. Suppose that the value located in each position is 5 bits. The figure labeled (a) shows a bare 128-cellet SCV1 C-Frame with 5-bit values. The C-Frame length for this case is 640 bits long. This case will include all values whether they represent a zero (i.e., are virtual) have not changed since the last epoch.

The figure labeled (b) shows an SCV2 case where there are only 18 out of 128 value cellets are changed. Each entry contains a 7-bit address followed by a 5-bit value. In this case, there are 216 bits required in a C-Frame.

The figure labeled (d) also shows an SCV2 case where 47 out of 128 value cellets change. The size of the C-Frame is 564 bits. If a case included 54 out of 128 value cellets that change, the length of the C-Frame would be 648. If 54 or more value changes occur, the simple (a) case would use a smaller C-Frame than using the SCV2 approach.

The figures labeled (c) and (e) show results from with compound CCVs. A 128-long bit CV adds to a 5×18=90 CV for the (c) case to be equivalent to the (b) case. A total C-Frame length result is of 218 bits. For the (e) case equivalent to the (d) case, the total C-Frame length is 363 bits long compared to 564 bits. As long as the number of values of a 128-bit C-Frame is either a zero or is not changed from a previous value, Any value changes greater than 18 will result in a smaller C-Frame than required by an SCV2 method; and any value changes less than 103 will result in a smaller C-Frame than required by an SCV1.

CV Routing Methods in a SAIN Network

The Preferred Method of Discovering Loop-Free Routes in a Mesh Network described herein shows a method that can discover a large plurality of routes between two nodes in a SAIN network built for a mesh network interconnected by transmission methods with fixed end-points. The system can sort routes in order of increasing delay, as it exists at any moment. (In other words, most networks have fixed locations and transmission media delay that is stable within a few nanoseconds; in cases where mobility is involved the system can still include transmission facilities by the methods disclosed herein.)

A network separate from transmitting data can assure delivery of CVs using two (or more) routes with the lowest delay, as described in A Preferred Method of Assuring CV Reliability described herein. In a SAIN network, CVs can use bandwidth from lowest-delay available routes on a continuing basis in spite of other network priorities. This assures that CV messages arrive before or at the same time as data controlled by the messages. [A destination node must allow enough time from the receipt of a CV message to make ready that part of the network affected by the message.]

A Preferred Method of Discovering Loop-Free Routes in a Mesh Network

In a SAIN network, a route could be established using existing standard protocols. However, there are much simpler and more deterministic ways. As shown in FIG. 3-1, a plurality of Source E-Nodes 201 connect to a parent Source T-Node 301. Each Source T-Node 301 connects to a Destination T-Node 302 that is the parent to a plurality of Destination T-Nodes 302. This structure results in the possibility for each Source E-Node 201 to connect to a plurality of Destination E-Nodes 202 within a network without requiring each Source E-Node 201 to manage routing tables.

A simple way of building a route table for all routes originating at a T-Node is to start building a routing table using each adjacent node-pair hop in a network. The nodes selected for this purpose are the T-Nodes within a network such as a Metro Ethernet Network. This can be accomplished as follows:

1. Prepare a connectivity matrix for a network of T-Nodes. Referring to FIG. 5, this map becomes such an n×n square matrix where n is the number of T-Nodes in the network. Each entry in the matrix is the length of a trunk directly connecting two of the T-Nodes. (The length relates directly to the propagation delay, and hence, the delay of an aggregation of user connections passing between the two directly connected T-Nodes.) FIG. 16 shows such a matrix based on the model network shown in FIG. 5.

2. For a given network, find all possible routes up to a given number of hops and their end-to-end latencies using directed adjacent node pairs. [A directed adjacent node pair is two neighboring nodes where one of the nodes is set to be a source node while the other becomes a forwarding node.] The following steps can produce the intended result:

3. Assign a unique hop number to each direction of travel between each directed adjacent node pair in the network. For example, choose an odd number, not previously used, for the direction of travel for a pair's lower numbered node to its other node; increase the numbered node by one for travel in the opposite direction.

4. Record the amount of (measured) delay between two adjacent nodes in each direction of travel. Normally, the delay in each direction should be approximately the same where cable for each direction occupies the same physical ducts. However, for applications where delay is a critical factor, this approximation may not be sufficient for the intended purposes.

5. The starting routes for finding all routes (and their end-to-end latencies) up to a given number of hops are the primitive Hop Source-Destination (SD) Table with hop delay shown in FIG. 17.

6. Given a current route table with all existing routes up to and including H hops, use these hops as the Basis Route Table (BRT) for finding all routes with H+1 hops. For the example network of FIG. 5, this requires performing the following processes for each route with H hops:

--- a. STEP 1: Use the Destination value of a route as a Forwarding Source Value (FSV) from the Hop SD Table of FIG. 17.
b. IF the Destination value of the SD pair of FIG. 17 already -continued exists in the Basis Route, THEN
  i. Disregard the resulting route, as it would contain a loop.
  ii. RETURN TO STEP 1
 c. ELSE
  i. Add the route to the H + 1 plurality of new routes.
  ii. Add the hop delay to the previous end-to-end delay value of the Basis Route.
  iii. Advance an index pointer to the FSVs in the SD Table of FIG. 17.
  iv. IF the same FSV exists, THEN
   1. RETURN TO STEP 1
  v. ELSE
   1. Advance an index pointer to the next route in the BRT
   2. IF no next route exists, THEN
 d. END
END IF

A Preferred Method of Choosing a Route in a SAIN Network

1. Each T-Node 300 can control all routes that carry traffic originating in a Source E-Node 201 child attached to the T-Node 300 that connects to traffic in Destination E-Nodes 202 that is also a child of a T-Node 300.

2. Each Source E-Node 201 can aggregate all user connections into a plurality of virtual or real Source Paths 711 from the Source E-Node 201 to all Destination E-Nodes 202 in the network.

3. In addition, each Source E-Node 201 can partition the Source Paths 711 into a plurality of Level 2 Source L2 Aggregation Superpaths 721. The number of such Source L2 Aggregation Superpaths 721 can equal the number of Destination T-Nodes 302 in a network. In this case, each Source E-Node 201 can connect to each Destination E-Node 202 in the network. The result is that each Source L2 Aggregation Superpath 721 can aggregate all Source Paths 711 that pass through one of the Destination T-Nodes 302 in the network.

4. The purpose of Source L2 Aggregation Superpaths 721 is to provide a means of routing all traffic that passes through the parent Source T-Node 301 of the Source E-Node 201 to all Destination E-Nodes 202 that are children of one of the Destination T-Nodes 302. FIG. 3-1 shows a configuration for Source E-Nodes 201 attached to one of the Source T-Node 301 that produces a Source L2 Aggregation Superpath 721. FIG. 3-2 shows the connectivity where the Source T-Node 301 and Destination T-Node 302 are the same T-Node 300.

5. The Source L2 Aggregation Superpath 721 becomes an L2 Aggregation Superpath 720 as it leaves the Source T-Node 301. When it reaches its Destination T-Node 302, it becomes a Destination L2 Disaggregation Superpath 722. As a Destination L2 Disaggregation Superpath 722, it passes embedded Source Paths 711 on to its child Destination E-Nodes 202.

6. The preferred method described herein results in a table of loop-free routes for routes beginning in a Source T-Node 301 and terminating in a Destination T-Node 302 a list of hop numbers, each of which denotes a trunk connected from a Source T-Node 301 directly to a neighbor Destination T-Node 302 identifies each route.

7. For each Source T-Node 301, a control channel exists to each Destination T-Node 302. This control channel can be implemented either in-band or out-of-band. In-band control channels are easier to set up and manage. Such channels must be duplex in order to handle Request-Response messages.

A Preferred Control Vector Method for Implementing L2 Aggregation Superpaths 1. As shown in FIG. 6, a level 2 L2 Aggregation Superpath 720 exists in two hops. The first hop exists between an L2 Aggregation Switch 521 in a Source E-Node 201 and its parent Source T-Node 301 Crossconnect Switch 570 where an L2 Disaggregation Switch 522 exists. The second hop exists between an L2 Source Aggregation Switch 521 in the Crossconnect Switch 570 and an L2 Disaggregation Switch 522 in a Destination E-Node 202.

2. Each L2 Aggregation Switch 521/L2 Disaggregation Switch 522 C-Switch pair requires a companion CV. The purpose of the CV is to control the aggregate bandwidth for all Path Aggregation Switches 511 in a Source E-Node 201 that connects to Path Disaggregation Switches 512 in Destination E-Nodes 202 that are children of a Destination T-Node 302 in the network. The number of Path Aggregation Switches 511 in the Source E-Node 201 equals the number of Destination E-Node 202 children of the Destination T-Node 302 where each Destination E-Node 202 contains a Path Disaggregation Switch 512.

3. Each Source E-Node 201 generates a Source L2 Aggregation Superpath 721 for the plurality of Destination E-Node 202 children that connect to a parent Destination T-Node 302. Each Destination E-Node 202 receives a Destination L2 Disaggregation Superpath 722 for the plurality of Source E-Node 201 children that connect to the parent Source T-Node 301.

4. The amount of bandwidth allocated to the plurality of Source L2 Aggregation Superpaths 721 for a given Destination T-Node 302 must equal the amount of bandwidth allocated to the plurality of Destination L2 Disaggregation Superpaths 722 from the given Source T-Node 301. In other words, the sum of all Source L2 Aggregation Superpath 721 bandwidths entering the Crossconnect Switch 570 equals the sum of all Destination L2 Disaggregation Superpath 722 bandwidths leaving the Crossconnect Switch 570.

5. In summary, referring to FIG. 5, consider the sum of the bandwidths for all Source L2 Aggregation Superpaths 721 embedded in the L3 Aggregation Superpath 731 labeled L3-11/D1. This sum equals the entire sum of all bandwidth for Destination L3 Disaggregation Superpath 732 labeled L3A3/D3. It also is the entire sum of L3 Aggregation Superpath 730 bandwidth labeled L3A2/D2. This is the bandwidth routed from a Source T-Node 301 to a Destination T-Node 302. Clearly, it is the entire L2 Aggregation Superpath 720 handled by the Crossconnect Switch 570 in the Source T-Node 301 that is relevant to the Destination T-Node 302.

A Preferred Method of Using Control Vectors to Implement New Control Vectors Each Source T-Node 301 can contain a plurality of Control Vectors that connect to each T-Node 300 in a network. Based on the results of finding routes in A Preferred Method of Discovering Loop-Free Routes in a Mesh Network described herein, the system can find disjoint, or nearly disjoint, routes that can support least delay routes. As disclosed in A Preferred Method of Assuring CV Reliability described herein, the system can support more than one Control Vector Aggregation 860 for each T-Node 300 pair.

A Preferred Method of Forwarding Data Aggregations Among Forwarding Nodes

In a SAIN network, Level 4 L4 Aggregation/Disaggregation Superpaths 740 can support forwarding data aggregations from a Source T-Node 301. As shown in FIG. 7, forwarding between a Source T-Node 301 and a Destination T-Node 302 could imply that a Source L3 Aggregation Superpath 731/Destination Disaggregation Superpath 732 direct connection. This can exist in a small network that does not require routing. In a more general case requiring routing, FIG. 5b, FIG. 5d, and FIG. 5e are more appropriate.

FIG. 5b shows an L3 Aggregation Switch 531 connecting to a plurality of Aggregation Forwarding Switches 541. A Source L3 Aggregation Superpath 731 can become a Source L4 Aggregation Superpath 741 that connects to one (or more) of the Aggregation Forwarding Switches 541 within a Source T-Node 301. There can be a single Source L3 Aggregation Superpath 731 connection for setting up a Point-to-Point route or for setting up a first hop of, or a participant hop in, a Point-to-Multi-Point, a Multi-Point-to-Point, or a Multi-point-to-Multipoint connection. This application and other applications disclose a plurality of methods for setting up routes in a network. The data forwarding method disclosed in this section is separate from routing disclosures.

Aggregation Forwarding Switch Connections from/to a Level 3 Aggregation Switch

FIG. 5 also shows that there can be an Aggregation Forwarding Switch 541 in a Source T-Node 301 for each outbound Source to Destination (T-Node-to-T-Node) TT-Trunk 351. A route connection is an L4 Aggregation/Disaggregation Superpath 740 that begins as a Source L3 Aggregation Superpath 731 from an L3 Aggregation Switch 531 connected from a Crossconnect Switch 570. The superpath becomes a Source L4 Aggregation Superpath 741 that passes through a TT-Trunk 351 to an Aggregation Forwarding Switch 541. The C-Switch and its attached Source to Destination TT-Trunk 351 have identification label Hop 23. The TT-Trunk 351 connects to a Disaggregation Forwarding Switch 542 with the same label (Hop 23) in either a Forwarding T-Node 303, shown in FIG. 5d or a Destination T-Node 302 shown in FIG. 5e (with different Hop numbers than those shown in FIG. 5b since the figure assumes that other intervening hops exist).

Aggregations of Control Vectors in a SAIN Network

A Control Vector that controls routing in a network can make use of a Control Vector Aggregation 860. Each specific CV can have a unique identifier that can exist in a table at both a Source T-Node 301 and a Destination T-Node 302 connected by a Control Vector Aggregation 860. A Control Vector Aggregation 860 can contain all Control Vectors 800 that exist between a pair of T-Nodes 300, or be divisible into sub-aggregations. Each sub-aggregation can have a unique identifier.

Role of Disjoint Partitions in the Size of Naming Identifiers

The disjoint partitioning of objects in a SAIN network can result in naming objects with short identifiers. For example, the size of an aggregation of objects could be set at an arbitrary number. However, choosing a power-of-two number can be useful since it can assure that partitions of a large aggregation of an object can use identifier bits in an efficient manner. This approach is particularly effective when CCVs are an appropriate way to identify particular objects within a large plurality.

Role of Forwarding Nodes in Routed Connections

When a route for sending data is set up, its relevant parameters at each node through which the route exist are in a table or some other suitable list. As explained above, a route is set up from a Source T-Node 301. For example, a Point-to-Point route can be a Source L2 Aggregation Superpath 721 from a Path Aggregation Switch 511 to become a Destination L2 Disaggregation Superpath 722 in a Path Disaggregation Switch 512.

Point-to-Multi-Point, Multi-Point-to-Point, and Multi-point-to-Multipoint connections can result in a plurality of Point-to-Point connections that are coordinated within the network. These types of Multipoint connections can achieve connectivity by setting up specific structures within T-Nodes 300 disclosed in detail in other embodiments. For purposes of this embodiment, the method addressed herein is the setting up of forwarding connections for both Point-to-Point and Multipoint connections.

End-to-End User Connections

As described herein, a Point-to-Point connection can be a Source L2 Aggregation Superpath 721 produced by a Crossconnect Switch 570 in a Source T-Node 301. A Point-to-Point connection begins with a User Source Data Port 291 connected to an Ingress NIC 211 in a Source E-Node 201. Attached to the Ingress NIC 211 is an Ingress E-Node Controller 221.

An Ingress NIC 211 can process data entering a User Source Data Port 291 of many protocols. Fundamentally, incoming data can be one of at least three types—packet data, constant bit rate (CBR) data, or SAIN format data from a companion SAIN network. These data normally arrive in one of three contexts. Packet data arrives in P-Frames (packet data frames) such as those that accompany an Ethernet packet. CBR data can have C-Frames (constant bit rate data frames). Sframes (SAIN data frames) accompany connecting data from a SAIN network. P-Frames and Sframes can be critical for using all of SAIN networks capabilities in forwarding data through a SAIN network. C-Frames can also make use of SAIN network capabilities. However, for all data framing types, data entering a User Source Data Port 291 can connect to a Destination Data Port 292 through a routed connection where the data remains in a raw state. The connection can exist either at a fixed data rate or at a dynamically changing data rate if the user interface includes variable data rate send/receive clocks.

Role of Connection Identifiers (CIDs) and Disjoint Partition Numbering in a SAIN Network A first occurrence of a connection from a User Source Data Port 291 of a Source E-Node 201 to a Destination Data Port 292 of a Destination E-Node 202 can initiate defining a new Connection Identifier (CID) 851. A CID can divide into segments. One segment can relate to a CID as a global entity. For example, an Ethernet P-Frame that is of fixed length and encapsulates seven MPEG frames is a common specific protocol. Adding eight or ten bytes can provide a standardized seven MPEG C-Frames with an eight-byte or ten-byte Reed-Solomon code added. There are a number of other fixed-length standardized Ethernet P-Frame examples. An Ingress NIC 211 can recognize many of these using a current state-of-the-art protocol processor. The precise number of Ethernet P-Frames with standardized length protocols is unknown, but it is probably less than 65,536, a 16-bit number. This result is likely to obtain even when Internet Protocol (IP) Layer 3 parameters are included. In some circumstances, even a larger number of "standardized" packet protocols can exist. Regardless of the size, there is an important way to use this knowledge in a CV setting.

An important concept of the method disclosed in this section is that the nature of disjoint objects can reduce the size of addressing objects within the same identification class. For example, consider a two-point Path Aggregation Link 710 connection between a Path Aggregation Switch 511 and a Path Disaggregation Switch 512. The number of connections in the path can be large, but is divisible into disjoint partitions. A partition number and a short connection object number within the partition can identify each connection.

For example, suppose that the upper limit for the number of connections in a Path Aggregation Link 710 is set to be 65,536. Dividing the partition into 256 sub-partitions would result in each sub-partition containing 256 connections. Each sub-partition can have an 8-bit label, and each connection within a sub-partition can have another 8-bit label. Using Control Vector messages, the labels can make use of implicit addressing within a CV for each sub-partition by using. At most, this requires a one-bit CV in a Compound Control Vector (CCV). Furthermore, using a second tier one-bit CV to designate a plurality of sub-partitions results in requiring two one-bit labels rather than 16-bit connection addresses. A major benefit is that each Control Vector contains a small number of bits compared to the number required in control packets. For example, the minimum size of an Ethernet P-Frame is 512-bits (not including a 64 framing bits and a silence period). At least 144 bits of the C-Frame overhead compared to 32-bits for a CRC and 2-bit CCV addresses for sending a large number of short messages.

The Method Disclosed Above is Usable in at Least Four Environments.

Setting Up and Terminating Connections

One is setting up and terminating a connection. Since the connectivity tables, i.e. positions within a Source Switch Stack Selector 121 and a Destination Switch Stack Selector 122 are synchronized, it is possible to designate the same position in the pair of Switch Stack Selector 120 for a given connection. This enables an Ingress E-Node Controller 221 to release a connection from the two Switch Stack Selectors 120 if a connection process is completed, or if the connection has been placed into a virtual connection mode beyond a defined period. Using the method for initiating and terminating a connection enables aggregating connections into different duration classes. One could be connections made and kept active for substantial periods (e.g., any period beyond 9 hours) could remain in either a virtual or a real state. [A virtual connection does not require consuming network bandwidth beyond one bit in a CCV per CV epoch.] Returning a connection into a real state is immediate (i.e., no more than one CCV epoch period).

Connection Bandwidth Management

A second environment involves network bandwidth management. A CCV can either leave a bandwidth assignment unchanged or modify it using a one-bit per cellet CV together with a CV that assigns new bandwidth. The one-bit cellet can be "0" if a bandwidth remains unchanged. [A bandwidth of zero denotes a virtual connection that does not change until a "1" occurs in the one-bit cellet CV.] In a SAIN network environment, each Source T-Node 301 can forward the amount of bandwidth available for each of its outbound trunks to each other T-Node 300 in the network. This can use Control Vectors to every other T-Node 300 during an assigned epoch period. (For example, the epoch could last for one millisecond.)

In addition to the available trunk bandwidth, a Source T-Node 301 can send the available bandwidth from the Source T-Node 301 to each Destination E-Node 202 child. Each Source T-Node 301 can broadcast this information to every other Source T-Node 301 in the network. The result is that every Source T-Node 301 has complete information concerning bandwidth availability to every Destination E-Node 202 in the network. Each Source T-Node 301 can forward this information to each of its Source E-Nodes 201, thereby assuring that no bandwidth commitment occurs when the required bandwidth does not exist. [A number of scenarios can minimize the occurrence of this event within the core network. The largest vulnerability resulting in lack of available bandwidth can occur in an E-Node-to-T-Node Trunk 231 or a T-Node-to-E-Node Trunk 322. A service provider must feel responsible for keeping bandwidth available in these trunks "ahead of the curve".]

Class of Service Partitions

A third environment involves dividing a connection into Class of Service partitions. For example, some network architects divide a connection into three classes. One is for high priority traffic, a second is for less important traffic, and the third is for "best efforts" traffic. A SAIN network can operate in a deterministic manner in terms of assigning bandwidth to routes of deterministic delay. Using this capability allows assigning bandwidth by Class of User, which can be important in military and political environments. In some cases, this becomes more important than allocating bandwidth as a Class of Service.

In a SAIN environment, bandwidth used for network management can take precedence over any other use of bandwidth. Control Vectors take up a relatively small amount of bandwidth compared to forwarding data, but many uses of CVs can demand the ultimate in priority with low delay. [Some CVs do not demand extremely low delay. For example, those that deal with adding new services do not normally require millisecond and microsecond delay.]

Although political needs can trump Class of Service needs, a better method to define service needs is not by arbitrary priority classes. Measuring whether traffic in one service class has taken precedence over traffic in another class is difficult to measure. This is particularly true if most service exists in one priority class. In this case, the rule becomes more dependent on network delay a congestion problems than deterministic measurements.

In a SAIN network, there is only one differentiating metric—delay. In many cases, propagation delay is a limiting part of overall delay. If this were the case, routing methods should be able to allow traffic that does not require extremely low delay to use bandwidth available over relatively high delay routes. The usual metrics that affect a network's Quality of Service (QoS) are congestion inside a network resulting in packet loss, jitter, out-of-order packet delivery, and the like. None of these parameters are needed in a SAIN network. The only service quality available and required by users is delay.

Class of Service partitioning need not be restricted to partitioning Path Aggregation Link 710 connection space. It can also involve both Source L2 Aggregation Superpaths 721 and Source L3 Aggregation Superpaths 731. Partitioning these superpath spaces enables network operators to manage allocation of bandwidth on a network-wide basis. This can be a major departure from allocating bandwidth only for much smaller bandwidth aggregations.

Massive Expansion for the Number of Vlan and Vpn

In conventional Ethernet data centers and Metropolitan Networks, current practice restricts the number of VLAN/VPN tags to 4,096 (not including a second tag number of the same length than nominally is limited to use by a service provider). In a large data center or Metropolitan Ethernet Network (MEN), this number is inadequate. The SAIN approach using CIDs expands this numbering far beyond this number. A network or data center can partition a network into virtual VLAN/VPNs using addresses that can be as large as desired. A CID can add a VLAN/VPN address to the identification of a connection. The address can limit its use to port numbers, MAC addresses, and additional information such as person identification, application availability, virtual machines, and so forth. For a large VLAN or VPN, a partition or sub-partitions of connection space could be appropriate. Used properly with proper administrative procedures can enhance network security.

Forwarding Traffic with Level 3 and Level 4 Switches

As disclosed in the RS1, a SAIN network does not require adopting industry standards for data forwarding. Currently installed networks such as RS1 and Carrier Ethernet could be a Physical Layer surrogate in supporting the SAIN transport protocol. Doing so would not result in some of the delay and bandwidth utilization benefits of a SAIN network using basic Physical Layers. Nevertheless, it would allow existing networks to make use of many SAIN benefits other than assuring SAIN's lowest possible delay.

Running the algorithm in A Preferred Method of Discovering Loop-Free Routes in a Mesh Network beginning at paragraph [0050] can enable the system to choose a route through a network that meets user requirements. The chosen route can be a list of successive hops through which a connection passes.

As shown in FIG. 5b, a Source T-Node 301, T3, there is a Crossconnect Switch 570 for each Destination T-Node 302 in the network. The Crossconnect Switches 570 handle all L2 Aggregation Superpaths 720 generated by each Source E-Node 201 child of the Source T-Node 301 parent. Each Crossconnect Switch 570 handles those L2 Aggregation Superpaths 720 that pass through one of the Destination T-Nodes 302 on their way to its Destination E-Node 202 children. The outputs from a Crossconnect Switch 570 are L2 Aggregation Superpaths 720 each of which terminates in one of the Destination E-Node 202 children. Each of the terminating L2 Aggregation Superpaths 720 contains a plurality of Destination Paths 712 each of which originated as a Source Path 711 in each of the children of the Source T-Node 301.

Routes in a SAIN network exist among T-Nodes 300 of a network. The plurality of Point-to-Point connections between children of a Source T-Node 301 to a Destination T-Node 302 exist within L2 Aggregation Superpaths 720 routed among the T-Nodes 300. [Routes can exist for multi-point connections where routes consist of subsets of Point-to-Point connections can originate and terminate through multiple T-Nodes 300. These embodiments are included in other applications.]

Figure 18:
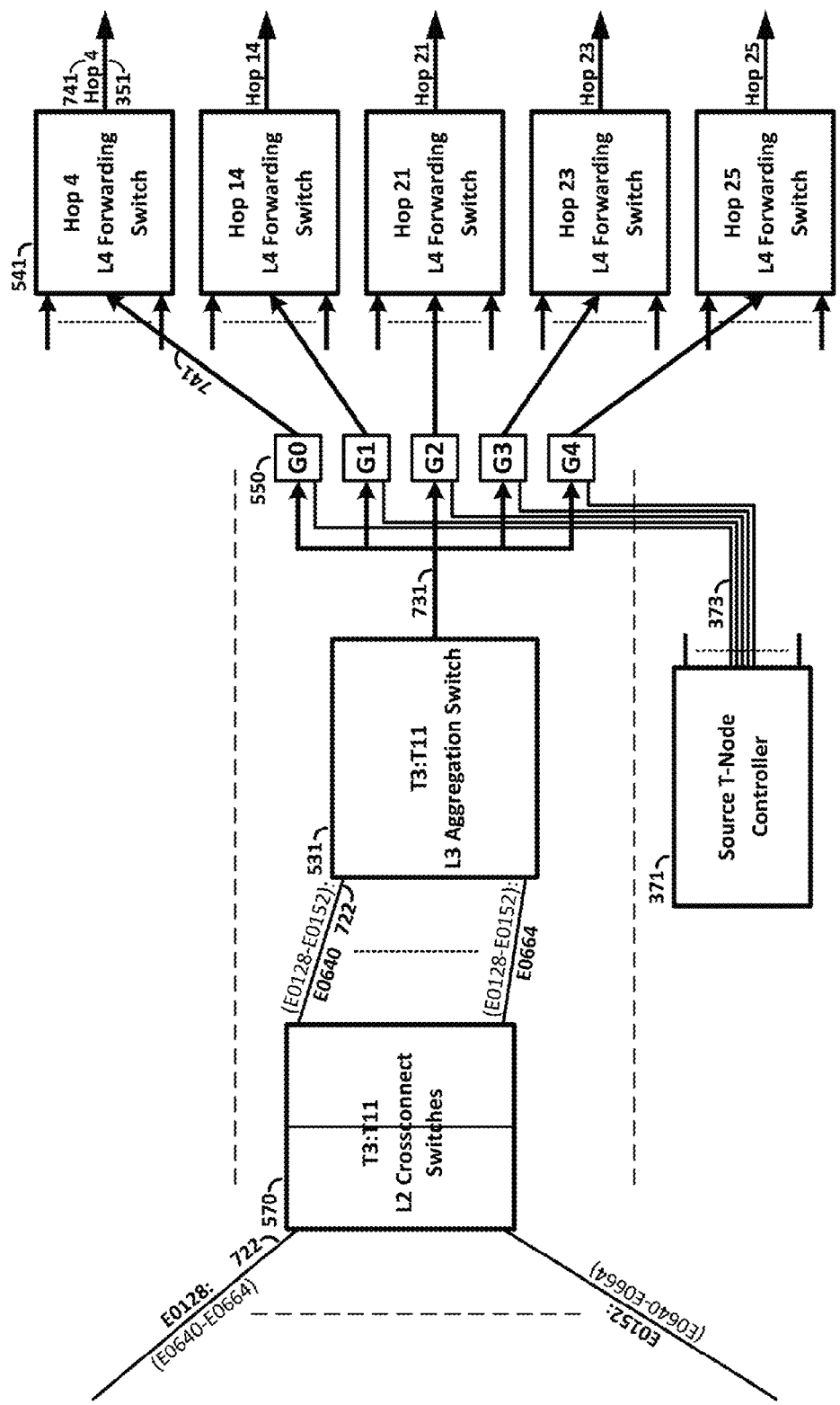
FIG. 18 shows a method of initiating a Point-to-Point route in a network based on the model network according to an embodiment.

FIG. 18, an expansion of portion of FIG. 5b in RS1, shows a method of initiating a Point-to-Point route in a network based on the model network shown in FIG. 5. The Crossconnect Switch 570 labeled T3:T11 denotes that the C-Switch exists in Source T-Node 301 T3 and the traffic handled by the C-Switch is L2 Aggregation Superpaths 720 that passes through Destination T-Node 302 T11. Referring to FIG. 5, the route chosen as an example uses three hops with Source-to-Destination TT-Trunks 351 labeled "23", "50", and "51".

The L3 Aggregation Switch 531 labeled T3:T11 aggregates all L2 Aggregation Superpath 720 traffic between the two designated nodes. Using the chosen route, the first hop is Source-to-Destination TT-Trunks 351 "23". A Source T-Node Controller 371 can control traffic either originating or passing through the Source T-Node 301. In this case, the controller chooses Gate 550 labeled "G3".

Five Source-to-Destination TT-Trunks 351 connect the Source T-Node 301 to other neighboring nodes. These five Source-to-Destination TT-Trunks 351 handle all outgoing traffic leaving the Source T-Node 301. This includes traffic from all Crossconnect Switches 570 in addition to transit traffic from other T-Nodes 300 and possible traffic generated within the Source T-Node 301 such as Control Vectors.

The output from an L3 Aggregation Switch 531 connected from a Crossconnect Switch 570 is a single data stream insofar as functionality exists with a Source T-Node 301. [L2 Aggregation Superpaths 720 disaggregate from an L3 Aggregation Superpath 730 in a Destination T-Node 302. Each of the L2 Superpaths terminates in a Destination E-Node 202 child of the Destination T-Node 302.] When routes contains more than one hop, Forwarding T-Nodes 303 forward L3 Aggregation Superpaths 730 from Crossconnect Switches 570 to L3 Disaggregation Switches 532 in Destination T-Nodes 302.

Traffic Forwarding Between Forwarding Nodes

As shown in FIG. 5d of RS1, each Forwarding T-Node 303 contains a plurality of Disaggregation Forwarding Switches 542 and the same number of Aggregation Forwarding Switches 541. The number of Disaggregation Forwarding Switches 542 equals the under of Destination from Source TT-Trunks 352 entering a Forwarding T-Node 303; the number of Aggregation Forwarding Switches 541 equals the number of Destination from Source TT-Trunks 352 leaving the Forwarding T-Node 303. As long as each of the trunks is a Duplex TT-Trunk 350, the number of trunks entering and leaving Forwarding T-Node 303 is the same.

However, from a routing point of view, the number of nodes leaving a Forwarding T-Node 303 is one less than the number entering the node. The reason is that the Source to Destination TT-Trunk 351 entering the node does not use the Destination from Source TT-Trunk 352 of the same Duplex TT-Trunk 350. This would merely return data entering Forwarding T-Node 303 to the Destination T-Node 302 or another Forwarding T-Node 303, causing a loop.

Each Disaggregation Forwarding Switch 542 in a Forwarding T-Node 303 has a similar structure to an L3 Aggregation Switch 531 that is the source of a route in a Source T-Node 301. Each Disaggregation Forwarding Switch 542 has a number of Gates 550 equal to the number of Aggregation Forwarding Switches 541 in a Forwarding T-Node 303. In addition, Each Aggregation Forwarding Switch 541 can have a number of Gates 550 equal to the number of Disaggregation Forwarding Switches 542 in Forwarding T-Node 303. The Gates 550 in a Forwarding T-Node 303 are set for each link that passes through the node. In other words, the data for each link leaving a Disaggregation Forwarding Switch 542 passes through a Gate 550 to a Gate 550 at an outbound Aggregation Forwarding Switch 541.

Although there is a similarity between forwarding an entire aggregation of L2 Aggregation Superpaths 720 by an L3 Aggregation Switches 531 in a Source T-Node 301, there is a significant difference (not shown explicitly in FIG. 5b or in FIG. 5 d of RS1). For Point-to-Point connections in the model network, there can be up to 20 connections from L3 Aggregation Switches 531 to each Aggregation Forwarding Switch 541 in a Source T-Node 301. Connections from L3 Aggregation Switches 531 are trunk-like since they are not part of an aggregation. They become link-like in an Aggregation Forwarding Switch 541 since such a C-Switch aggregates a plurality of the Source L3 Aggregation Superpath 731 from the L3 Aggregation Switches 531. [Not shown explicitly in FIG. 5d of RS1, but implied, are greyed-out stubs entering the Aggregation Forwarding Switches 541.] A substantially larger number of Point-to-Point Level 2 aggregations are possible in an Aggregation Forwarding Switch 541/Disaggregation Forwarding Switch 542. In the model network, there are Point-to-Point connections among T-Nodes 300.

Forwarding connections can make use of FIFO buffers at the ingress connection to a Source L3 Aggregation Superpath 731, Source L4 Aggregation Superpath 741, or a Destination L4 Disaggregation Superpath 742 connection. The reason for the buffers is the possible timing difference between network components.

A Preferred Method of Adding New Connections to SAIN Forwarding Routes

A SAIN network can operate with four levels of data aggregation. These are:

1. Level 1: This path level aggregates user connections and logically involves a single hop route between a Source E-Node 201 and Destination E-Node 202 pair.

2. Level 2: This level aggregates Level 1 connections and logically involves two hop routes between Source E-Nodes 201 and Destination E-Nodes 202. The first hops are between L2 Source Aggregation Switches 521 in a Source E-Node 201 and L2 Disaggregation Switches 522 within each Crossconnect Switch 570 C-Switch in the parent Source T-Node 301 of the Source E-Node 201. The second hops are between L2 Source Aggregation Switches 521 in the Crossconnect Switches 570 and L2 Disaggregation Switches 522 in each Destination E-Node 202.

3. Level 3: This level aggregates Level 2 connections and logically involves three hop routes between Source E-Node 201 and Destination E-Node 202 pair. The first hop is between an L3 Aggregation Switch 531 in a Source E-Node 201 and its parent Source T-Node 301. It aggregates all Source L2 Aggregation Superpath 721 generated in the Source E-Node 201. The L3 Disaggregation Switch 532 all Destination L2 Disaggregation Superpaths 722 generated by the L3 Aggregation Switches 531 that terminate in the Crossconnect Switches 570. The second hops are between L3 Aggregation Switches 531 that aggregate Source L2 Aggregation Superpaths 721 from the Crossconnect Switches 570 and matching L3 Disaggregation Switch 532 in Destination T-Nodes 302. The third hops are between the L3 Aggregation Switches 531 in the Destination T-Nodes 302 that connect to each of the network's Destination E-Nodes 202.

4. Level 4: This level aggregates all Level 3 routes created by L3 Aggregation Switches 531 in a Source T-Node 301 each of which terminates in an L3 Disaggregation Switch 532 in a Destination T-Node 302 of a network. The number of hops for each route is those needed to achieve connectivity between each of the T-Nodes 300 node pairs.

To set up a new connection within a Path Aggregation Link 710 requires only setting up the connection entering a Connection Bandwidth Register 553a or Connection Bandwidth Register 553b, whichever is not operational. The connection become operational when the non-operational Connection Bandwidth Register 553 becomes operational and the operation Connection Bandwidth Register 553 become non-operational. Control Vectors can easily control this process.

At Level 2, the two hops for each L2 Aggregation Superpath 720 involve a Crossconnect Switch 570. In this case, the bandwidths of Path Aggregation Links 710 require synchronization through a Crossconnect Switch 570. This can involve implementation of Control Vectors from an L2 Source Aggregation Switch 521 to two L2 Disaggregation Switches 522, one in the Crossconnect Switch 570 and the other in the Destination E-Node 202. The Control Vector for the L2 Disaggregation Switch 522 in the Crossconnect Switch 570 can support the L2 Source Aggregation Switch 521 in the Crossconnect Switch 570 concomitantly. As shown in the figures, the sum of the bandwidth of Source L2 Aggregation Superpaths 721 leaving a Crossconnect Switch 570 is equal to sum of the bandwidth of all Destination L2 Disaggregation Superpaths 722 entering the Crossconnect Switch 570. This property can apply to point-to-point connections between Source E-Nodes 201 and Destination E-Nodes 202. However, it may not apply to networks involving multipoint connections.

Three Level 3 hops route L2 Aggregation Superpaths 720 from an L3 Aggregation Switch 531 in a Source E-Node 201 that terminate in an L3 Disaggregation Switch 532 in a Destination E-Node 202. However, in normal circumstances, the Destination L3 Disaggregation Superpath 732 is not the same as the Source L3 Aggregation Superpath 731.

Each Source L2 Aggregation Superpath 721 from one Source E-Node 201 terminates in a different Destination E-Node 202.

The first hop begins in an L3 Aggregation Switch 531 within Source E-Node 201 and terminates in a Destination T-Node 302 in its parent Source T-Node 301. For a point-to-point connection, there is one Destination T-Node 302 for each child Source E-Node 201 of a parent Source T-Node 301. Each Destination T-Node 302 disaggregates Destination L2 Disaggregation Superpaths 722, each of which terminates on an L2 Disaggregation Switch 522 C-Switch within a Crossconnect Switch 570. The Crossconnect Switch 570 rearranges the Path Aggregation Links 710 within the L2 Aggregation Superpaths 720. The result is a plurality of Source L2 Aggregation Superpaths 721, each of which terminates in a different Destination E-Node 202.

The third hop for point-to-point connections from a Destination T-Node 302 to a Destination E-Node 202 is similar to the first with one major exception. The plurality of Destination L2 Disaggregation Superpaths 722 originates in a different Source E-Node 201.

The method of adding a connection can take place at each of the aggregation levels. For a Path Aggregation Link 710, a new connection can take place by assigning a new connection to an unused position in a Switch Stack Selector 120 within a Source E-Node 201 and a Destination E-Node 202. This connection can have no effect on an L2 Aggregation Superpath 720 in which the connection exists except for its possible effect on the bandwidth of the L2 Aggregation Superpath 720.

At an L2 Aggregation Superpath 720, a new connection can take place when a new T-Node 300 becomes a part of a network. In this case, a new position on each L2 Source Aggregation Switch 521 and L2 Disaggregation Switch 522 in the network that will support traffic involving the new T-Node. It is possible for security reasons to add such positions only to those nodes with connections requiring access. Even with the addition of a new T-Node 300 with physical access from every E-Node 200 in a network, careful addition and surveillance of VLAN and VPN capability can provide similar benefits to disallowing access from certain E-Nodes 200 and/or T-Nodes 300.

A Preferred Method of Changing Bandwidths of Forwarding Connections without Requiring Superfluous Bandwidth Changing bandwidths can be a puzzling problem for any network that needs to change end-to-end bandwidth of a connection through a multi-hop forwarding network. The difficulty has been a major reason for the preference of P-Switching compared to C-Switching. An asynchronous P-Switched network must rely on buffers at each node to smooth out traffic. The puzzling problem has been an ability to overcome buffer and trunk congestion. [Packet discard has been an undesirable solution.]

The telephone network was the only extent C-Switching model in 1970; changing a connection's bandwidth dynamically never appeared to be important. Actually, a patent ("Multiplexer 3,665,405) of the inventor and two co-inventors can enable dynamic bandwidth changes in a C-Switch-based network. It issued in 1972 and was the basis of the first large-scale nationwide digital network (in Canada) that made low-cost modem-like data transmission available throughout the country. It was operational with eleven nodes in 1973, two years before the U.S. Defense Department declared the Arpanet "operational". The Canadian network extended to over 200 nodes during ensuing months and years and was in service for over 20 years. A real-time dynamic version of the algorithm (called "Pacuit" switching) was in use in multi-node networks in several countries beginning in 1975. The current SAIN multiplexing algorithm is much simpler than the 1972 version and introduces entirely new concepts and methods.

If one were use telephone network methods, one would be to set up a second route to carry a different amount of bandwidth compared to a first route. There are two substantial drawbacks to this approach. One is that the total network bandwidth required to do this involves, at least temporarily, setting up the combined bandwidths of the one or more routes. A second drawback is that the routes can have an appreciably different end-to-end delay. For some applications, this can present difficulties to a user.

Another choice of the method is telephone method to add a connection within the present route. Unfortunately, this approach has one of the same drawbacks of the preceding possible method. It must reserve a peak sum of the bandwidths of the current connection embedded within each of the trunk hops.

Yet another method would be to set up a Control Vector between nodes connected by a trunk that belongs to a route and change route bandwidths on a hop-by-hop basis. This method overcomes the requirement for setting up a relatively large amount of bandwidth temporarily, but now, success requires assuring that each hop's allocated connection bandwidth exists just in time for the new bandwidth to arrive at a Disaggregation Forwarding Switch 542 of a Forwarding T-Node 303. This could be a daunting task using the older method in a large network where it could be difficult to assure accurate timing.

A suitable method to change a connections bandwidth is as follows:

1. If the requirement is to increase the bandwidth of a connection, perform the following tasks:
   a. Set up a separate connection that contains the desired incremental bandwidth
   b. When each hop has completed setting up the incremental bandwidth required, combine the two connections into one that contains the required new bandwidth total.
   c. Arrange the two connections at each hop in a manner that can support combining source and destination bandwidth making use of the combined bandwidths of each intermediate hop.
2. If the requirement is to decrease the bandwidth of a connections, perform the following tasks:

a. Reduce the end-to-end bandwidth in the current end-to-end connection by changing an existing connection to fill a single range in the ingress and egress Connection Domains (CDs).
b. Divide the CD of each hop into two partitions, one for the new bandwidth and one for the residue.
c. Cause the two connections to appear as a single connection temporarily at each hop.
d. Cause the connection terminations to divide its bandwidth into two connections.
e. The source and destination bandwidths for the non-existent traffic are now zero, which allows each CD to adjust its size to a new lower bandwidth.

The method outlined above can use CDs in several ways. A simple one (not shown in a figure) is to divide each stack position into two contiguous positions for those connections that may require dynamic bandwidth changes. In this case, the following events occur:

1. Each of the two contiguous stack positions is bound to one of two contiguous Connection Domain ranges. One Connection Domain (CD-A) defines bandwidth for the current connection; the other Connection Domain (CD-B) has zero bandwidth.
2. To increase a connection's bandwidth, the following process can occur:
3. The CD-B of each C-Switch pair along the route including source and destination C-Switches are set to the incremental additional bandwidth.
4. The combination of two contiguous CDs can appear as a single connection. Once the CD pairs for each hop along a route have the new settings, the source and destination CDs can set their CD-As to the new connection bandwidth and their CD-Bs to zero.
5. The CD pairs at each hop can change independent of one another or of the source/destination pair.
6. To decrease a connection's bandwidth, the following process can occur:
7. The connection's bandwidth is concentrated into CD-A; the unused bandwidth is in CD-B.
8. Each hop changes its CD-A and CD-B to match the source/destination CDs.
9. CD-B can be set to zero at each hop including the source/destination CDs.

Even though this is a simple way to manage bandwidth changes, it requires doubling the number of positions in each Switch Stack Selector 120 that contains two positions per connection. A more suitable result would be a method that did not require doubling of the positions.

Figure 20:
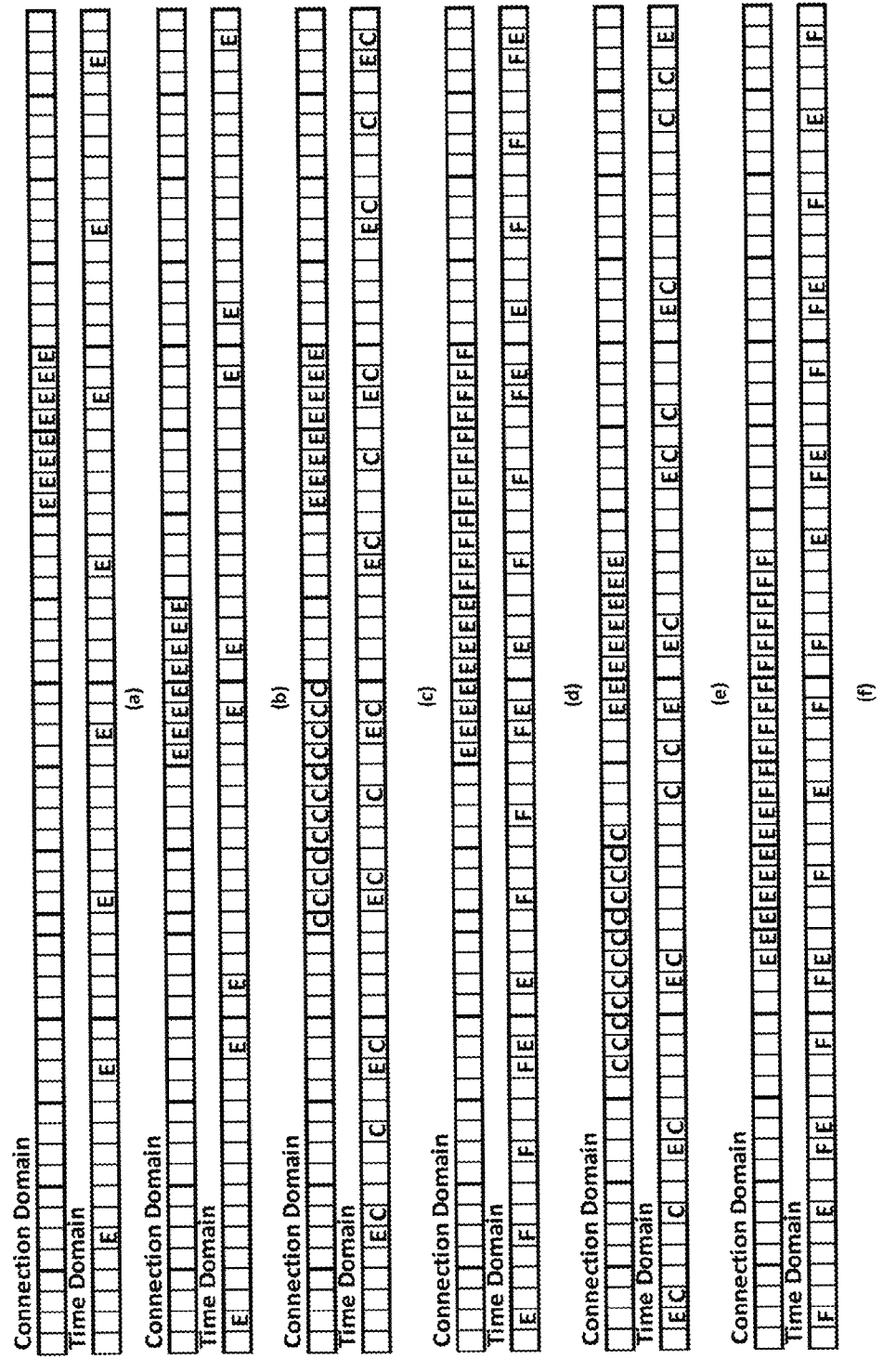
FIG. 20 illustrates a method of changing bandwidths of forwarding nodes that requires no superfluous bandwidth according to an embodiment.

FIG. 20 shows a method that meets this requirement. Incremental bandwidth can exist using any empty position within a Switch Stack Selector 120. The method shows the advantages of using integer multiples of Power-of-Two length connections within a larger C-Frame context.

The C-Frame work of the Connection Domain and Time Domain C-Frames of FIG. 20 use a C-Frame that contains 64 one-bit cellets that are divisible into Power-of-Two subframes. [The C-Frame as an example can be of any length greater than the sum of lengths of all connections and subframes. For example, if a C-Frame length were 59 cellets, one could divide a C-Frame into 4 subframes. One subframe would contain 14 cellets 3 subframes would contain 15 cellets. Regardless of a C-Frame's length, dividing it by a Power-of-Two results in C-Frames whose lengths differ by no more than one cellet.]

A basic tenet of Time Division Multiplexing is to divide data streams into frames as a basis of defining its supportable bandwidths. Such C-Frames determine a Quantum Data Rate (QDR) for a single cellet. The QDR equals the Frame Rate multiplied by the Cellet Size. [An assumption is that cellet size is the same at each position within a C-Frame.] A supportable bandwidth is an integer multiple of a QDR.

If a connection is one cellet per C-Frame, the data rate equals the QDR. The location of the one cellet in the C-Frame determines its location in the time domain. There is a one-to-one correspondence between the cellet in the Connection Domain and in the Time Domain. The Connection and Time Domain maps can be the same at both an Aggregation Switch 501 and a Disaggregation Switch 502. In this case, knowledge of the location of the one cellet determines the exact time of arrival of the cellet in the Time Domain of the Generic Disaggregation Switch 502. If the one cellet connection remains in the same place in the source Connection Domain for a considerable period, this could result in a very low delay connection. Unfortunately, in many cases, connections are very dynamic. Connections are added and deleted and their bandwidths can change very quickly. The practical result is that it is necessary to receive an entire C-Frame to keep things simple.

Fortunately, in a SAIN network, there is a simple way to provide very low delay for high-speed connections where the source C-Frame rate is relatively slow. A C-Frame with a low QDR can partition into subframes each of which is relatively small. In this case, a QDR' can be one cellet per subframe. This requires receiving data for only a short subframe period before passing it along to a data sink. This technique enables designing a SAIN network where short subframes can minimize delay in all aggregation levels above the Path Level 1.

Dividing a C-Frame into subframes based on Powers-of-Two makes the process very simple. FIG. 20 illustrates some of the properties of the approach. Each 64-cellet C-Frame becomes four 16-cellet C-Frames. This results in setting enabling a Base Bandwidth, i.e., a QDR' that is 4 times the overall C-Frame rate. Whether the overall bandwidth is a Power-of-Two in length is irrelevant as explained above.

FIG. 20 (a) shows the Connection and Time Domains of an 8-cellet connection labeled "E" starting at the cellet 40 in the Connection Domain. The first cellet in the Time Domain is at position 5. [The numbering of the both domains begins at 0.] Each succeeding "E" cellet is spaced 8 cellets later in the Time Domain. For all cases where the first cellet of the Connection Domain is divisible by 8, a similar result obtains. The difference is that the left-most cellet in the Time Domain occurs at a different location in the first 8-bits of the Time Domain.

FIG. 20 (b) shows the same "E" cellets whose first position is at position 28 in the Connection Domain. In this case, in the Time Domain, the "E" cellets are no longer equally spaced, but they remain in the same positions in the 4 C-Frame partitions. In essence, the cellets represent two baseband four-cellet QDR's combined into a single subframe.

FIG. 20 (c) shows two groups of Connection Domain cellets. One is the original (a) group that contains two four-cellet QDR's; the other is a 3 four-cellet QDR's group (12 cellets with "C" labels). In the Time Domain, the result is four sub-frames, each of which has the same pattern of cellets.

FIG. 20 (d) shows the same number of 12-cellet and 4-cellet connection groups that, in the Connection Domain. They could make a 20-cellet Connection Domain group if they were a single connection group. This shows that if two disjoint groups of cellets produce the same number of cellet in each subframe as if the groups were contiguous. In other words, if the only parameter of interest is the number of cellets in the combined groups is the issue of consideration both representations are equivalent. In both representations, the individual connections, "C" and "E" in FIG. 20 (c), and "F" and "E" in Fig. RT (d) have no relevance to the objectives of producing a single larger group of cellets. The combination group can support one large connection.

The lesson learned from the two figures is that two disjoint subframe connections are viewable as one larger connection. From an apparatus point of view this enables the following: The method can use an "OR" gate to combine two "AND" gate outputs from a "C"-like and an "E"-like positions in a Switch Stack Selector 120. The method can apply to any plurality of Switch Stack Selector 120 outputs. In operation, there can be a Destination Switch Stack Selector 122 synchronized to a Source Switch Stack Selector 121 using Control Vectors 800. There can also be multiple hops for multipoint connections using the same technique.

FIGS. 20 (e) and (f) illustrate an extremely important point of the process method disclosed herein thus far. The "C", "F", and "E" connections are not rooted on a Power-of-Two boundary. This means that combining disjoint connections can include any combination of Power-of-Two connections into a larger integer multiple of a Base Bandwidth QDR'. This means that a large C-Frame can split into a plurality of subframe partitions, each of which can use a Base Bandwidth independent of another. In other words, there is complete freedom in partitioning bandwidth within a large C-Frame as long as Base Bandwidths are Powers-of-Two integer multiples the large C-Frame's QDR.

A Preferred Method of Synchronizing Nodes in a SAIN Network

Each T-Node 300 contains a T-Node Master Clock 380 to which all aggregation and disaggregation C-Switches can be synchronized. The C-Switches include, but are not limited to Path A/D Switches 510, L2 A/D Switches 520, L3 A/D Switches 530, and L4 A/D Switches 540.

For example, an L3 Disaggregation Switch 532 clock synchronizes with the T-Node Master Clock 380 in a T-Node 300. A T-Node Outgoing Master Clock Signal 381 is sent to a Destination E-Node 202 along with a Destination L3 Disaggregation Superpath 732 in a TE Trunk 322.

Each E-Node 200 contains an E-Node Master Destination Clock 282 that synchronizes to a T-Node Outgoing Master Clock Signal 381. In addition, a E-Node 200 contains a second E-Node Master Source Clock 281 synchronizes in frequency to the E-Node Master Destination Clock 282. The E-Node Master Source Clock 281 can synchronize all clocked objects in the Source E-Node 201 partition in the E-Node 200. The E-Node Master Destination Clock 282 can synchronize all clocked objects in the Destination E-Node 202.

The E-Node Master Source Clock 281 is indirectly synchronized in frequency to the T-Node Master Clock 380 through the E-Node Master Source Clock 281. It can also synchronize in phase to the T-Node Master Clock 380 using commonly methods known to the art. This includes a means whereby the parent T-Node 300 measures the arrival time of a T-Node Return Master Clock Signal 382 generated from the E-Node Master Source Clock 281. The goal of the method is to cause data and Control Vector signals from all Source E-Nodes 201 connected to the parent T-Node 300 to be in phase with the T-Node Master Clock 380 with a small amount of time ahead of T-Node processing required to forward data and Control Vector signals to other T-Nodes 300.

A Preferred Method of Synchronizing Multiple Flows of a Plurality of CVs and Data C-Frames Between Sources and Destinations Each Source Path 711 can contain a Source E-Node Time Stamp 285 that accompanies a C-Frame that forwards the Source Path 711 or portions thereof. A CV or aggregation thereof that pertains to a particular frame also contains a Source E-Node Time Stamp 285. The time stamps can enables a Destination E-Node 202 controller to assure that Path Disaggregation Switch 512 synchronize with Control Vector messages arrival times of the data C-Frames they control.

A time stamp length (in bits) needs to be large enough to meet delay variations between routes that interconnect T-Nodes 300, but not larger.

In a similar manner, L2 A/D Switch 520 pairs and L3 A/D Switch 530 pairs can also employ time stamps to assure synchronization of their Control Vector and data C-Frames. L4 A/D Switches 540 can use much smaller (in bits) time stamps than are used in inter-T-Node processes outlined above. This results from the application of L4 A/D Switches 540. They normally apply to single hop situations.

A Preferred Method of Synchronizing Frames Between Connected Nodes

FIG. 27 of RS1 shows a method of utilizing a large data rate trunk with a data rate that is not a Power-of-Two. The figure shows that such a trunk can be partitioned into a number of disjoint Powers-of-Two. For any existing or future trunk that is not a Power-of-Two rate this capability can result in separating a framing signal from data signals without requiring a relatively long C-Frame synchronization signal being embedded as a pre-header of a C-Frame. For instance, in current practice there is a 64-bit preamble (often plus a 96-bit interframe gap) placed in front of an Ethernet P-Frame. Requiring such an approach in a SAIN C-Frame would add 64 nanoseconds to a 1 Gbs link. Even with a 10 Gbs link, the addition would be 6.4 ns. Even more, this delay would take place at each hop between a source and destination.

By using the result shown in FIG. 27 of RS1, a SAIN network can make use of a small Power-of-Two data rate partition of a large sized trunk to send very short sequences at the beginning of each trunk. For example, one can use short Ethernet preamble-like symbols of alternating "1's" and "0's" at a rate of one symbol every 1,000 data symbols. This would require devoting 0.1% of link bandwidth to C-Frame signaling. The smallest size Ethernet C-Frames us 64 bytes plus the preamble. Not taking into account the interframe gap required in many instances, the preamble size (64 bits) divided by the size of the preamble and the shortest Ethernet P-Frame (576 bits) equals 11.1% of the total available bandwidth. Even with a typical Ethernet P-Frame (500 bytes), the preamble requires 1.6% of the link bandwidth not including an interframe gap. With an interframe gap and the largest standard Ethernet P-Frame size (1522 bytes), the preamble plus interframe gap uses 1.30% of the link bandwidth. It is true that maintaining synchronization using the suggested interleaved "1's" and "0"s" requires more than one P-Frame to achieve re-synchronization.

More on C-Frames

The following are three areas where additional independent claims can be fashioned. They all make use of SAIN's space/time approach to handling serial communication forms.

A C-Frame of data uses implicit addressing, a robust method of identifying to which, for a connection (or channel), a data element called a cellet belongs. A connection is defined herein as a Level 1 path; a channel is an aggregation of connections and Level 2 and Level 3 aggregations. Cellets transferred within a Time Domain of a C-Frame occur in an ordinal manner. Each cellet in a Time Domain has a one one-to-one relationship to a space domain called a Connection Domain. (The use of the word 'Connection' in this context can apply to both connections and channels.) A cellet can be of any length. The most desirable length is one bit. This ensures that the delay of transporting data through a network is minimized. The Connection Domain enables defining a connection (or channel) as a contiguous collection of cellets.

Cellets are defined in a patent application of the inventor filed in the U.S. and in foreign countries.

Each cellet represents a given quantum of bandwidth. The bandwidth of a connection (or channel) is equal to the number of contiguous cellets multiplied by a cellet's Quantum Data Rate (QDR). The QDR for a C-Frame within a link equals the bandwidth of the length divided by the number of bits contained in the contiguous cellets. The number of bits contained in the contiguous cellets equals the number of cellets multiplied by the number of bits in each cellet. [Each cellet within a C-Frame has the same number of bits.] The number of cellets in each of the two domain of a C-Frame is the same.

For discovery of the one-to-one correspondence is achieved by defining a virtual C-Frame that is the smallest power of two in length greater than or equal to the number of cellets in the C-Frame. In the virtual domain, each cellet is given an ordinal number beginning with "0" and ending with $2^n-1$, where n defines the required power of two. The cellets that are the difference between the virtual C-Frame length and the real C-Frame length are called the virtual residue cellets. They can be grouped as a contiguous group that can be placed anywhere within a virtual Connection Domain. In the Time Domain, the virtual residue cellets are spread nearly uniformly throughout the virtual C-Frame.

Method and Apparatus for Distributing Large Connections Among a Plurality of Lanes This method and apparatus uses the SAIN space/time multiplexing algorithm defined in detail in both the RS1 patent application and the provisional patent applications (RS2 and RS3). A plurality of lanes can be a plurality of connections within optical wavelengths of one or a plurality of optical fibers or other or another type of conductor. There are two ways of using more than one lane. One is to divide a plurality of connections (or channels) to be sub-aggregations components of an aggregation. Each sub-aggregation can be assigned to a different lane. This can be the preferred method to overcome a lane failure. In the event of such a failure, the only traffic being affected is the traffic contained within a failed lane of a plurality of lanes.

An alternative method can use more than one optical lane in the following manner:

1. A range of cellets $RC_1$ within a Connection Domain of a first C-Frame $Fr_1$ in a first lane $L_1$ is defined to be the first part of a large connection (or channel). Often the range extends to the last position in the real C-Frame of the Connection Domain, but this is not mandatory.

2. A second C-Frame $Fr_2$ can define a range of cellets $RC_2$ in a second lane $L_2$ that can be treated as a contiguous extension of $RC_1$. This can be any segment within the Connection Domain of lane $L_2$. $RC_2$ can be either a segment of an operational C-Frame representing an entire Connection Domain.

3. This process can involve a plurality of lanes defined only by their physical presence.

4. All lanes used to define a channel must be descewed. This can make use of the "Method and Apparatus for C-Frame Synchronization of Space/Time Division C-Frames" disclosed below.

Simply stated: A Large Connection can be a plurality of Connection Domain sub-connections that exist in a plurality of connections in an ordered number of lanes.

Method and Apparatus for C-Frame Synchronization of Space/Time Division C-Frame C-Frames FIG. 21 shows an example of a method using a small number of framing cellets compared to total data traffic in a C-Frame. The C-Frame can be of any length. For purposes of an example, the figure shows successive blocks of power-of-two length C-Frames $2^{10}=1024$ cellets prepended with Time C-Frame Prepend Cellets 505 in its Time Domain as shown in FIG. 21 (b). Having one cellet added to a C-Frame with 1024 cellets to achieve C-Frame synchronization uses less than 0.1% of a C-Frame's total bandwidth. In addition, the amount of jitter caused by the extra prepended cellet is insignificant compared to the jitter caused by the common practice of placing a plurality of cellets grouped together at the beginning of a C-Frame.

For purposes of illustration, the example will assume that the length of all of the cellets is one bit. FIG. 21 (a) shows the Time C-Frame Prepend Cellets 505 in the C-Frame's Connection Domain. These Time C-Frame Prepend Cellets 505 are clustered together in a Connection Domain at the beginning of a super C-Frame consisting of 4 1024-cellet C-Frames. This positioning of the prepend cellets in the Connection Domain spreads them uniformly throughout the Time Domain C-Frame. (The Time C-Frame Prepend Cellets 505 are uniformly spaced since the length of a C-Frame is 1024+1=1025. See FIG. 27 and its discussion in the referenced patent application.)

The prepend group in the Time Domain shown in FIG. 21 (c) illustrates the way that the disclosed C-Frame synchronization method can work. Each prepend occurs in a periodic manner. The figure shows each prepend cellet occurring before four subsequent 1024-cellet (i.e., 1024 1-bit) C-Frames. Each successive four C-Frames is shown stacked on top of a preceding C-Frame for a period of a 16 4-C-Frame epoch. The prepend groups in a single 4-C-Frame epoch appear in an "ACBC" order. The pair "AB" shows a "1" followed by a "0" in each stacked-frame position. This is somewhat similar to the 101010 . . . synchronization protocol of an Ethernet packet (herein called a P-Frame.) (It would be identical if the eighth position in the "A" stack set to be a "0" instead of a "1", which is one of many alternate embodiments.)

To find the beginning of a C-Frame can be accomplished using the "A" and "B" stack. The two "C" stacks can also do that as well; but their major benefit can be to achieve rapid recovery from a Time Domain slip error. There are a number of ways that this can be implemented by a person skilled in the art. A simple way is as follows using a 4100-bit super C-Frame as an example:

1. Provide each cellet position in a C-Frame with a 4-bit Time C-Frame Prepend Cellet 505 summing counter (or some other length depending on the number of C-Frames being used). This results in 4100 4-bit summing counters 2. The summing counters can all be reset to "0", as described below 3. Each summing counter adds a "1" to its total when a "1" appears in the incoming multiplexed stream.

[4] Operation of the disclosure can include the following steps:

1. If synchronization has not been achieved, reset all 4-bit counters to "0" and set a super C-Frame clock counter to "0". This clock counter can have a range of 0-15.

2. For each position in the super C-Frame, if a position is a "0", do nothing. If it is a "1", add a "1" to the position's 4-bit counter.

3. At the end of a 16-clock counter epoch, find any position of the Time C-Frame Prepend Cellet 505 summing counters where the sum is "0". This denotes a possible location of an all zero summing counter 4. For each position where the sum in the summing counter is "0", this is a possible "B" position. The corresponding "A" position's summing counter should show "15" as its sum. If there is more than one position where the possible "B" and "A" positions are "0" and "15", then either run the epoch again or use an additional method defined next.

An alternative to finding a start-of-frame position using the above method can use bit-patterns that result in a good autocorrelation. There are many possibilities that can be used. One is an m-sequence that was discovered by Solomon Golomb. The method involves using a binary sequence with shift registers that can create waveforms where the periodic autocorrelation either very small or is a peak that can be the number of stages in the shift register. The length of an m-sequence is $2^n-1$ where n is an integer. In the example, a super C-Frame assumed from FIG. 21 would have 2 "C's" that for a super C-Frame shown could use a sequence with n=5. An m-sequence would be 31 bits long plus an extra bit that could be either a "0" or a "1". Alternatively, 2 n=4 m-sequences can be used. In this case there are two extra bits and 30 bits belonging to the two m-sequences. As described below, the one or two extra bits can become plesiochronous bits per two 16 1025-bit subframes. In other words, one or two extra plesiochronous bits per 65,600-bit synchronization C-Frame shown in FIG. 21 or 32,800-bit synchronization C-Frames shown in FIG. 22. For a 10 Gbps lane, there are 152,439 or 304,878 plesiochronous bits shown in FIG. 21 and FIG. 22 respectively.

Rather than including an m-sequence for every position in the 4100-bit super C-Frame, it would be possible to use it for the present starting position of a C-Frame and, in the Time Domain have a small number of shift registers that would be able to quickly recover from a time slip error. For example, one might use 21 shift registers assigned to 10 positions on each side of the current C-Frame starting position.

Another alternative would be to either use all four Time C-Frame Prepend Cellet 505 positions or either reduce the number of prepend cellets to 2 instead of 4 as shown in FIG. 22. This and other measures such partitioning the total length of an m-sequence into smaller lengths and using the extra bits as a known addition to the sequences.

The advantage of using four prepend cellets is that both the Ethernet-like and the m-sequence methods are always available. Four prepend cellets can be divided into two modes of 2 prepend cellets each as shown in FIG. 22. One mode is the Ethernet-like method; the other is the m-sequence method. The advantage of having two modes provides all framing cellets to each mode. In this case, it is necessary to provide a control mechanism that toggles between the two methods. This is easily obtained using chain Control Vectors.

Method and Apparatus for Overcoming Doppler, Environmental, and Frequency Offset Effects in Data Networks In a SAIN network, each forwarding node can connect to its neighbor over an optical fiber lane or over other media, such as wireline or microwave radio. The length of a forwarding connection (or channel) can vary with time. In other words, clock synchronization between two connected nodes can be plesiochronous. The difference in the phase of C-Frames in two connected nodes can be measured in terms of time per second related to their clocks (i.e., in terms such as microseconds per second, nanoseconds per second, and the like). In a wireline or an optical fiber channel, a change can be due to temperature or other variation of a medium's length; in a microwave radio case, it can be a length change due to nodes moving radially between each other; in a clock case, it can be a frequency difference that has properties that differ from others. There can be a mixture with the combined effects being similar.

In an optical fiber case, changing temperature of a fiber can be a major reason for diurnal and seasonal delay changes. A changes is at a rate of approximately 75 ps/degree (Celsius)-kilometer. In other words, for each kilometer length of an optical fiber, the delay changes at the rate of about 75 ps/degree centigrade. For example, over a 100 kilometer link, the delay is 7.5 ns/degree.

In a microwave radio case, if the two ends of the channel are traveling toward each other at the rate of 100 km/h, the rate of change of the channel is about 92.59 ns per second [(100 km/h per kilometer/3600 s/h)×$10^9$ ns/s/3×$10^5$ km/s (the approximate speed of light)]. Two airplanes moving toward one other, each at 1000 km/h would result in the path length in time changing at a rate of about 1.852 μsec/s. In addition, propagation delay changes can also exist due to environmental changes other than temperature.

If two clocks in connected nodes operate at two different frequencies, the timing difference is the frequency difference. For example, if the frequency of a source clock is one hertz in bits per second more than destination clock, the phase difference is one second per second. In other words, it is necessary to decrease momentarily the length of the Destination C-Frame by one bit or increase the length of the Source C-Frame by one bit. The preferred method for the source node to send an extra bit per C-Frame that will be deleted from the Destination C-Frame. In addition, if the source clock is one hertz slower than the destination clock, a bit must be deleted from the Source C-Frame or a bit added by the destination C-Frame. These events are to happen once per second at a time that depends on the relative phase of the two clocks.

The preferred method in all cases can use of three-bit buffer to good effect. It can overcome delay differences without causing jitter in a destination node. The result allows a Destination C-Frame to float through a network. This method overcomes undesirable outcomes of common methods where a C-Frame must align with a master network clock or the UTC international clock. For example, a common method used in networks are those designed for a telephone network. To achieve alignment of a Destination C-Frame and its local clock with its Source C-Frame requires adding or deleting one octet to a C-Frame. [The method disclosed herein can use the word "cellet" to replace the word "bit" in the description above. This requires the reader to adjust computations that follows by a factor of 8.] Adjusting the local clock by an octet instead of a bit can cause objectionable clock jitter.

In a network using time division C-Frame s, there is a simple method of overcoming the effects enumerated above. In a SAIN network, data forwarding is between two nodes that are clocked at the same, or nearly the same rate. Two connected nodes contain a C-Frame that has the same length in cellets (i.e., bits). In order to overcome small displacements of phase (i.e., time) difference between C-Frames in a destination node clock compared to a source node clock can be achieved using a buffer large enough to overcome phase offset of clocks that have synchronized frequency. To make this approach work, it is necessary that the buffer size be sufficient for the entire range of phase changes. For example, suppose that the range of temperatures is 100 Celsius degrees. For the 100 kilometer cited above, the range of delay is 0.75 μs. For a 10 Gbps link, there are 13,333 plesiochronous bits per second.

The basic idea of the method is not intuitive. Contrary to practice installed in many networks, it is not necessary to synchronize the phase of a C-Frame in a node to a single timing source. The main idea of synchronizing C-Frames with one another is to consider forwarding a C-Frame between tandem nodes to 'float' in time. This approach can make use of a Phase Alignment Buffer 569 (as shown in FIGS. 23.1-23.3) with as few as three-bits. Larger buffer sizes (such as an odd number of bit sizes, such as a 5-bit buffer) may be helpful where the number of plesiochronous bits is very large. The buffer delay is its size divided by the link's data rate.

Changing delay associated with optical fiber temperature changes can be overcome by using large enough buffers to preclude dropping a bit over wide temperature variations. However, this method increases end-to-end delay to a degree that is not useful where minimizing delay over long distances is a critical need. Trying to use large enough buffer to overcome Doppler delays between two moving objects is also not a useful option where the speed differences between the objects are high.

In an international standard telephone network, time division C-Frames must use relatively large buffers. The buffers must be at least as large as a C-Frame to being able to time-align an arriving C-Frame with a local C-Frame. The method disclosed herein can overcome this difficulty making C-Frame synchronization available in the cases denoted above and more.

The method disclosed herein treats a source node to a destination hop as one or a plurality of hops. The delay for an end-to-end channel can be computed as the sum of the delays of each hop channel a source/destination pair of C-Switches. An alternative to summing the hop delays, is to use ranging to determine source to destination delay. Ranging a destination-to-source connection can determine its delay. This can be an important part of privacy and security alternatives. Such an alternative can insure that the delay is within known values.

For networks with multiple levels of aggregation, each level can use the methodology disclosed below to assure that the lowest level of aggregation functions properly. The highest level of aggregation can aggregate traffic from the next lower level. In a SAIN network operating as a Metro network, the highest traffic aggregation is at Level 3 aggregating Level 2 channels. Level 3 itself can be aggregated at a next higher level—a forwarding level that operates in a physical lane of an optical or in a partition of a physical. The forwarding Level 4 can aggregate a plurality of Level 3 aggregations. The system can set up routes for Level 3 aggregations from a Source T-Node to a plurality of other destination T-Nodes using one or a plurality of lanes. Where multiple lanes can be used to forward very high bandwidth channels, C-Frame synchronization for each lane can be handled individually.

An E-Node can contain three traffic aggregation levels. On the source side of the E-Node, these include Source Level 1, Source Level 2 and Source Level 3 aggregations. A Source Level 3 Aggregation Switch pairs with a Destination Level 3 Aggregation Switch in the E-Node's parent Source T-Node. This connection requires no C-Frame synchronization since all elements use the same local clock.

The Source T-Node can set up pluralities of Level 2 channels that can connect to all T-Nodes in the network. For each Destination T-Node a single L3 Aggregation Switch can connect to L4 Aggregation Forwarding C-Switch that part of a route through the network to a L4 Disaggregation Forwarding C-Switch. This can happen in some simple cases. More realistically, a plurality of L3 Aggregation Switches aggregate subsets of Level 2 channels are set up. Each Level 3 subchannel can then be routed over different routes to reach L3 Disaggregation C-Switches at the Destination T-Node.

Each Level 3 Disaggregation C-Switch in a Destination T-Node contains Level 2 channels that connect to a Level 2 Disaggregation Switch in each of the Destination E-Nodes. Each lane that contains the Level 3 traffic can make use of plesiochronous channel connections. The clock rate of each channel is determined by the physical realities of the components chosen.

Aggregation levels that connect to a lane can aggregate all lower levels at bandwidths necessary to handle current traffic. At each level from the lane on down, a C-Frame size is selected according to the quantum data rate (QDR) required for its traffic. For example, for a one gigabit per second channel requiring a 20 Mb per second QDR, the C-Frame size would be 50 bits for a one-bit cellet size. Each channel would then be an integer multiple of 20 Mb per second. The methods disclosed, starting at paragraph 0 define a fixed super C-Frame that can be divided into smaller lanes using the SAIN multiplexing algorithm. In addition, it can be used as a de-skewing mechanism when multiple lanes are required for a large trunk using the properties of methods described in "Method and Apparatus for Distributing Large Channels among a Plurality of Lanes" starting at paragraph 0.

Each one hop connection (or channel) from Level 1 to Level 4 can use the methods disclosed in "Method and Apparatus for C-Frame Synchronization of Space/Time Division C-Frames" above to delimit its C-Frame. The start of the C-Frame may or may not coincide with a timing device. For purposes of this disclosure, it is assumed that such synchronization among connections and channels is not used.

FIGS. 23.1-23.3 show a three-bit Phase Alignment Buffer 569 at a destination node. Upon instantiation of a connection (or channel) suppose that a delay of a bit clock time has occurred so that the Destination C-Switch is now getting its input from the first bit of a three-bit buffer. The method disclosed herein can delete the last bit in an epoch so that the first bit of the following epoch takes its place.

There are several ways to accomplish this movement of the start of an epoch. One is to add a plesiochronous bit that can be either dropped if the source node C-Frame is larger than the destination node C-Frame or can become two bits if a link is shortened by one bit and the start of the next epoch begins one bit later.

FIGS. 23.1-23.3 show the connectivity of a Source C-Frame that is smaller than a Destination C-Frame. FIG. 23.1 shows the connection of the beginning of a C-Frame in the source node into position 2 of the destination node's 3-bit buffer. Position 2 of the destination's 3-bit buffer holds the first bit of the destination node's C-Frame for less than one bit time ahead of the node's start time.

FIG. 23.2 shows that Position 1 of the Source C-Frame now exists over the last bit of the destination node's previous C-Frame. This also places the first bit of the Source C-Frame over Position 1 of the 3-bit buffer in the Destination C-Frame. Position 1 of the Source C-Frame now exists more than one bit away from Position 1 of the Destination C-Frame.

FIG. 23.3 shows that Position n of the Destination C-Frame has been deleted bringing its Position 1 one bit closer to Position 1 of the Source C-Frame. Also, the Position 1 of the Source C-Frame is now placed in Position 2 of the 3-bit buffer. The start time of the Destination C-Frame is now 1 bit later than it was. In other words, the Destination C-Frame floats one bit later. The next hop's 3-bit buffer will now find its Position 1 of its incoming C-Frame in buffer's Position 1. A message must be transmitted from the original destination to the next hop's buffer Position 1 informing it to place Position 1 of the incoming C-Frame to Position 2 of its 3-bit buffer.

An alternative to the FIGS. 23.1-23.3 process is to have the source node add a bit to its C-Frame that can be discarded by the destination node. The message in this case is sent from the destination node to the source node to add the extra bit. The output causing the C-Frame to be floated one bit later occurs. This results in allowing the destination node to discard the incoming C-Frame's additional bit.

When a Source C-Frame is larger than its Destination C-Frame, deleting the end-bit from the m-sequence Source C-Frame causes the C-Frame to appear sooner at the destination so that its C-Frame end-bit remains as before.

Adding or eliminating a bit at a Source C-Frame of a hop pair is an alternative method compared to having the destination node handle the bits. A message must be sent from the destination node to its source node signaling that a bit should be added or deleted by the source node. In either case, a 2-bit message or larger is necessary. This second alternative can be preferred in certain circumstances.

Using a synchronization method disclosed in "Method and Apparatus for C-Frame Synchronization of Space/Time Division C-Frames" above can lead to a simple method of overcoming phase shifting C-Frames. The method does not require a separate plesiochronous bit solely for the purpose. It can use one of the bits from the C-Frame synchronization bits shown in the method. The last bit of a C-Frame's m-sequence is not needed as a part of its synchronizing purpose. There can be one bit available from each $16^{th}$ 1025 (i.e., 16,400) bit sub-frame containing an m-sequence synchronization code For example, the bit to be used as a plesiochronous bit can be a first or last bit in a synchronizing 16,400-bit epoch. The epoch must contain an m-sequence that is either preceded by or precedes a plesiochronous bit. Whatever bit is used, the bit after can initially be set into the second bit in the three-bit buffer at the destination node. What has happened is that an extra bit has been added to the end-to-end delay without producing jitter.

The C-Frame synchronization bits shown in FIG. 21 can belong to each hop. In this manner, only data bits are forwarded through the system. This requires that each C-Frame synchronization structure of the apparatus following each hop be synchronized with the hop C-Frame. This includes the apparatus following the last hop of a forwarding epoch. This can obtain for all aggregation levels.

The procedure disclosed above is for cases where the length of an end-to-end connection (or channel) has increased by a single bit (or other size cellet). For cases where the length is shortened, instead of dropping a bit from the synchronization structure, a bit is added and the third bit forwarded from a hop when the bit has been added becomes the second bit in the three-bit buffer. The second bit is chosen as the first data bit after the third bit has been received.

C-Frame synchronization bits are not involved in forwarding data bits. Synchronization bits are used to synchronize data C-Frames. It is good practice for data forwarding to ignore the framing bits and forward only data bits from a Destination C-Switch. Bits that denote the arriving framing structure can be ignored in the forwarding process. Only C-Framed data result from the process. It can be sent to a Disaggregation C-Switch and forwarded to a lower aggregation level or to a user as a synchronized and marked C-Frame. It can also act as an input to a forwarding hop using a method described herein.

In order to implement methods disclosed above to achieve plesiochronous operation requires that a destination node of a hop to send a control signal to the hop's source node. This can be achieved using a portion of a destination to source Control Vector.

A simple control signal can include a 2-bit message sent periodically from the hop destination a 2-bit entity can describe four messages. For example, the four messages could be '00': "NoOp", '01': "delete source bit", '10': "add source bit", '11': "frame reacquisition". Assume that a lane data rate is 10 Gbps and a super C-Frame contains 1025 bits. The C-Frame rate is 102.5 frames per nanosecond. For a single bit per C-Frame, the data rate for framing is also 102.5 bits per nanosecond.

Assume that a two-bit message per C-Frame is sent from the destination to source. The data rate for this message is 205 bits per nanosecond. A one bit message can be sent from source to destination to identify the C-Frame in which the plesiochronous C-Frame is sent. The combined framing and return messaging is 410 bits per nanosecond. In other words, the total bandwidth expense for plesiochronous framing is 0.41%. This plesiochronous bandwidth approach is independent of the data rate to which it is applied in terms of percentage. However, for many cases, a source does not vary due to a clock percentage change in frequency.

In cases where there is a frequency offset between source and destination clocks, a plesiochronous event is periodic. The period depends upon the difference in frequency between the source and destination clocks and is continuous.

For cases that appears to be distance related such as the temperature effect on data of transport media, the number of plesiochronous moments depends on data rate as well as an effect. For example, suppose that a channel between source and destination is 100 km, the change in delay 7.5 nanoseconds per degree Centigrade. Suppose that the temperature changes by 10 degrees. This causes a change of 75 nanoseconds within an optical cable. For a 10 Gbps hop channel, the period of a single bit is 100 picoseconds. For a 1 Mbps, the period of a bit is 1 microsecond. For a 10 Gbps link, there will be about 750 plesiochronous events. For a 1 Mbps link, change is 0.0750 plesiochronous events. In this latter case, it will be very infrequent for the system to have a plesiochronous event.

In all cases involving temperature, the rate of occurrence of plesiochronous events depends on the rate of change of temperature. Suppose that, at sundown, a one degree change occurs linearly over one minute. A 10 Gbps link has eight plesiochronous events per second.

Assume that a car travels toward a cellphone tower a speed of 100 km/hr. This is equivalent to 27.77 m/s. The speed of light is approximately 300,000,000 m/s. A 100 Mbps is the equivalent of 3.00 m/b. This results in 9.26 bits per second that is the equivalent of 9.26 plesiochronous events per second. Two airplanes approaching each other at 1,000 km/hr results in approximately 185.2 plesiochronous events per second.

Two connected nodes whose clock rates differ by one part per $10^5$ cycles (which can occur with crystal oscillators) result in 100,000 plesiochronous events per second for a 10 Gbps link. Using 4,100 bits per super C-Frame with two plesiochronous bits per frame, the frames are able to handle 48.78 plesiochronous events per microsecond. The off-frequency events occur at a rate of 0.1 plesiochronous event per microsecond. In other words, the system can provide 478.77 plesiochronous bits per plesiochronous occurrence. In short, the rate at which a C-Frame floats is 10 µs/s regardless of the C-Frame's data rate.

TERMINOLOGY

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a" and "an" are to be construed to mean "one or more" or "at least one" unless specified otherwise.

Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

While the above detailed description has shown, described, and pointed out novel features as applied to various embodiments, it will be understood that various omissions, substitutions, and changes in the form and details of the devices or algorithms illustrated can be made without departing from the spirit of the disclosure. Thus, nothing in the foregoing description is intended to imply that any particular feature, characteristic, step, module, or block is necessary or indispensable. As will be recognized, the processes described herein can be embodied within a form that does not provide all of the features and benefits set forth herein, as some features can be used or practiced separately from others. The scope of protection is defined by the appended claims rather than by the foregoing description.

What is claimed is:

1. A method of addressing an incoming data stream, the method comprising:
   forming a connection domain to transmit connection frames for a connection, wherein a first length of the connection frames is proportional to a bandwidth of said connection;
   receiving, at a buffer of an ingress node, the incoming data stream that is to be transmitted to a destination address of a networked system;
   clustering the incoming data stream into cellets within the connection frames for said;
   forming a super frame of the connection frames in the connection domain by adding one of a plurality of cellets for each connection frame of the super frame, including a cellet for the beginning connection frame of the first incoming data stream, wherein a second length of said cellets is proportional to the bandwidth of said connection; and transforming the super frame, by a computing system comprising computer hardware, to form a space/time connection stream in a space/time domain, wherein the position of said cellets within the super frame indicates a time at which to transmit said cellets associated with the connection in the space/time connection stream.

2. The method of claim 1, further comprising:
forming a buffer at the ingress node; and
receiving, at the ingress node, the space/time connection stream, wherein at least a plurality of bits of the space/time connection stream is received at the buffer.

3. The method of claim 2, wherein the buffer has a length of two bits.

4. The method of claim 3, wherein forming the buffer at the ingress node further comprises:
determining a length of the buffer based at least in part on a temperature of at least one of an optical fiber or a wireline.

5. The method of claim 3, further comprising:
discarding two bits of the plurality of bits received at the buffer, and thereby providing a space/time data stream that corresponds to a frame size of the ingress node.

6. The method of claim 2, further comprising:
synchronizing the space/time connection stream with plesiochronous bits, and thereby offsetting a difference in frequency.

7. A system comprising:
one or more processors; and
tangible, non-transitory computer storage that stores a program that when executed by the one or more processors is configured to perform operations comprising:
forming a connection domain to transmit connection frames for a connection, wherein a length of the connection frames is proportional to a bandwidth of said connection;
receiving, at a buffer, an incoming data stream of space/time frames that is to be transmitted to a destination address of a networked system;
clustering, in the buffer, the incoming data stream into said connection frames comprising cellets for transmission in said connection, wherein said connection provides the bandwidth required to transmit said cellets in a single transmission request, wherein each of said cellets corresponds to a particular bandwidth allowed by each cellet between the ingress node and the egress node;
forming a super frame of said connection frames in the connection domain by appending prefix cellets to the super frame within the incoming data stream;
determining that the super frame corresponds to a space/time connection stream, wherein the position of said cellets within the super frame indicates a time at which to transmit said cellets associated with the connection in the space/time connection stream, wherein the space/time connection stream includes at least space/time frames of the super frame; and
thereby providing transmission of said incoming data stream of space/time frames, using the connection domain with an overhead of said appended cellets to the super frame.

8. The system of claim 7, wherein the connection is at least one of a 3Gbps data connection over an optical fiber or a wireline, and thereby providing transmission of the incoming data stream in the single transmission request to the destination address.

9. The system of claim 7, the one or more processors further configured to perform operations comprising:
correlating, with said prefix cellets, the super frame to said space/time frames, wherein a synchronization value corresponds to a state of time synchronization for said space/time frames corresponding to a common clock, wherein said prefix cellets index said space/time frames within the space/time connection stream.

10. The system of claim 9, wherein the correlating is performed with a periodic autocorrelation.

11. The system of claim 7, wherein determining the super frame corresponds to said space/time connection stream further comprises:
assigning synchronization values for each of said prefix cellets with counters; and
correlating said space/time frames to said prefix cellets with said synchronization values.

12. The system of claim 7, the one or more processors further configured to perform operations comprising:
forming a phase alignment buffer, wherein the phase alignment buffer has a length proportional to the bandwidth between the ingress node and the egress node.

13. The system of claim 12, wherein forming the phase alignment buffer comprises:
determining said length of the phase alignment buffer based at least in part on the medium of communication of the space/time connection stream.

14. The system of claim 13, in determining said length of the phase alignment buffer, the one or more processors further configured to perform operations further comprising:
receiving an indication of temperature for said medium of communication; and
determining said length of the phase alignment buffer based at least in part on said indication of temperature.

15. The system of claim 7, wherein the incoming data stream is associated with a first frequency and the space/time connection stream is associated with a second frequency, wherein additional cellets are appended to said space/time frames, wherein each of said additional cellets corresponds to a difference between the first frequency and the second frequency.

16. The system of claim 15, wherein said additional cellets are plesiochronous cellets, wherein a bandwidth of each plesiochronous cellet corresponds to a rate of change in a temperature.

17. A system comprising:
one or more processors; and
tangible, non-transitory computer storage that stores a program that when executed by the one or more processors is configured to perform operations comprising:
forming a connection domain to transmit connection frames over connections between trunk egress nodes and trunk ingress nodes;
receiving an incoming data stream of space/time frames that is to be transmitted to a destination address of a networked system;
clustering, in the buffer, the incoming data stream into said connection frames comprising cellets for transmission in said connection, wherein said connection provides a bandwidth required to transmit said cellets in a single transmission request, wherein each of said cellets corresponds to a particular bandwidth allowed by each cellet between at least one trunk egress node of said trunk egress nodes and at least one trunk ingress node of said trunk ingress nodes;

determining that the super frame corresponds to a space/time connection stream, wherein the position of said cellets within the super frame indicates a time at which to transmit said cellets associated with the connection in the space/time connection stream, wherein the space/time connection stream includes at least space/time frames of the super frame;

determining path latencies of said connections;

determining a lowest latency connection of said connections using said path latencies;

sending the super frame via the lowest latency connection; and thereby providing transmission of said incoming data stream of space/time frames in a deterministic manner to the destination address using the connection domain.

18. The system of claim 17, wherein the connections are coupled via paths to said at least one trunk egress node of said trunk egress nodes and said at least one trunk ingress node of said trunk ingress nodes, wherein said paths comprise nodes, and wherein at least one node of said nodes is said at least one trunk egress node or said at least one trunk ingress node.

19. The system of claim 18, wherein determining the lowest latency connection of said connections using said path latencies comprises:

forming a connection matrix with said trunk egress nodes and said trunk ingress nodes;

obtaining the path latencies between said nodes;

determine routes for the super frame based at least in part on said path latencies; and determine the lowest latency connection based on one of the said routes having a lowest latency as compared to other determined routes.

20. The system of claim 19, wherein the size of the connection matrix is based at least in part on the total number of said trunk egress nodes and said trunk ingress nodes.

* * * * *

UNITED STATES PATENT AND TRADEMARK OFFICE
CERTIFICATE OF CORRECTION

| | | |
|---|---|---|
| PATENT NO. | : 9,137,201 B2 | Page 1 of 1 |
| APPLICATION NO. | : 13/791709 | |
| DATED | : September 15, 2015 | |
| INVENTOR(S) | : Ray W. Sanders | |

It is certified that error appears in the above-identified patent and that said Letters Patent is hereby corrected as shown below:

In the Claims

In column 50 at line 63, In Claim 1, change "said;" to --said connection;--.

In column 50 at line 67, In Claim 1, after "the" delete "first".

Signed and Sealed this
Twenty-sixth Day of April, 2016

Michelle K. Lee
*Director of the United States Patent and Trademark Office*